(12) United States Patent
Schmeichel et al.

(10) Patent No.: US 9,422,009 B2
(45) Date of Patent: Aug. 23, 2016

(54) MUD FLAP ASSEMBLIES

(71) Applicant: Agri-Cover, Inc., Jamestown, ND (US)

(72) Inventors: Charles M. Schmeichel, Jamestown, ND (US); Christopher D. Althoff, Jamestown, ND (US); Shawn J. Wock, Buchanan, ND (US)

(73) Assignee: Agri-Cover, Inc., Jamestown, ND (US)

(*) Notice: Subject to any disclaimer, the term of this patent is extended or adjusted under 35 U.S.C. 154(b) by 0 days.

(21) Appl. No.: 14/322,379

(22) Filed: Jul. 2, 2014

(65) Prior Publication Data

US 2016/0001820 A1    Jan. 7, 2016

(51) Int. Cl.
*B62D 25/18* (2006.01)
*B62D 25/16* (2006.01)
*B60D 1/58* (2006.01)

(52) U.S. Cl.
CPC ............... *B62D 25/163* (2013.01); *B60D 1/58* (2013.01); *B62D 25/18* (2013.01); *B62D 25/182* (2013.01); *B62D 25/188* (2013.01)

(58) Field of Classification Search
CPC .. B62D 25/182; B62D 25/188; B62D 25/168; B62D 25/161; B62D 1/60
USPC .................................. 280/154, 847, 848, 851
See application file for complete search history.

(56) References Cited

U.S. PATENT DOCUMENTS

| | | |
|---|---|---|
| 5,026,094 A | 6/1991 | Haddox |
| 5,121,944 A | 6/1992 | Haddox |
| D328,447 S | 8/1992 | Ahleen |
| 5,727,805 A | 3/1998 | La Roque |
| 5,833,254 A | 11/1998 | Bucho |
| 5,938,222 A | 8/1999 | Huang |
| 6,076,842 A | 6/2000 | Knoer |
| 6,179,311 B1 * | 1/2001 | Larkin et al. ................. 280/154 |
| 6,375,223 B1 | 4/2002 | Kirckof |
| 6,485,059 B2 | 11/2002 | Burnstein |
| 6,942,252 B2 | 9/2005 | Buuck et al. |
| 7,407,194 B1 | 8/2008 | Alley |
| 7,607,698 B2 | 10/2009 | Cicansky |
| 7,931,302 B2 | 4/2011 | Vaughn |
| 2002/0185853 A1 | 12/2002 | Gaudet |
| 2006/0048993 A1 * | 3/2006 | Karube et al. ............... 180/296 |
| 2009/0194967 A1 * | 8/2009 | Vaughn ......................... 280/154 |

* cited by examiner

*Primary Examiner* — Bryan Evans

(74) *Attorney, Agent, or Firm* — Moore & Hansen, PLLC; Robert C. Freed

(57) ABSTRACT

Mud flap assemblies including a frame that can be interconnected to a hitch assembly which can be interconnected to a hitch receiver. Mud flap assemblies including a frame, a securing assembly and mud flap panels; the frame having two longitudinal ends and a rear plate that includes a hitch opening spaced for receiving the shaft of the hitch assembly. One frame is designed to rest on a portion of the bumper to minimize vibration of the frame while in use. The mud flap assembly may include a pair of stops or stop assemblies that are preferably adjustable and are constructed and arranged to rest against the bumper. The mud flap assemblies may also include exhaust ventilation apertures and/or protective heat shields. Methods of installing mud flap assemblies are also disclosed.

66 Claims, 39 Drawing Sheets

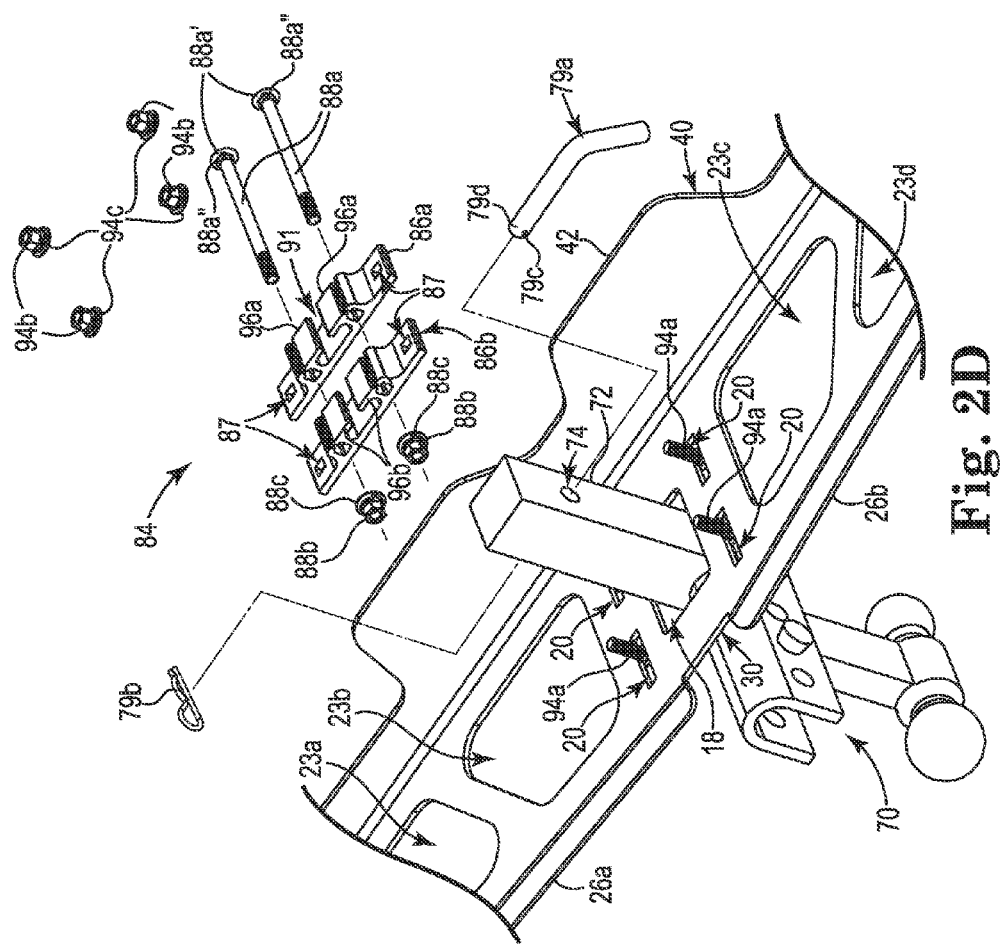

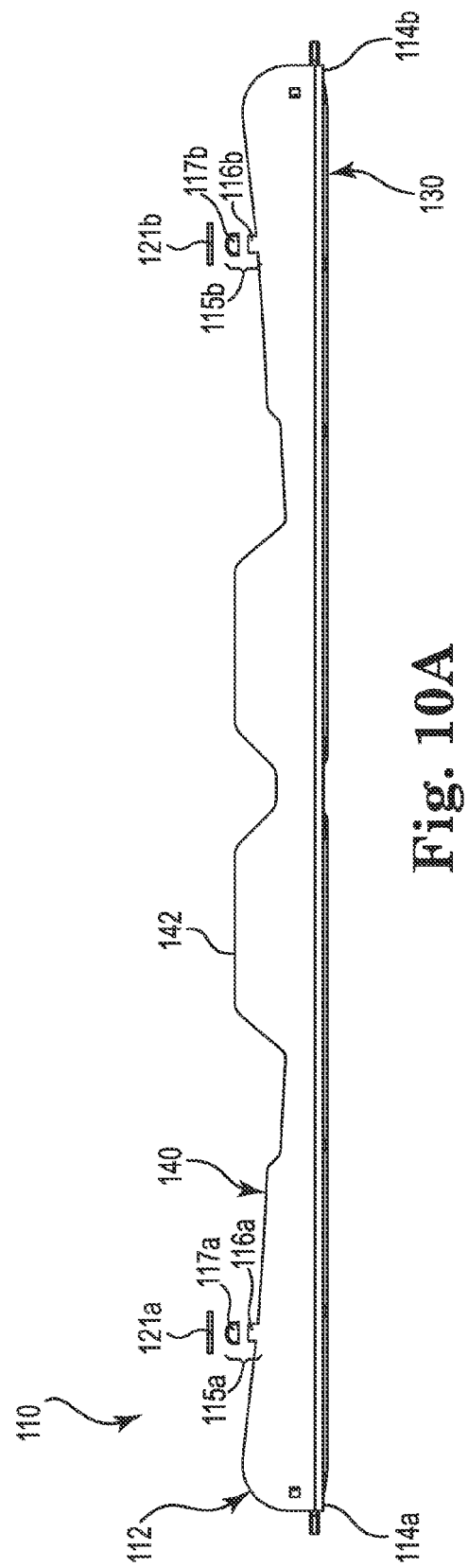

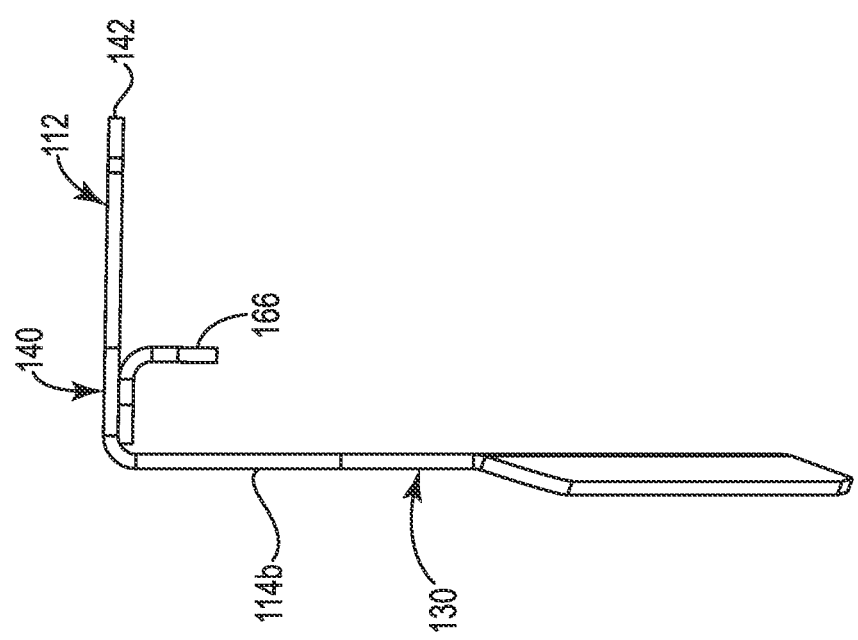

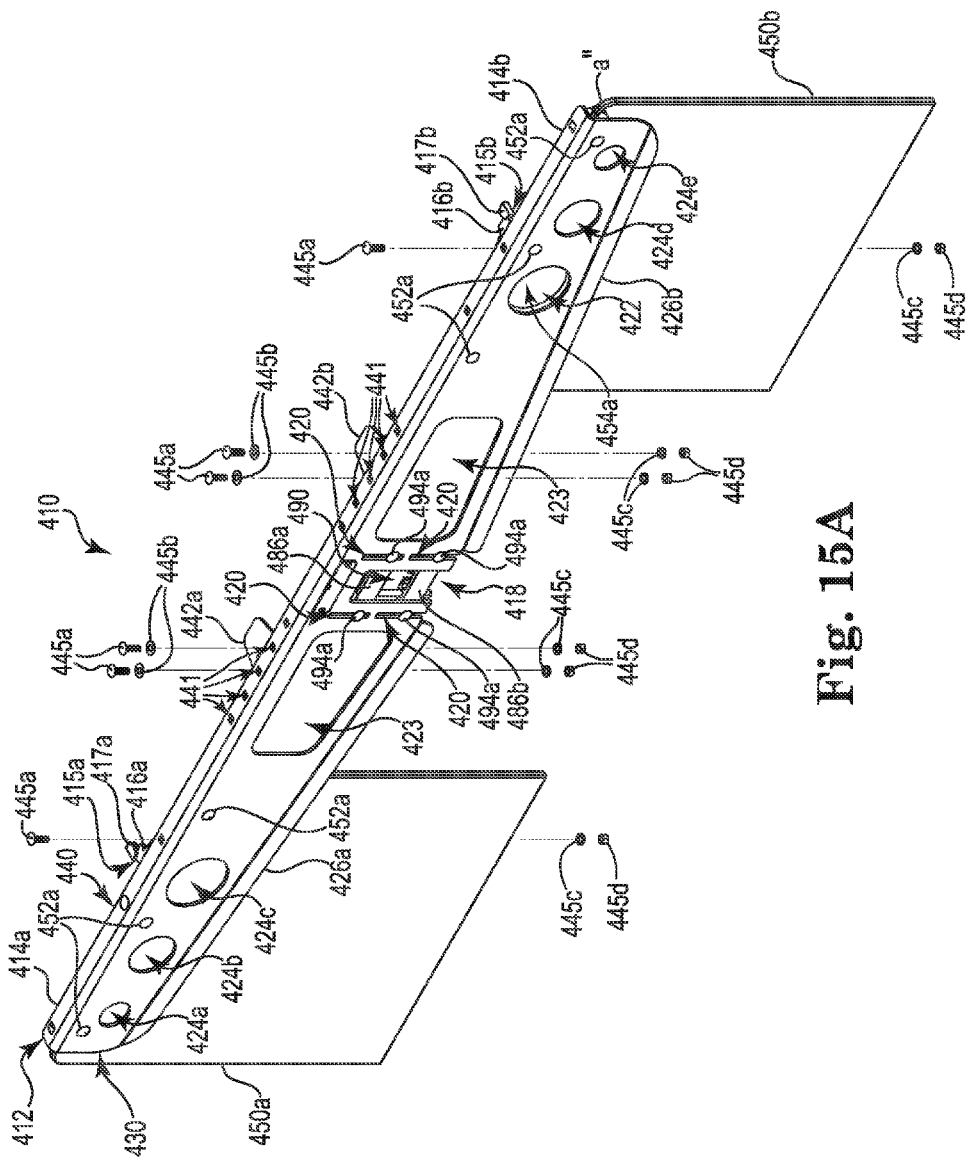

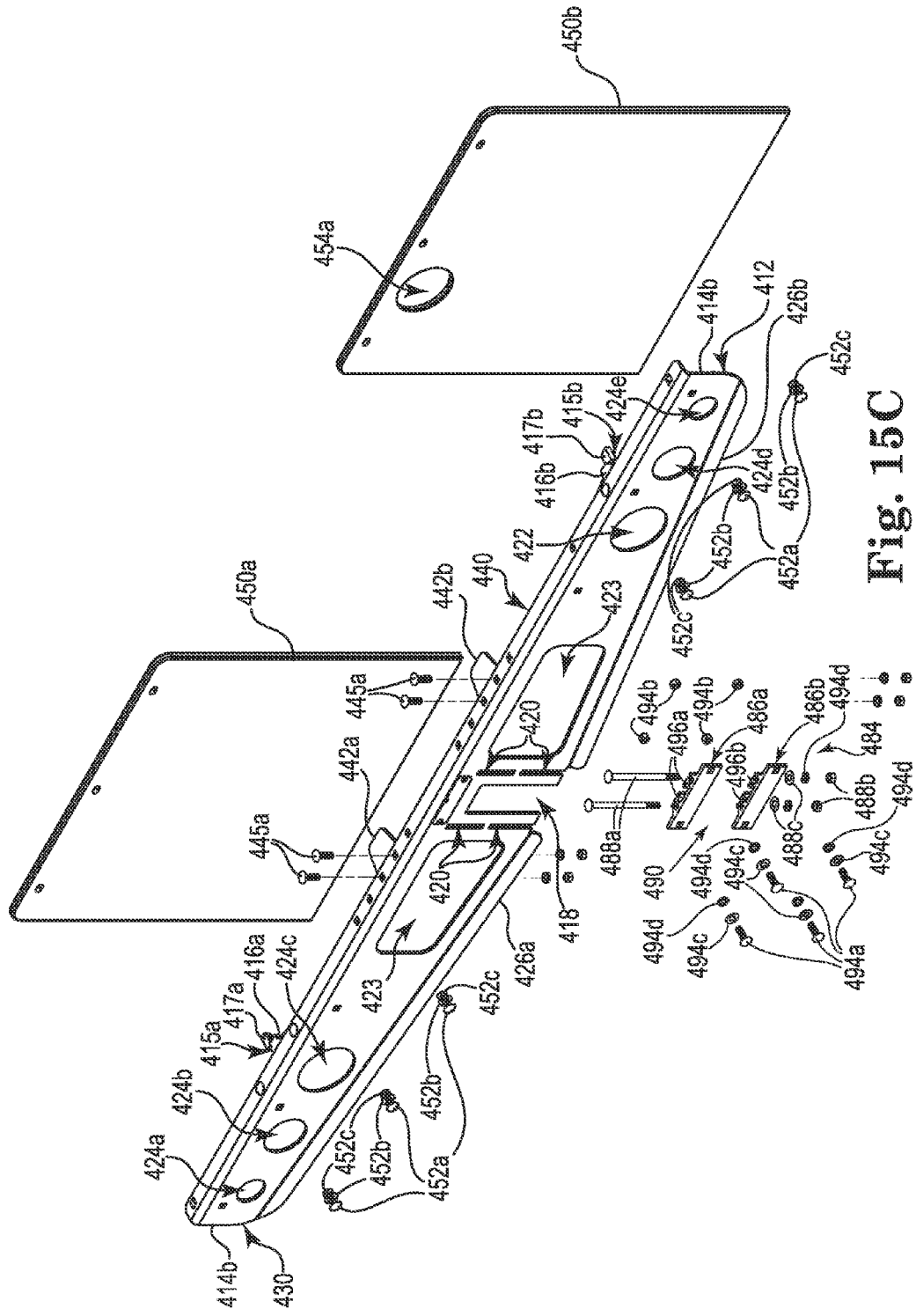

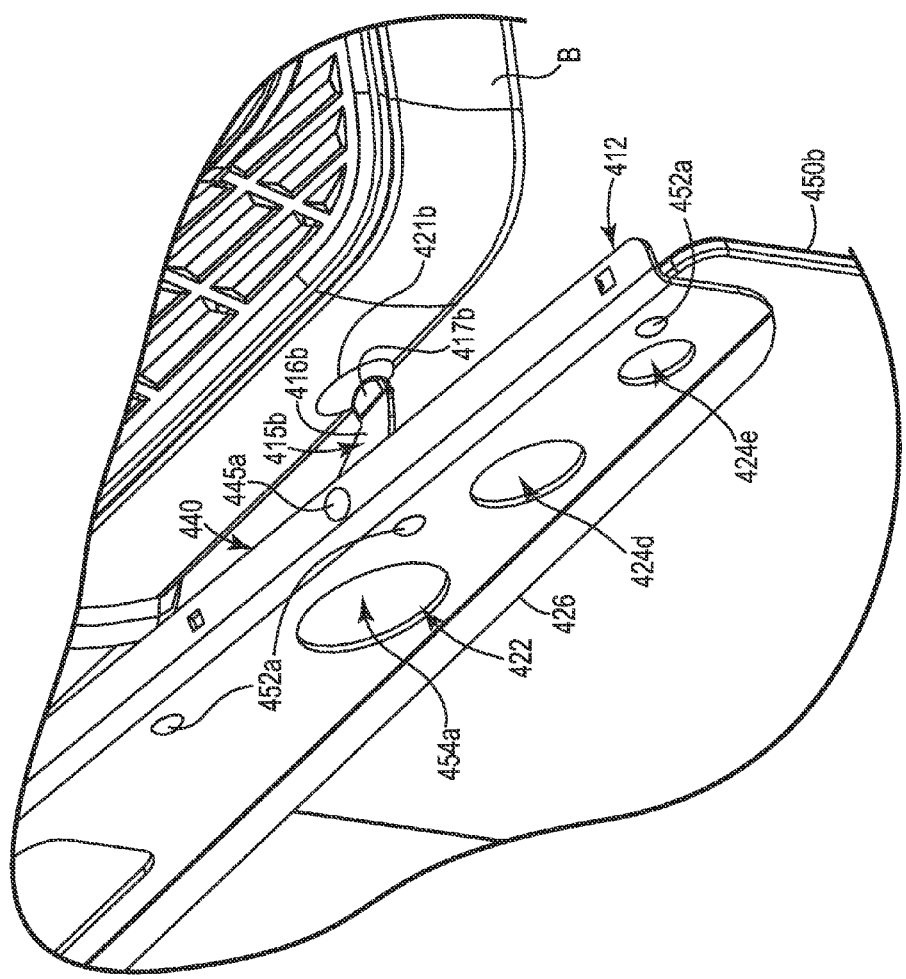

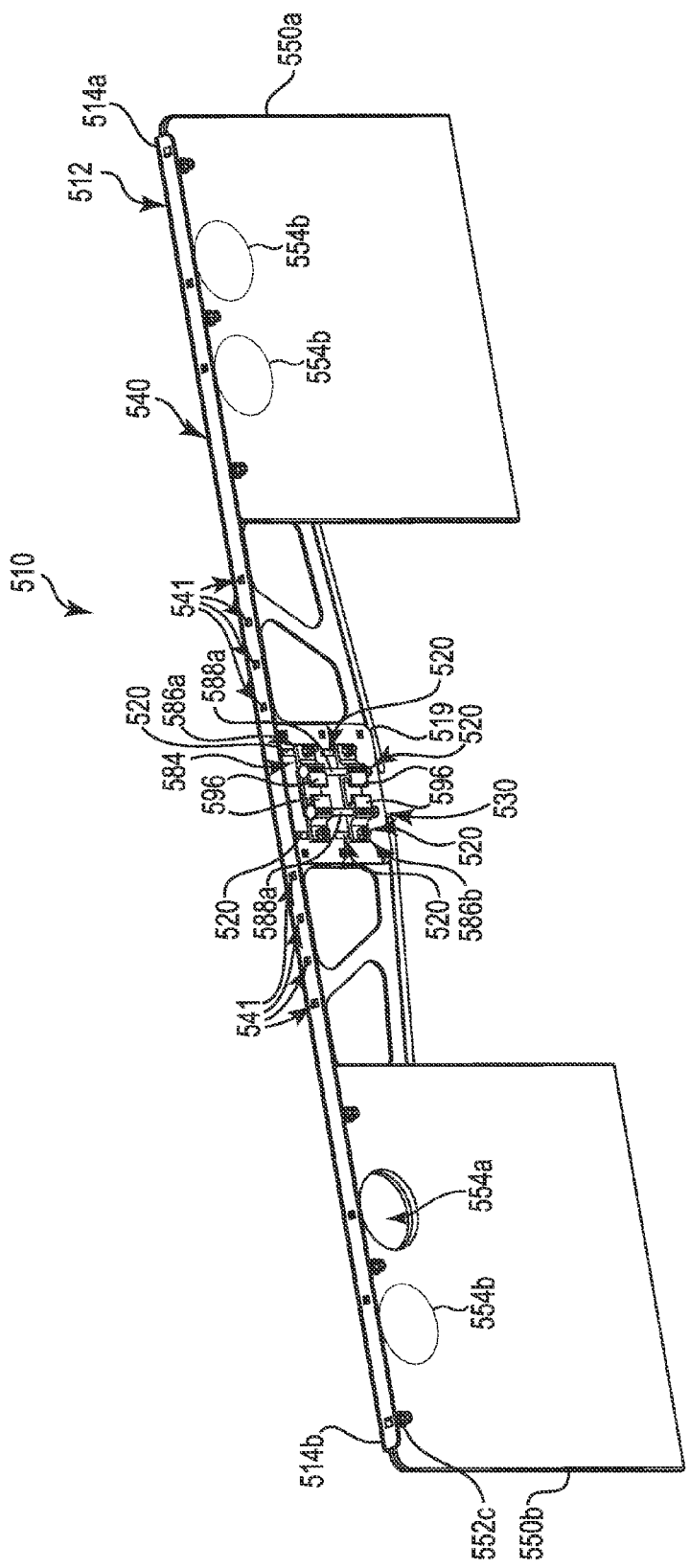

MUD FLAP ASSEMBLIES

FIELD OF THE INVENTION

Mud flap assemblies, particularly, hitch-mounted mud flap assemblies including a frame interconnected to a hitch assembly that can be interconnected to a hitch receiver proximate a bumper of a vehicle. The preferred frame is designed to rest on a portion of the bumper to minimize vibration of the frame while in use on a vehicle. In preferred embodiments, the frame includes a pair of stop assemblies. The stop assemblies are preferably adjustable and are preferably constructed and arranged to rest against the bumper when the mud flap assembly is secured to the hitch assembly and the combination mud flap assembly and hitch assembly is attached to the hitch receiver. The hitch receiver is attached to the vehicle proximate the vehicle's bumper. The mud flap assemblies may also include exhaust ventilation apertures and/or protective heat shields. Methods of installing mud flap assemblies are also disclosed.

DESCRIPTION OF THE RELATED ART

Trucks and other vehicles are frequently used to haul trailers that transport boats, snow mobiles, four wheelers, motorcycles, golf carts and the like. Significant investments are made in such recreational equipment and the owners generally strive to protect their investment in this equipment by preventing any damage to such equipment that might occur during transport. Mud flaps are frequently used to prevent mud, gravel and other debris from being kicked up by the rear tires of the hauling vehicle that could otherwise damage or soil the trailer and the equipment being transported.

Typical mud flap assemblies often include a laterally extending beam positioned along the rear of the vehicle and two mud flap panels extending downward therefrom proximate the rear tires. Frequently, such mud flap assemblies are mounted to a hitch receiver of the vehicle. See, for example, U.S. Pat. No. 6,076,842 (Knoer); U.S. Pat. No. 6,179,311 (Larkin); U.S. Pat. No. 6,375,223 (Kirckof); and U.S. Pat. No. 7,931,302 (Vaughn).

The present invention provides improvements that address limitations associated with the prior art.

SUMMARY OF THE INVENTION

Preferred mud flap assemblies for attachment to hitch assemblies will preferably include a frame, a securing assembly, and two flap panels. The frame will preferably include a rear plate, a top plate and two longitudinal ends. The top plate is generally perpendicular to the rear plate and the rear plate having a hitch opening, wherein a shaft or interceptor portion of the ball mount of the hitch assembly, also called a hitch tongue, can be threaded through the hitch opening and secured to the frame with the securing assembly. Each of the respective flap panels can be separately secured to the frame proximate one of the respective longitudinal ends of the frame. The hitch assembly will preferably be a commercially available hitch assembly including a ball mount interconnected with a shaft or hitch tongue that is securable within a hitch receiver to attach the mud flap assembly to a vehicle proximate a rear bumper of the vehicle; the rear bumper preferably having a top surface and a rear surface. The frame will preferably include a pair of stop assemblies, one of which is located proximate each of the respective longitudinal ends of the frame. When the mud flap assembly is operatively secured to the vehicle, the respective stop assemblies will preferably be engaged with the rear surface of the bumper. The mud flap assembly may also include a protective piece that can have an adhesive back or the like to allow it to be secured to the bumper proximate the position where the respective stop assembly bumper cap is projected to engage the bumper. The protective piece can be positioned such that one of the respective stop assemblies will contact the protective piece when the mud flap assembly is operatively secured to the vehicle such that the protective piece minimizes abrasions to the bumper caused by the respective stop assembly.

Preferred mud flap assembly embodiments are configured for attachment to a hitch assembly, and the hitch assembly is preferably configured for attachment to a hitch receiver proximate a bumper of a vehicle, wherein the bumper has a top surface and a rear surface and the hitch assembly has a shaft for engagement with the hitch receiver. Further preferred mud flap assemblies include a frame, a securing assembly and two mud flap panels. The frame has two longitudinal ends, a rear plate and a top plate, wherein the top plate is generally perpendicular to the rear plate and the top plate includes a support flange that can engage the top surface of the bumper. Each of the respective mud flap panels is secured to the frame proximate the respective longitudinal ends. The hitch assembly is preferably adjustably secured to the frame by the securing assembly such that when the shaft is engaged with the hitch receiver to create a first point of contact between the mud flap assembly and the vehicle, there will also be a second point of contact between the mud flap assembly and the vehicle. This second point of contact is preferably between the support flange or support flange elements and the top surface of the bumper of the vehicle. In further preferred embodiments, mud flap assemblies described and claimed herein will have additional points of contact between the mud flap assembly and the vehicle when the respective stop assemblies come into contact with the rear surface of the bumper. These points of contact help to stabilize the respective mud flap assemblies with respect to the vehicle so as to minimize the degree to which the frames of the respective mud flap assemblies vibrate and move independently of the vehicle.

The present invention includes mud flap assemblies, particularly, hitch-mounted mud flap assemblies including a frame, which can be interconnected to a hitch assembly that can be interconnected to a hitch receiver proximate a bumper of a vehicle. Various preferred mud flap assemblies include a frame, a securing assembly and two mud flap panels; the frame having two longitudinal ends and a rear plate, the rear plate including a hitch opening, spaced between the respective longitudinal ends, for receiving the shaft of the hitch assembly. One preferred frame is designed to rest on a portion of the bumper to minimize vibration of the frame and movement of the frame independent of the vehicle to which it is secured, while in use on the vehicle. Such a frame will preferably include a top plate including at least one support flange, the top plate being generally perpendicular to the rear plate. The mud flap assembly will preferably include a pair of stops or stop assemblies positioned proximate the respective longitudinal ends. Preferred stop assemblies are adjustable and are constructed and arranged to rest against the bumper when the mud flap assembly is secured to the hitch assembly and the combination mud flap assembly and hitch assembly is attached to the hitch receiver. Various mud flap assemblies may also include exhaust ventilation apertures and/or protective heat shields, as desired.

Disclosed embodiments include a mud flap assembly for attachment to a hitch assembly; the hitch assembly being attachable to a hitch receiver attached to a vehicle, preferably a pickup truck, proximate a bumper of the vehicle. The bumper will preferably have a rear surface and the hitch assembly will preferably have a shaft for engagement with the hitch receiver. Various mud flap assemblies will preferably have a frame, a securing assembly and two mud flap panels. The frame has two longitudinal ends and a rear plate. The rear plate includes a hitch opening spaced between the respective longitudinal ends for receiving the shaft of the hitch assembly. The securing assembly will preferably have two elongated members that can be adjustably secured to the frame and adjustably secured to one another to engage the shaft and thereby secure the hitch assembly to the frame. In preferred embodiments, the frame will include a pair of stops, one of which is located proximate each of the respective longitudinal ends of the frame; wherein the respective stops extend away from the frame, toward the bumper, such that the respective stops can engage the rear surface of the bumper when the mud flap assembly is operatively secured to the vehicle. In preferred embodiments, the frame will include a pair of stop assemblies and each of which includes a stop, a protective cap that is engageable with the respective stop such that the respective protective cap will come into contact with the bumper when the mud flap assembly is operatively secured to the vehicle. In preferred embodiments the mud flap assembly will include a pair of adjustable stop assemblies. Each of the respective stop assemblies includes a stop that extends away from adjacent parts of the frame toward the bumper, such that the respective stops can engage the rear surface of the bumper when the mud flap assembly is operatively secured to the vehicle.

The respective mud flap panels are preferably separately secured to the frame proximate one of the respective longitudinal ends. The frame of preferred mud flap assemblies will include a rear plate and a top plate; wherein the top plate is generally perpendicular to the rear plate and the top plate includes a support flange. The securing assembly is configured to allow the hitch assembly to be adjustably secured to the frame so that when the hitch assembly is secured to the frame and to the vehicle to provide a first point of contact between the mud flap assembly and the vehicle, the support flange can be engaged with a top surface of the bumper to provide a second point of contact between the mud flap assembly and the vehicle. In preferred embodiments, the hitch opening of the frame has a configuration selected from the group consisting of: 1) a generally U-shaped opening partially surrounded by adjacent elements of the frame; and 2) an opening completely surrounded by adjacent elements of the frame. The frame further includes a plurality of frame attachment openings proximate the hitch opening; wherein connectors can adjustably connect the pair of elongated members of the securing assembly to the frame and to one another to secure the shaft of the hitch assembly to the frame. In alternate embodiments of the mud flap assembly, the frame includes an enlarged opening over which a mounting plate having a hitch opening can be secured. The mounting plate iS secured to the frame and the securing assembly is secured to the mounting plate and the shaft of the hitch assembly is secured to the mounting plate by the securing assembly. The mounting plate is a removable adjustment plate defining a hitch opening. The adjustment plate includes a plurality of plate openings to enhance the adjustment capabilities of the securing assembly. In further alternate embodiments of the mud flap assembly, the frame has a structure that is selected from the group consisting of: 1) a unitary structure; and 2) a multi-part structure in which a plurality of parts are interconnected to form a frame assembly. The multi-part frame structure may be adjustable in length.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts; and in which reference is occasionally made either to the "rear" or to the "front" of the mud flap assembly or to a frame of the present mud flap assembly in a manner that is consistent with the orientation of the mud flap assembly or to a frame of the present mud flap assembly when it is secured to a vehicle as envisioned, so that the rear of a mud flap assembly or of a frame of the present invention will be consistent with what is seen when one is looking at the rear of such a vehicle when the mud flap assembly or such a frame is attached to such a vehicle as herein envisioned and the front of such a mud flap assembly or such a frame will be the view of such a mud flap assembly or such a frame that can be seen from seen from the front of the vehicle when such mud flap assembly or such frame is attached to the vehicle as envisioned herein and the vehicle does not obstruct the view;

FIG. 2D is an exploded perspective view similar to that of FIG. 2C, but showing the securing assembly 84 of FIGS. 1-2C at least partially exploded away from the frame 12 and the hitch assembly 70 and the hitch pin 79a and the cotter pin 79b exploded away from the shaft or hitch tongue 72;

FIG. 10A is a top plan view of the alternate mud flap assembly 110 of FIG. 9, but showing the respective bumper caps 117*a*, 117*b* of the respective stop assemblies 115*a*, 115*b* exploded away from the respective stops 16*a*, 16*b* and the respective protective pieces 121*a*, 121*b* shown in FIG. 9;

FIG. 10C is a side view of the alternate frame 110 shown in FIG. 10B;

FIG. 14A is a rear perspective view of a further alternate frame 312 that may be used with the other parts of the mud flap assemblies of the present invention; the frame 312 having stops 316*a*, 316*b* extending away from the rear plate 330 (see FIG. 14B) and showing a flexible flap 347 the covers the front side of one of the access openings 323 to generally prevent rocks and debris from passing through the access opening from the front of the frame when the frame 312 is secured to a vehicle (not shown), while still allowing a user to extend his or her hand H through the covered access opening 323 in order to grasp a hitch pin (not shown), a cotter pin (not shown), safety chains (not shown) or the like;

FIG. 15A is a rear perspective view of a further alternate mud flap assembly 410 including a universal frame 412 having a generally U-shaped hitch opening 418 and showing fastener elements 445*a*, 445*b*, 445*c*, 445*d*, for securing support flange elements 442*a*, 442*b* and adjustable stop assemblies 415*a*, 415*b*, in exploded view;

FIG. 15C is a further rear perspective view of the mud flap assembly 410 of FIGS. 15A-15B, but showing the flap panels 450*a*, 450*b* and respective fastener elements 452*a*, 452*b*, 452*c* detached in a modified exploded view and also showing the elements of the securing assembly 484 detached in an exploded view arranged to clearly show the U-shaped hitch opening;

FIG. 15E is an enlarged, partial rear perspective view of a portion of the alternate mud flap assembly 410 of FIG. 15A, showing the adjustable stop assembly 415*b* secured to the top plate 440 by bolt 445*a* and its complementary fastening elements (not shown); wherein the bumper cap 417*b* is pressed up against a protective piece 421*b* and the bumper B, when the mud flap assembly is secured to the vehicle (not shown) in order to give the mud flap assembly 410*a* further point of contact with the vehicle;

Figure 16A:
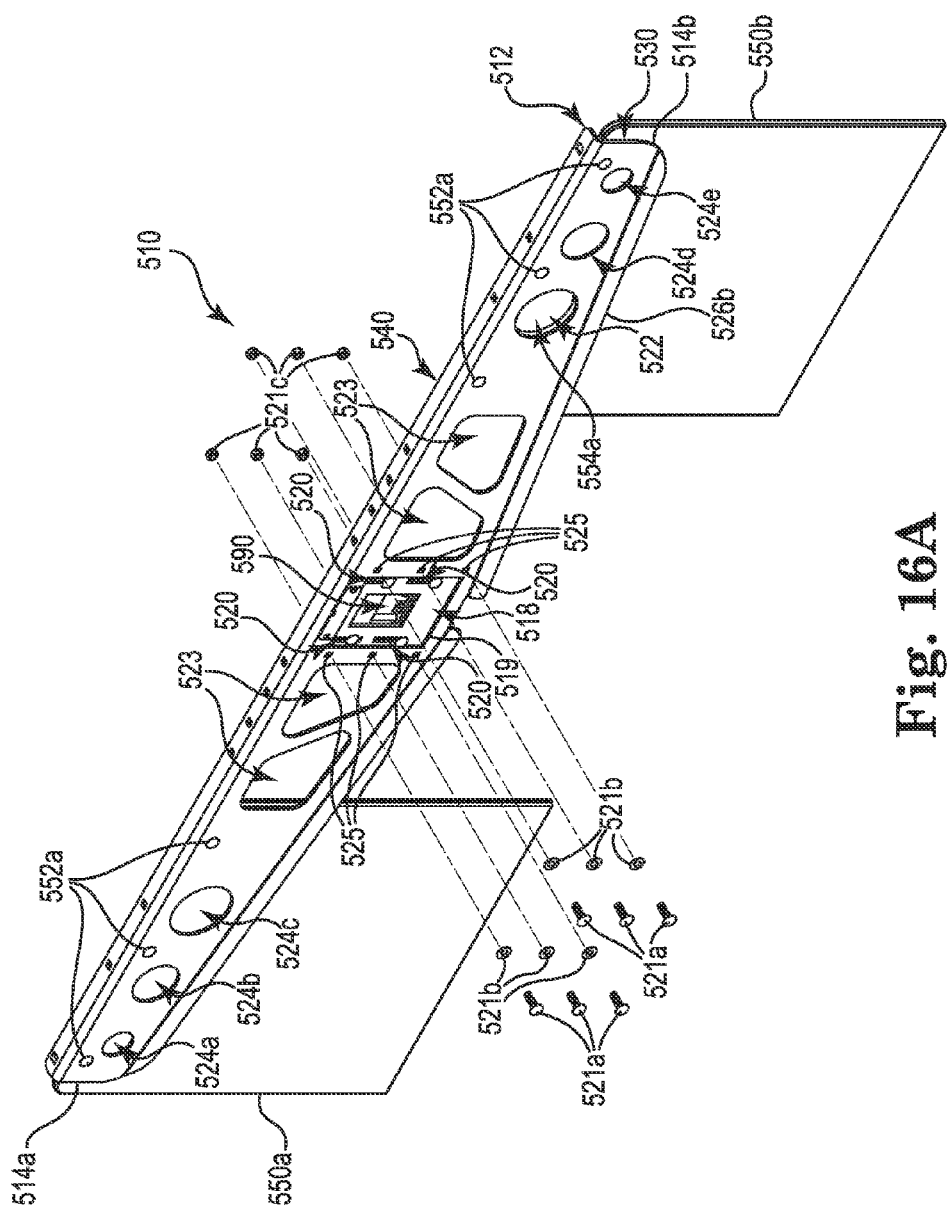
FIG. 16A is a rear perspective view of a further alternate mud flap assembly 510 having a mounting plate 519 to which the securing assembly 584 is attached; wherein the mounting plate 519 includes a hitch opening 518*a* so that when the mounting plate 519 is secured to the frame 512, the mounting plate 519 will at least partially cover an enlarged opening 518 in the frame 512 so as to provide a hitch opening 518*a* for receiving a hitch tongue (not shown), which at least partially overlaps with a central clamp opening 590, through which a hitch tongue (not shown) of a hitch assembly (not shown, see also FIGS. 2A-2D and related disclosure) can be threaded.
Figure 16C:
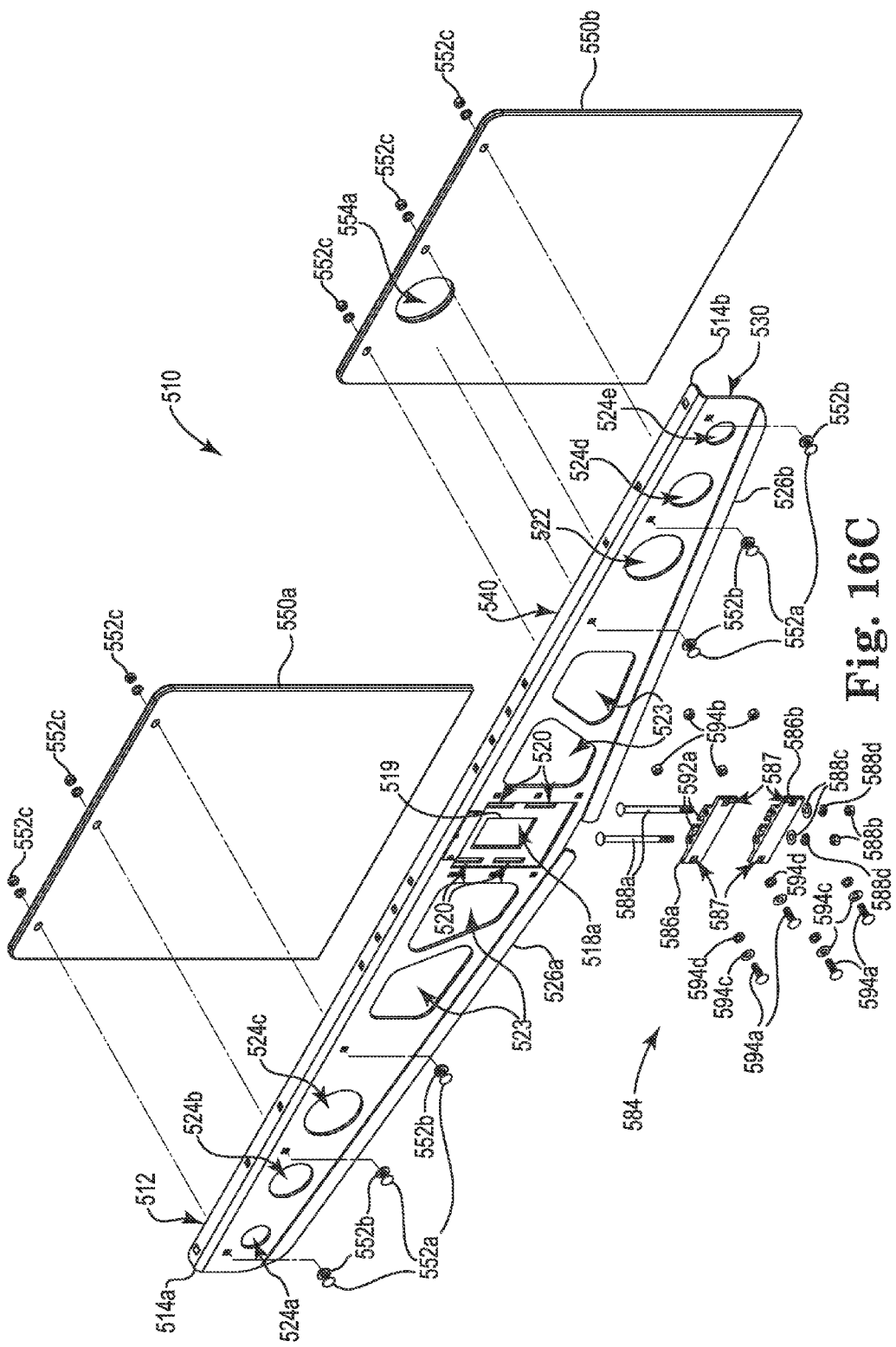
Figure 16D:
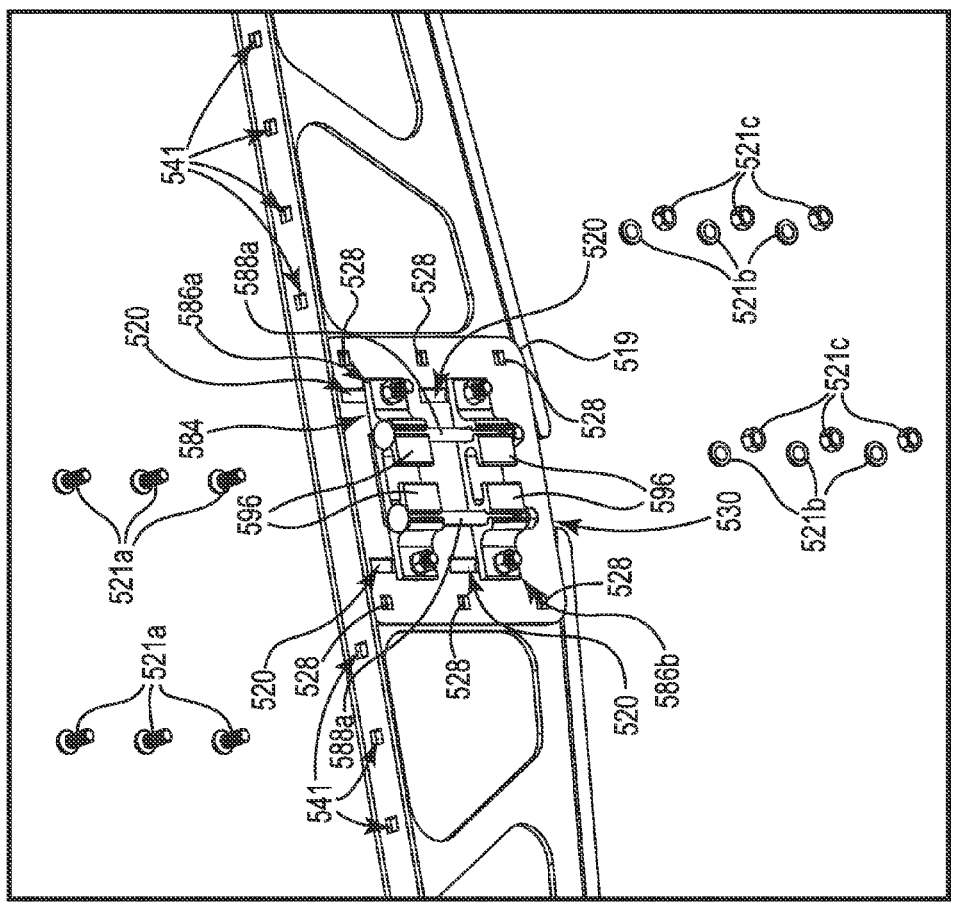
Figure 17:
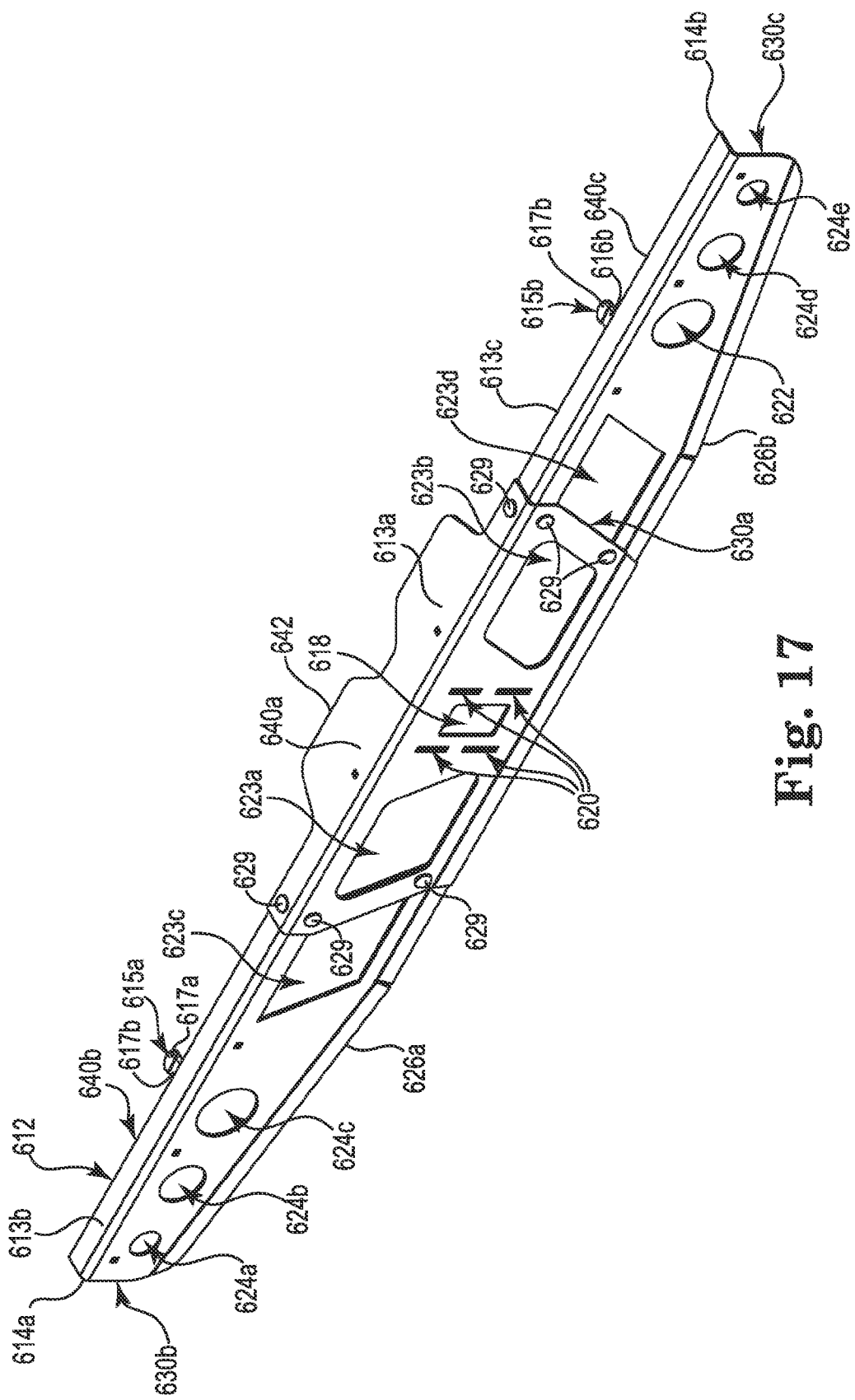
Figure 18A:
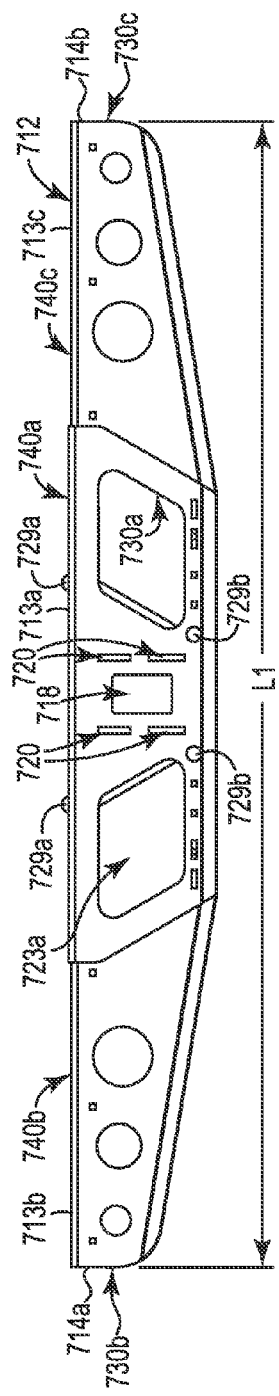
Figure 18B:
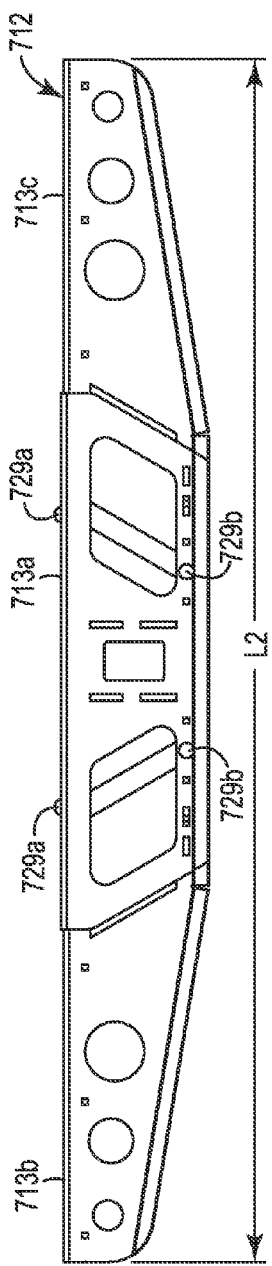
Figure 18C:
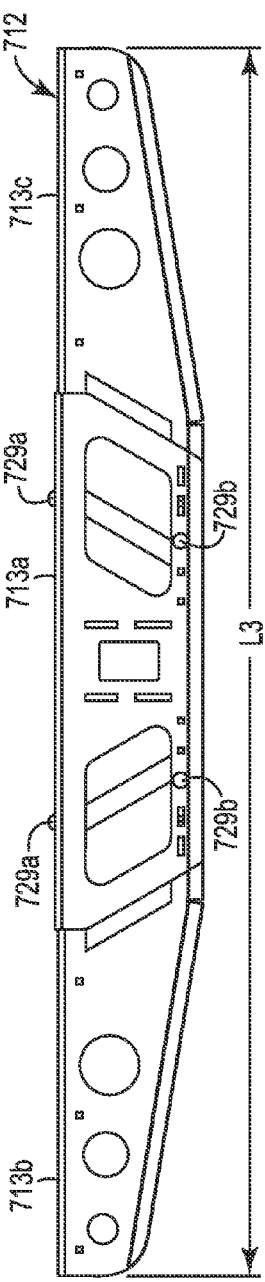
Figure 18D:
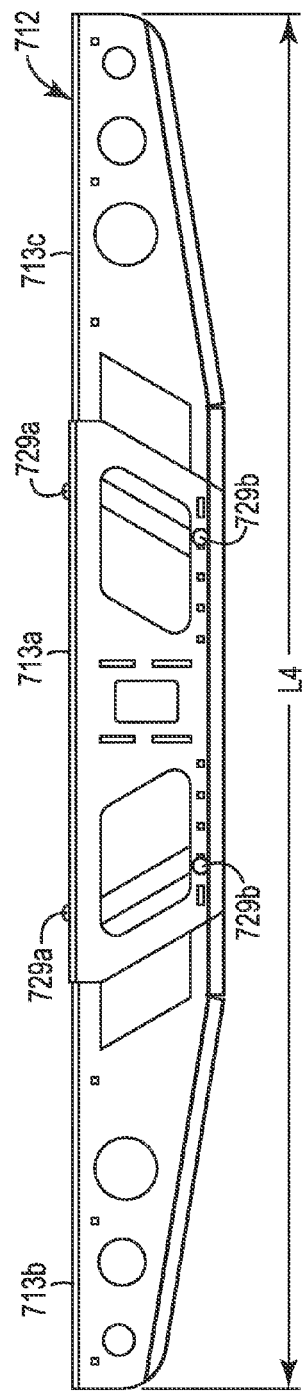
Figure 18E:
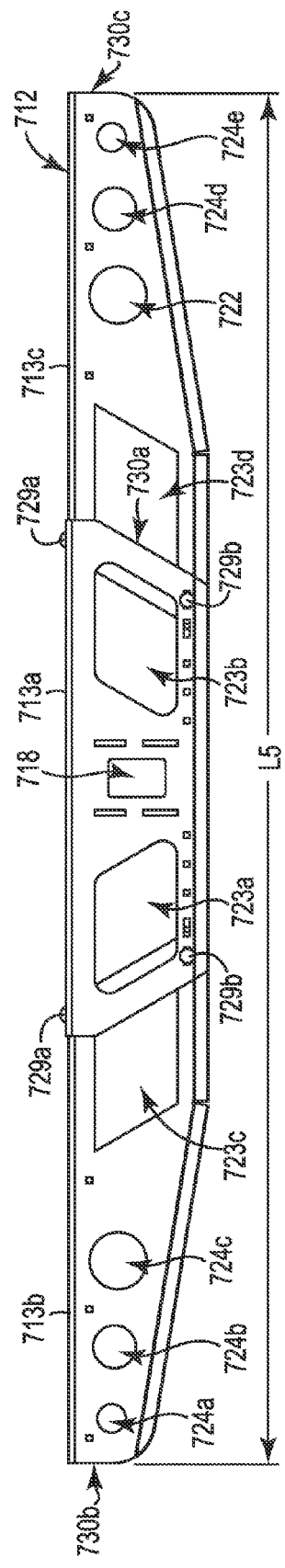
Figure 19:
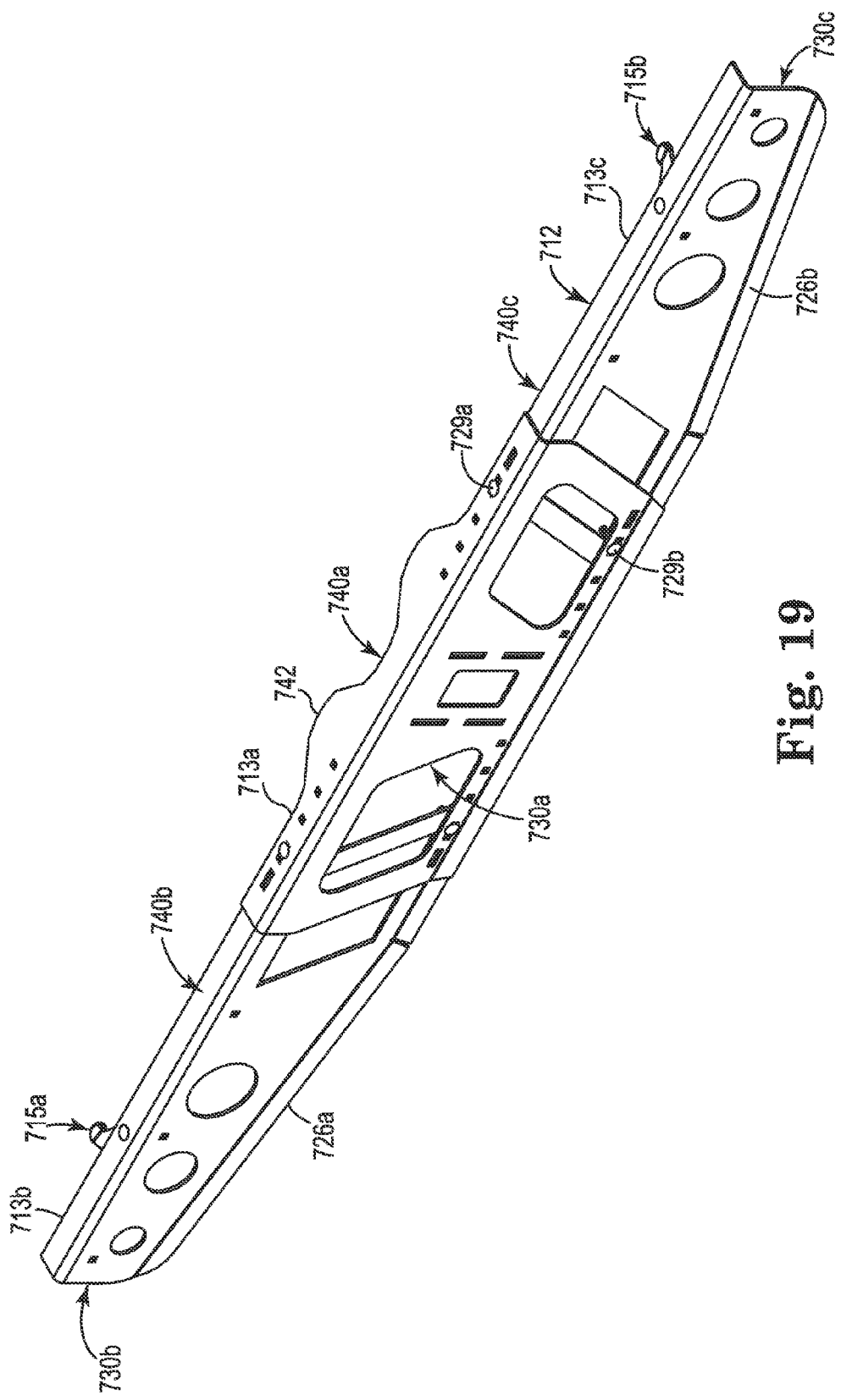
Figure 20:
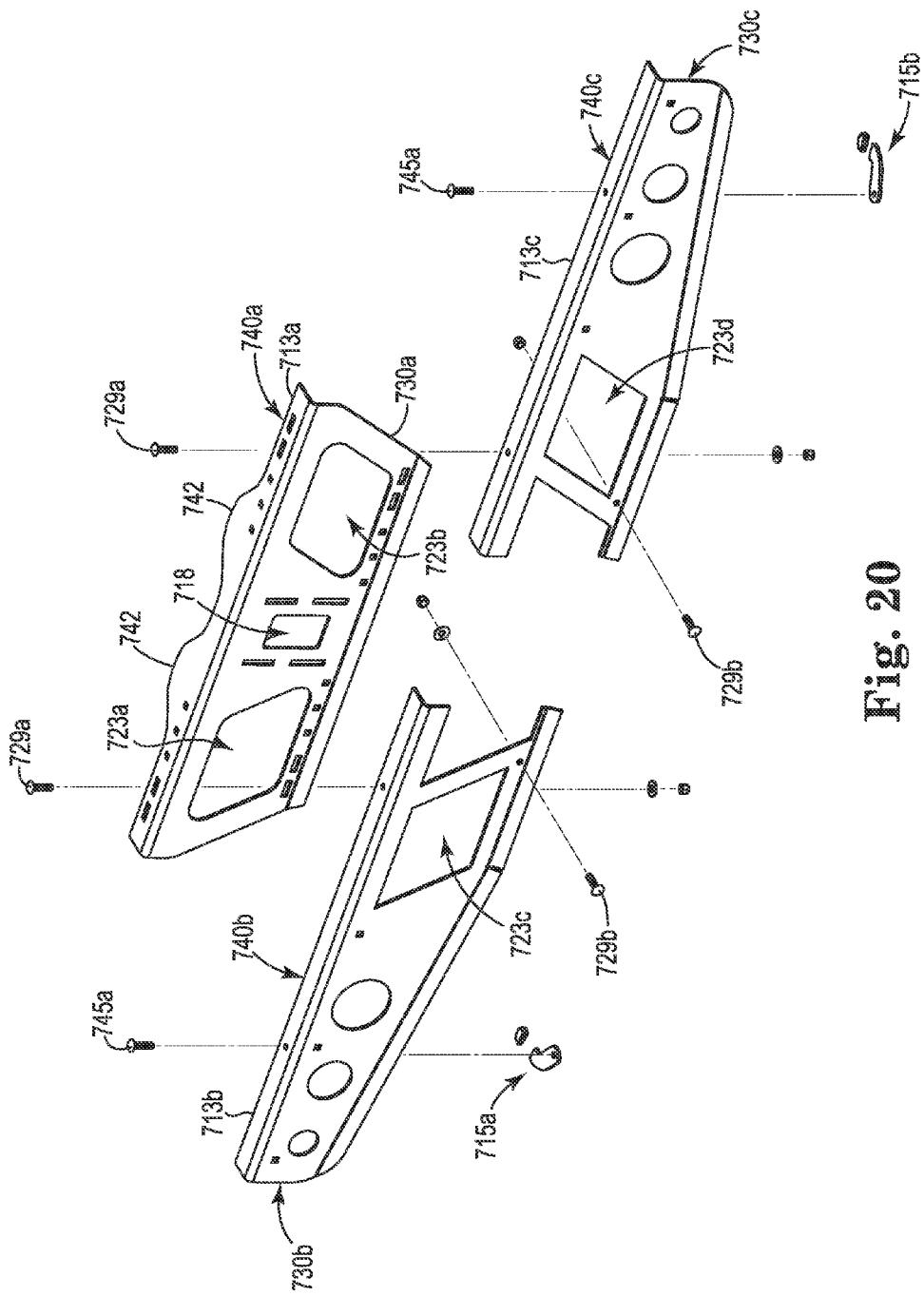
Figure 21:
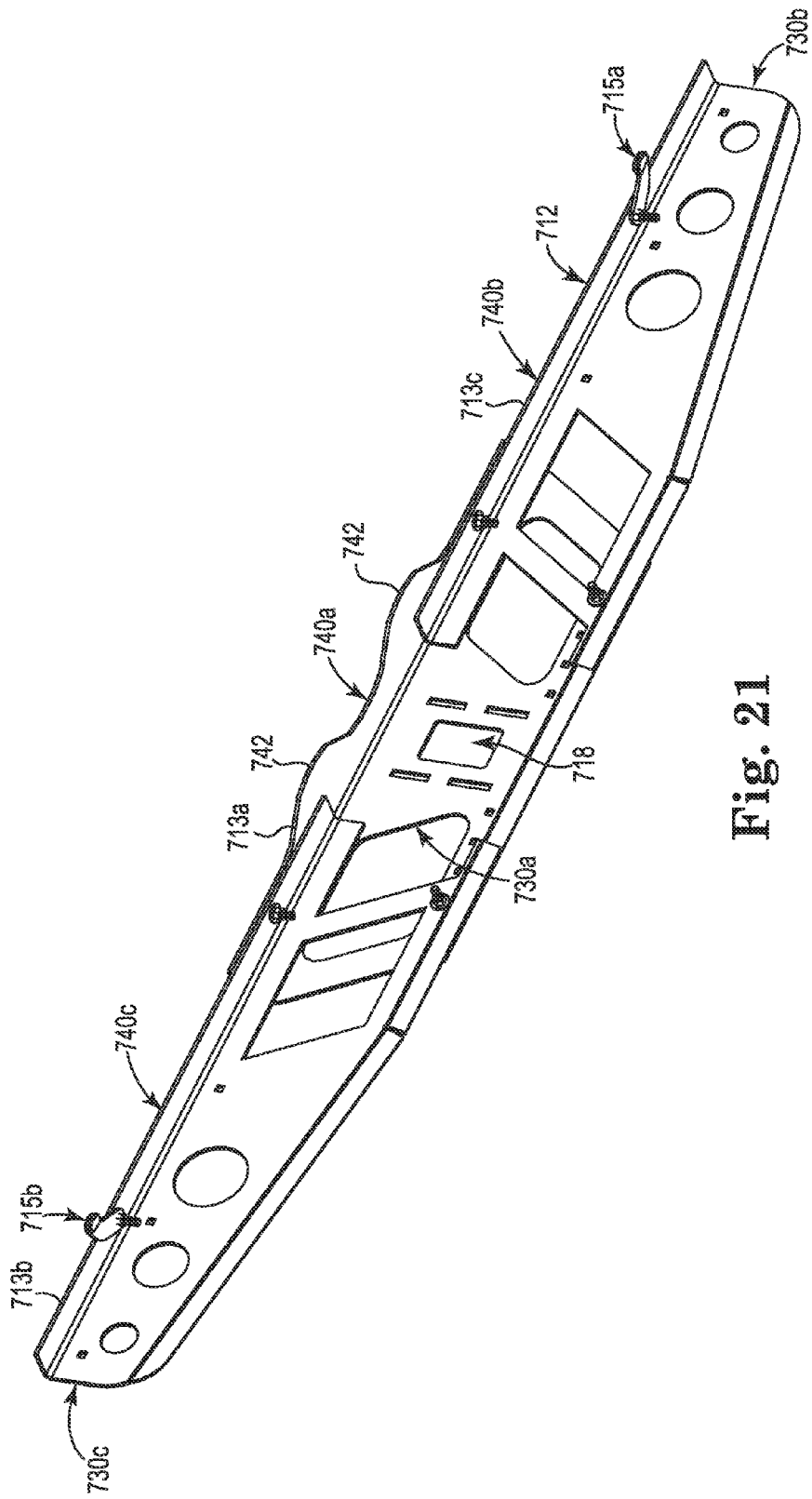
Figure 22:
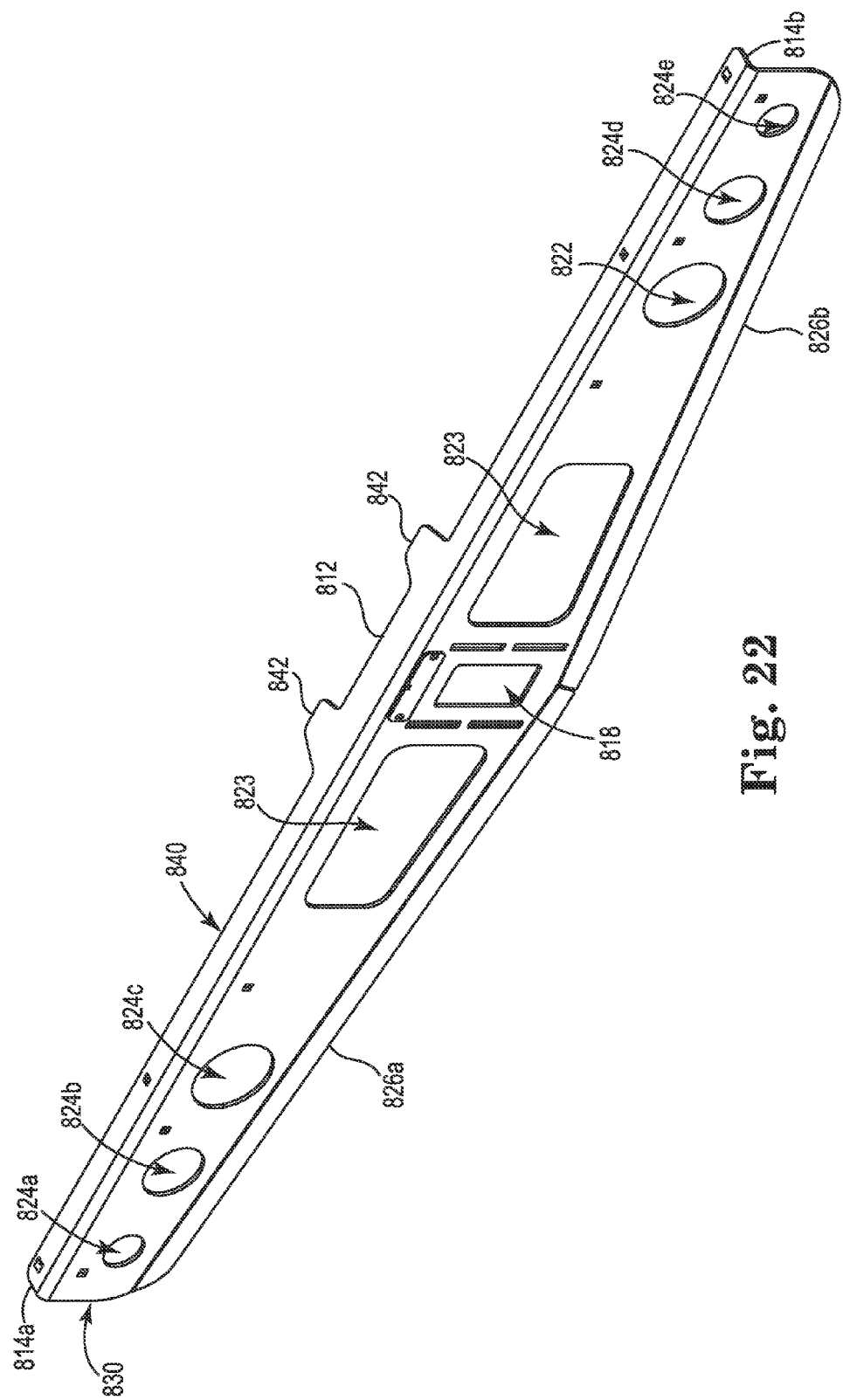

and wherein the fastener elements 521*a*, 521*b*, 521*c* that secure the mounting plate 519 to the frame 512 are shown in exploded view;

FIG. 16B is a front view of the alternate mud flap assembly 510 of FIG. 16A in which the fasteners for securing the mounting plate 519 to the frame 512 have been removed for clarity, but showing the securing assembly 584 secured to the mounting plate 519;

FIG. 16C is a rear perspective view of the alternate mud flap assembly 510 shown in FIGS. 16A-16B; in which the fasteners for securing the mounting plate 519 to the frame 512 have been removed for clarity as in FIG. 16B; showing the flap panels 550*a*, 550*b* and their respective fastener elements 552*a*, 552*b*, 552*c* in exploded view and also showing the elements of the securing assembly 584 in exploded view;

FIG. 16D is a partially exploded, enlarged, partial perspective view of the front of the alternate mud flap assembly 510 of FIGS. 16A-16C, similar to that shown in FIG. 16*b*, but showing the fastener elements 521*a*, 521*b*, 521*c* that are used to secure the mounting plate 519 to the frame 512 when the respective bolts 521*a* pass through respective corresponding apertures 525, 528, in the mounting plate 519 and the frame 512, respectively, so that the respective nuts 521*c* can be threaded onto the respective bolts 521*a* to secure the mounting plate 519 to the frame 512;

FIG. 17 is a rear perspective view of an alternate multi-piece frame 612 that can be used with the other parts of the various mud flap assemblies disclosed herein, wherein the alternate frame includes three separate frame elements 613*a*, 613*b*, 613*c* that are assembled together using a series of fasteners 629;

FIGS. 18A, 18B, 18C, 18D and 18E are rear plan views of an alternate multi-piece frame 712 that is expandable between five different lengths, L1, L2, L3, L4 and L5, respectively, which can be used to provide suitable for the addition of flap panels (not shown) so that the expandable frame can be used to make mud flap assemblies to provide protection for trailers and property hauled on such trailers behind hauling vehicles having a variety of different widths;

FIG. 19 is a rear perspective view of the alternate multi-piece expandable frame 712 as it is shown in FIG. 18D;

FIG. 20 is an exploded, rear perspective view of the alternate multi-piece frame 712 shown in FIG. 19; but showing all of the respective parts separated from one another, with the exception of the nuts and washers (not shown; see in FIG. 15D) for the bolts 745*a* that are needed to secure the respective stop assemblies 715*a*, 715*b* to the respective side portions 713*b*, 713*c* of the multi-piece frame 712;

FIG. 21 is a front perspective view of the alternate multi-piece frame 712 shown in FIGS. 18D and 19, as seen from below and in front of the frame 712; and FIG. 22 is a rear perspective view of a further alternate frame 812.

DETAILED DESCRIPTION OF THE PREFERRED EMBODIMENTS

Referring now to the drawings, the mud flap assemblies 10, 110, 210, 410, 510 disclosed herein can be secured to a hitch assembly 70, which can be secured to a hitch receiver 76 at the rear of a vehicle V, proximate the rear bumper B, to protect an apparatus being towed by the vehicle from being damaged due to rocks, debris and mud kicked up from under the rear tires of the vehicle. Preferred embodiments are configured to be easily removed and reinstalled, as needed.

Figure 1:
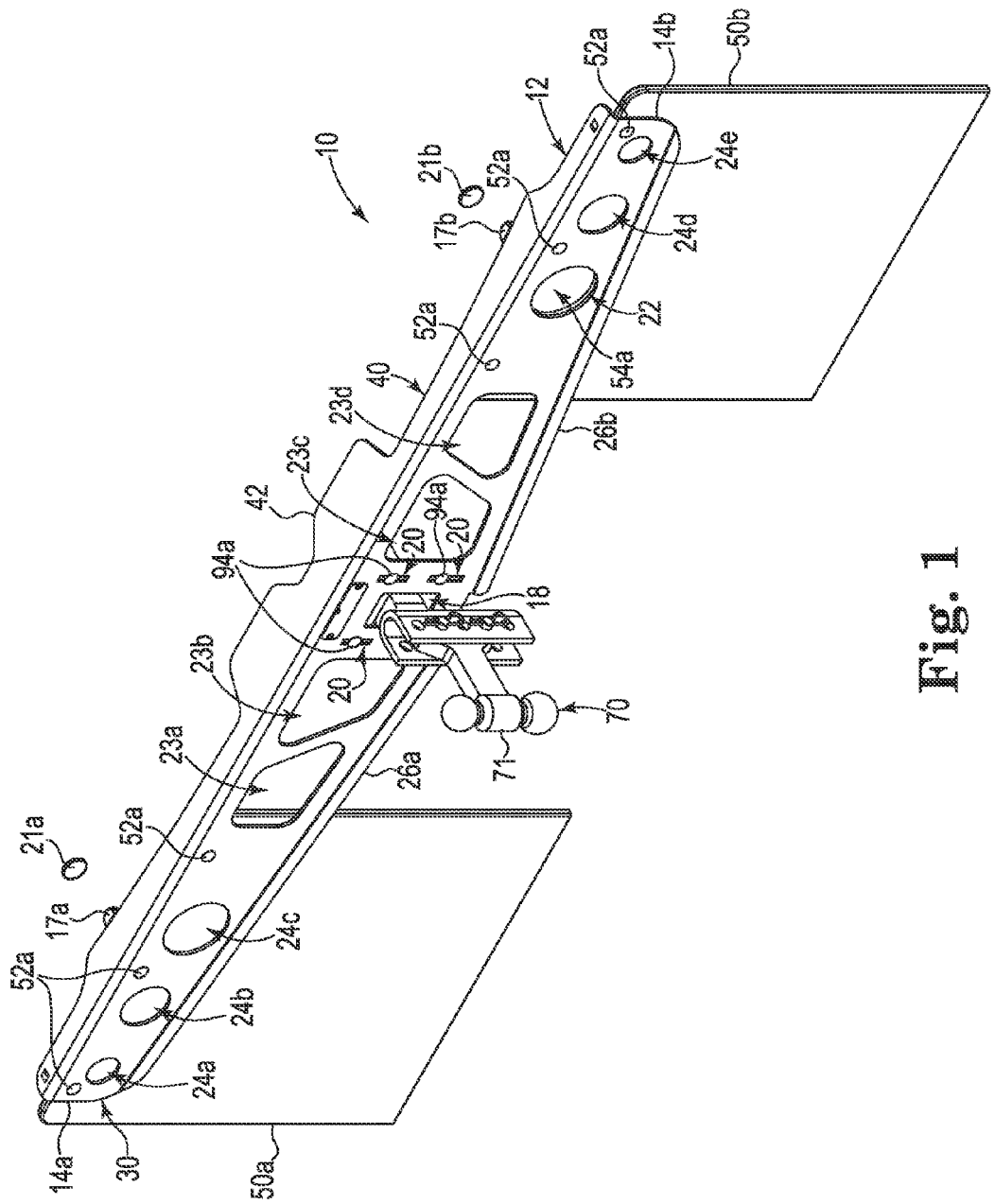
FIG. 1 is a rear perspective view of one preferred mud flap assembly 10 including a frame 12, a securing assembly 84 and two flap panels 50a, 50b secured to and extending downwardly from the frame 12; the frame 12 is attached to a hitch assembly 70 and showing protective pieces 21a, 21b, respectively, exploded away from respective stop assemblies 15a, 15b with which the respective protective pieces 21a, 21b would be engaged if the protective pieces 21a, 21b were attached to a bumper of a vehicle (not shown) and if the mud flap assembly 10 was secured to such a vehicle as shown in FIGS. 3A, 4 and 5.

Preferred mud flap assemblies 10, 110, 210, 410, 510 are designed to be attached to a hitch assembly 70 preferably having a ball mount 71 and then to a vehicle V having a rear bumper B and a hitch receiver 76 proximate the rear bumper B. With many vehicles, the rear bumper B has a step or a top surface S and the hitch assembly will preferably have a shaft or hitch tongue 72, which is preferably interconnected to the ball mount 71 for engagement with the hitch receiver 76. The preferred mud flap assemblies 10, 110, 210, 410, 510 preferably include a frame 12, 112, 212, 312, 412, 512, a securing bracket or securing assembly 84, 284, 484, 584 and two mud flap panels 50*a*, 50*b*, 150*a*, 150*b*, 250*a*, 250*b*, 450*a*, 450*b*, 550*a*, 550*b*. The frame 12, 112, 212, 312, 412, 512, 612, 712 preferably has two longitudinal ends 14*a*, 14*b*, 114*a*, 114*b*, 214*a*, 214*b*, 313*a*, 314*b*, 414*a*, 414*b*, 514*a*, 514*b*, 614*a*, 614*b*, 714*a*, 714*b*, a rear plate 30, 130, 230, 330, 430, 530, 630*a*, 630*b*, 630*c*, 730*a*, 730*b*, 730*c* and a top plate 40, 140, 240, 340, 440, 540, 640*a*, 640*b*, 640*c*, 740*a*, 740*b*, 740*c*, wherein the top plate is generally oriented perpendicularly to the rear plate. In preferred embodiments, as shown in FIG. 1, for example, and in FIGS. 9, 10, 17, 19 and 22, the top plate 40, 140, 640, 740, 840 preferably includes a pair of side by side support flanges 42, 142, 642, 742, 842 which extend away from the rear plate 30, 130, 630, 740, 840 toward the vehicle V, to a greater degree than other portions of the frame 12, 112, 612, 712, 812 when the frame 12, 112, 612, 712, 812 is secured to the vehicle V. As shown if FIGS. 3A, 4 and 5, the support flanges are designed to rest upon a shelf S of a bumper B of certain vehicles. When the support flanges rest upon the shelf S the frame 12, 112, 612, 712, 812 will be engaged with the bumper B and will act to stabilize the frame and the respective mud flap assembly against the bumper B so that the frame will not shake or vibrate independently of the vehicle as much as it would if the support flanges were not in contact with the bumper B. This enhances the wear life of the frame and anchors the frame the vehicle in such a way that a greater amount of weight can be place on the top plate when the mud flap assembly is in use. In preferred embodiments, as shown if FIGS. 12, 13A and 13B, for example, support flanges 242*a*, 242*b* are not part of the frame 212, but are instead separate pieces that are preferably secured to the fame 212 with a series of connectors such as the bolts 245*a*, 245*b*, washers 245*c*, 245*d*, 245*e*, 245*f* and nuts, preferably self locking nuts, 245*g*, 245*h*. These separate support flange pieces are preferably of two types, a single flat piece or a flange 242*a* that is connected to the frame 212 by a bolt 245*b* passing through one of several openings 241 in the top plate 240, so that the support flange piece 242*a* can be moved from place to place along the top plate 240 where such openings 241 reside and are therefore adjustable and repositionable, and a single angled piece 242*b* that has a bottom portion 242*d* that preferably extends vertically away from top portion 242*c* generally at a right angle that is inherent in the structure. The top portion 242*c* of the angled piece 242*b* is generally flat and its position with respect to the top plate 230 is adjustable because it is preferably secured to the frame 212 by a bolt 245*a* that preferably extends through a slot or aperture 234 in the rear plate 230 of the frame 212 (see FIG. 12) and then through one of two openings 244*a*, 244*b* in the bottom portion 242*d* of the angled piece 242*b*, so a nut 245*h* can be tightly secured to the bolt 245*a* to secure the bottom portion 242*d* of the angled piece 242*b* tightly against the rear plate 230, and further so that the angled piece 242*b* cannot slide against the rear plate 230 and the bolt 245*a* is unable to slide within the slot 234. It will be appreciated that because the nut 245*h* can be loosened so as to allow the bolt 245*a* to slide up or down within the confines of the edges of the slot 234, the angled piece 242*b* is adjustably attached to the frame 212. Furthermore, because the bottom portion 242*d* has an upper opening 244*a* and a lower opening 244b, the angled piece 242b can be further repositioned by selecting one opening or the other for passage of the bolt 245a prior to tightening the nut 245h to secure the angled piece 242b against the rear plate 230 of the frame 212. As such, the support flanges 242a, 242b can be positioned to rest upon the shelf S of the bumper B and will act to stabilize the frame and the respective mud flap assembly against the bumper B so that the frame will not shake or vibrate independently of the vehicle as much as it would if the support flanges were not in contact with the bumper B.

Each of the respective mud flap panels 50a, 50b, 150a, 150b, 250a, 250b, 450a, 450b, 550a, 550b can be secured to any frame 12, 112, 212, 312, 412, 512, 612, 712, 812 proximate respective longitudinal ends 14a, 14b, 114a, 114b, 214a, 214b, 313a, 314b, 414a, 414b, 514a, 514b, 612a, 614b, 714a, 714b, 814a, 814b of the respective frame 12, 112, 212, 312, 412, 512, 612, 712, 812. In one preferred embodiment, as illustrated in FIGS. 1-10, for example, the hitch assembly 70 can be adjustably secured to the frame 12 by the securing assembly 84 such that when the hitch tongue 72 is engaged with the hitch receiver 76 to provide a first point of contact with the vehicle V, the support flanges 42 of the top plate 40 can engage or rest upon an upper surface S of the rear bumper B to give the mud flap assembly 10 a second and a third point of contact with the vehicle V.

Figure 12:
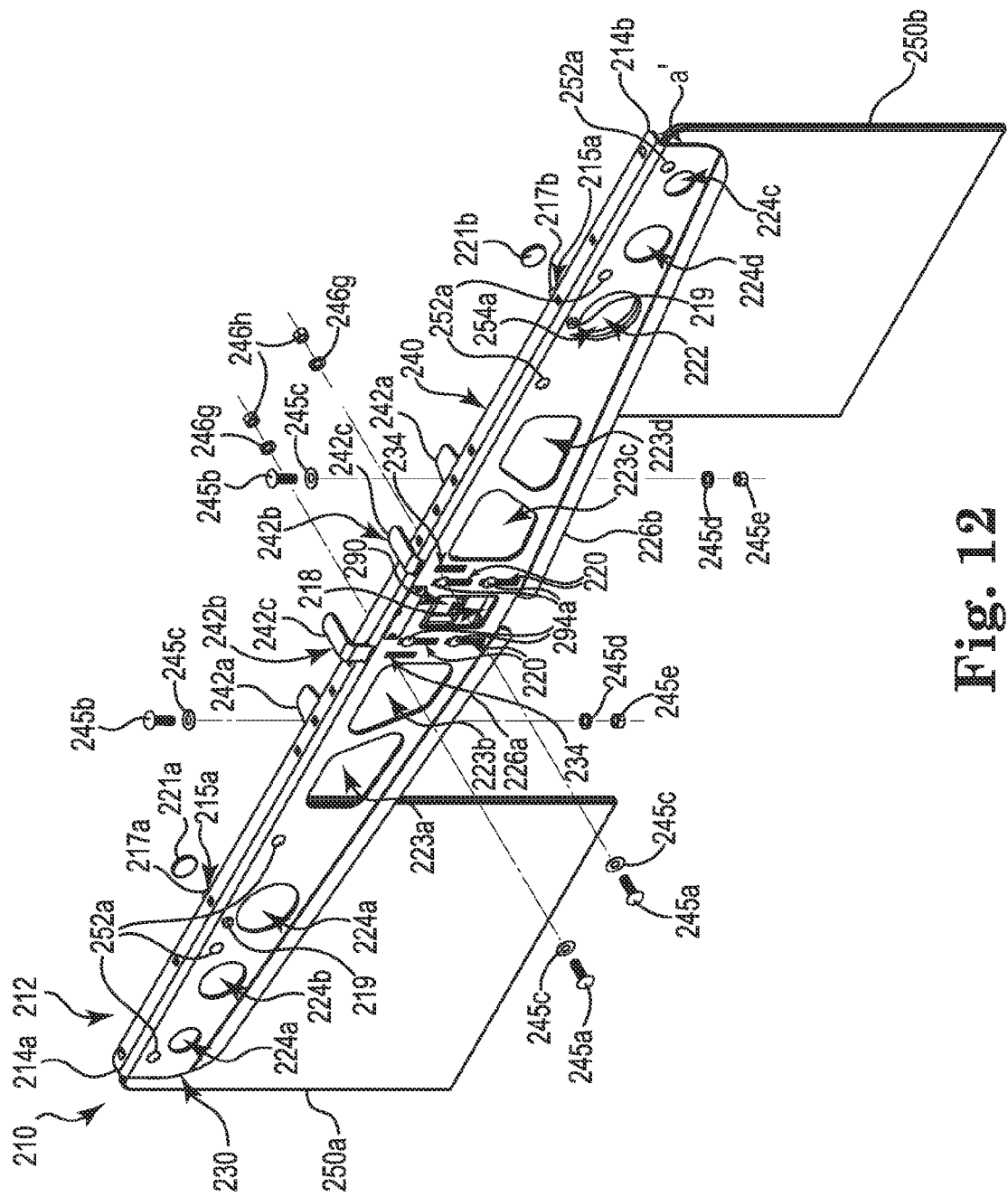
FIG. 12 is a partially exploded, rear perspective view of a further alternate embodiment of a mud flap assembly 210 having a universal frame 212, to which adjustable support flanges 242*a*, 242*b* are attached and stop assemblies 215*a*, 215*b* are secured by bolts 219.
Figure 13A:
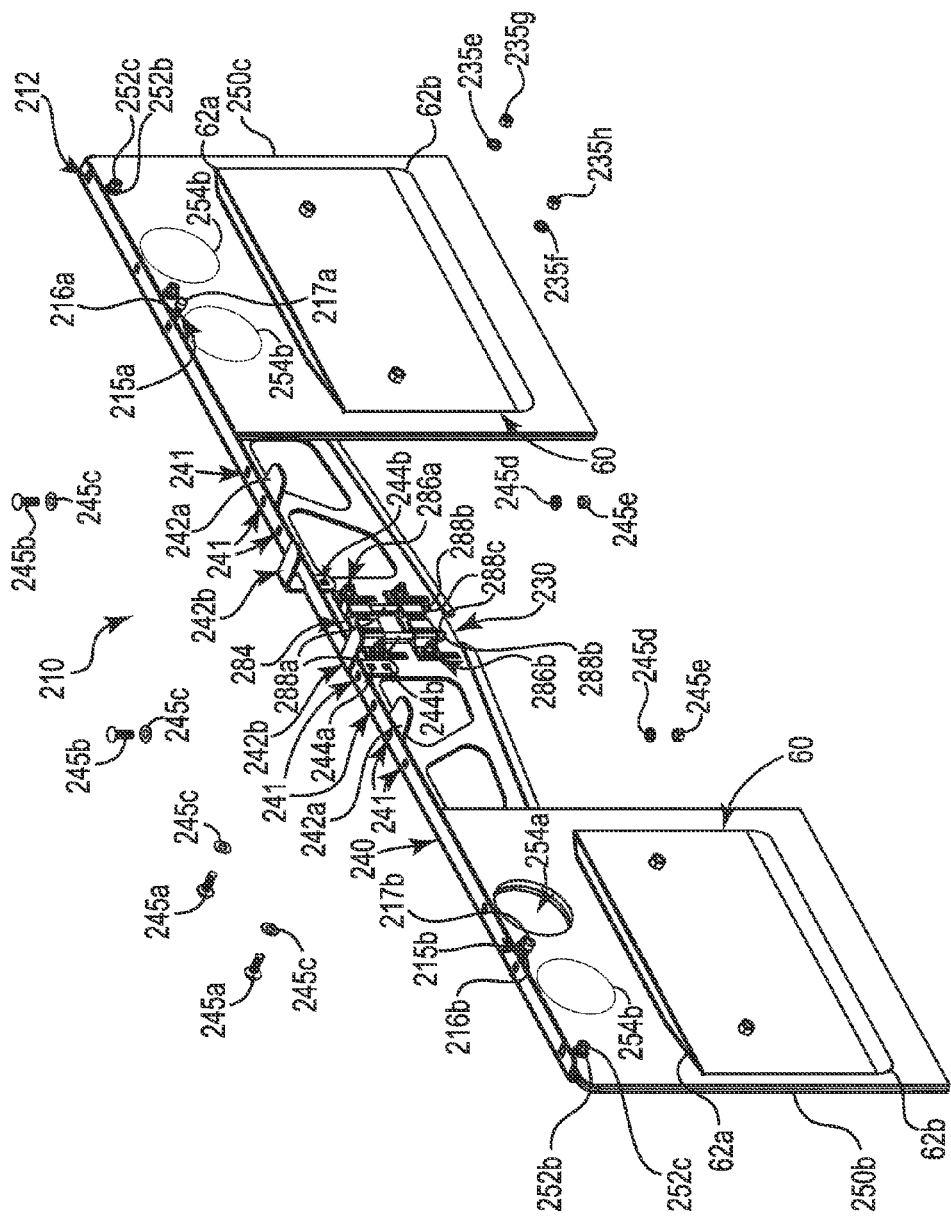
FIG. 13A is a partially exploded, front perspective view of the alternate mud flap assembly 210 of FIG. 12, including heat shields 60, such as shown in FIG. 11, but being bolted to the respective flap panels 250*a*, 250*b*.
Figure 13B:
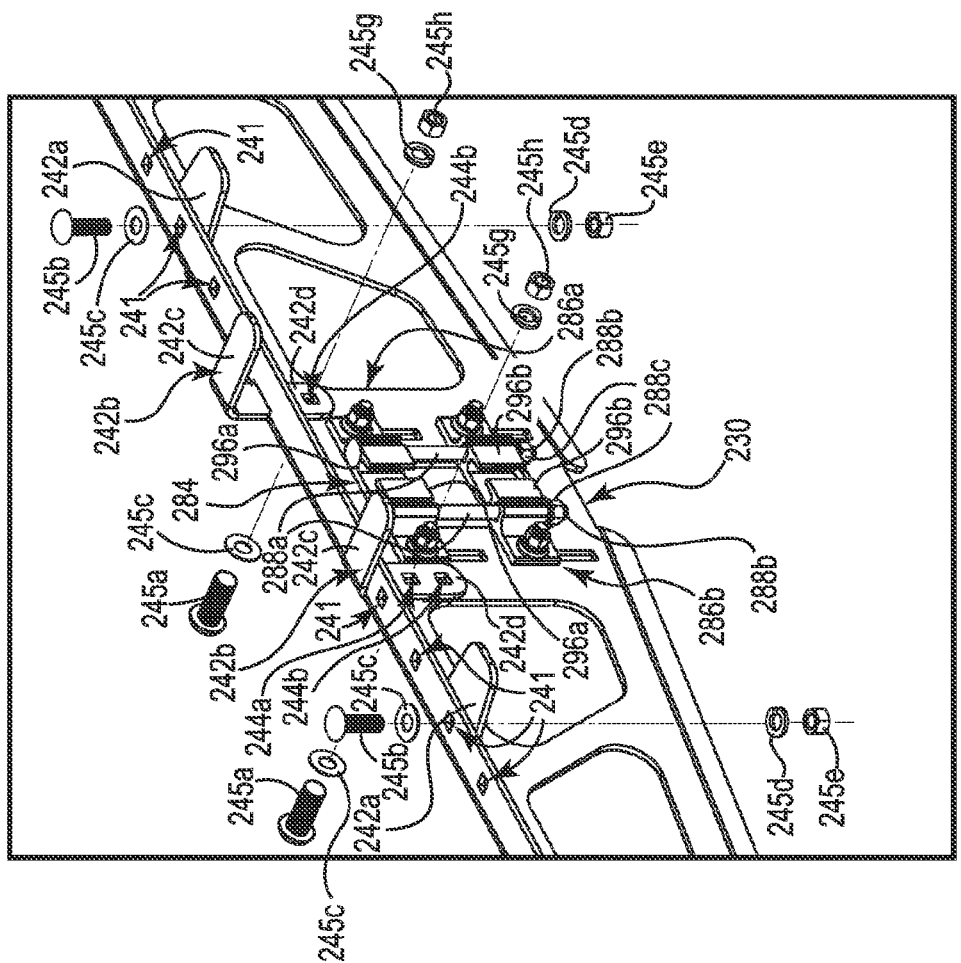
FIG. 13B is a partial perspective view of the front of the alternate mud flap assembly 210 of FIG. 13A, providing a partially exploded view of the alternate fasteners used to secure the alternate, adjustable support flange elements 242*a*, 242*b*.
Figure 14A:
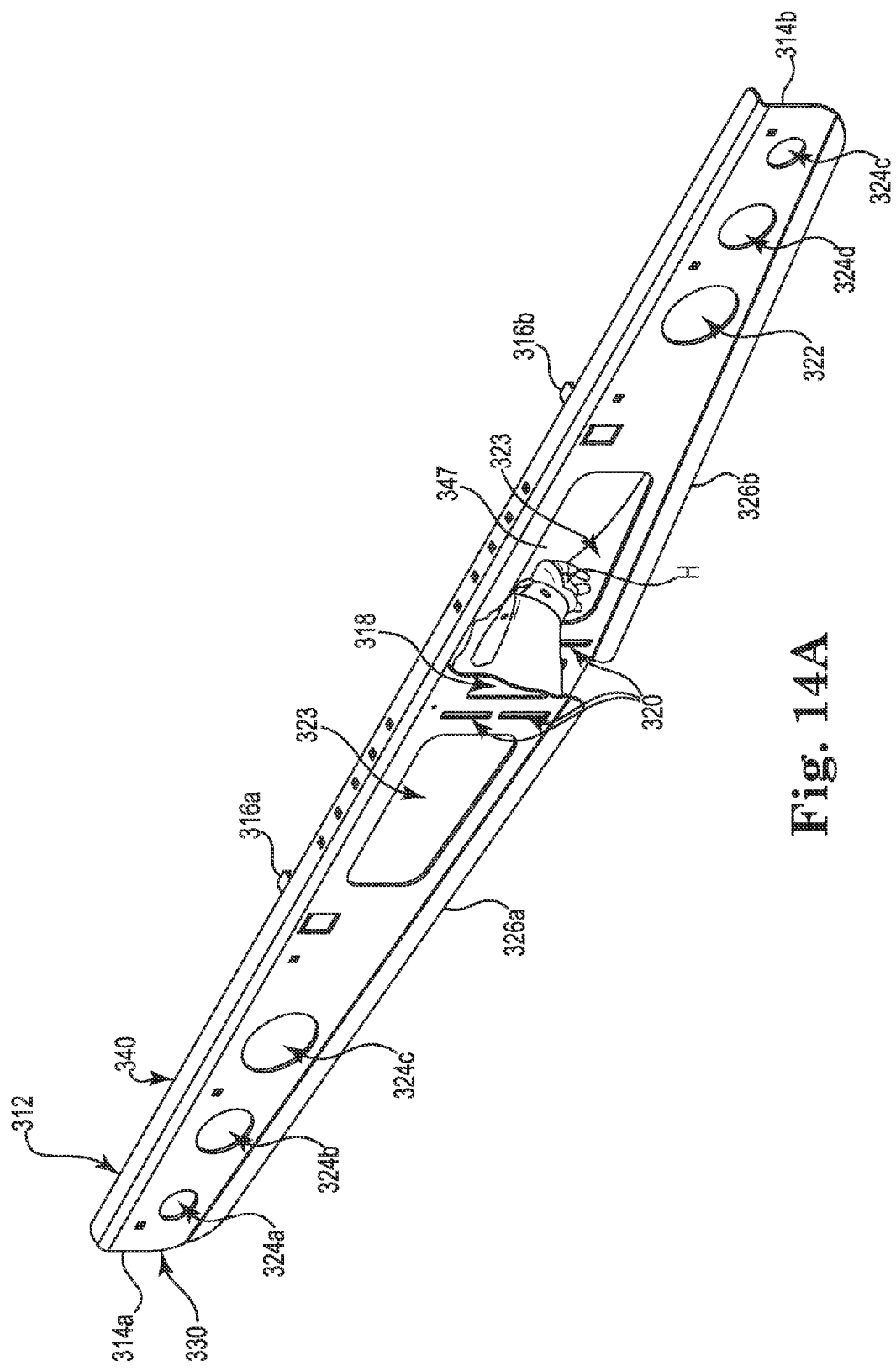
Figure 14B:
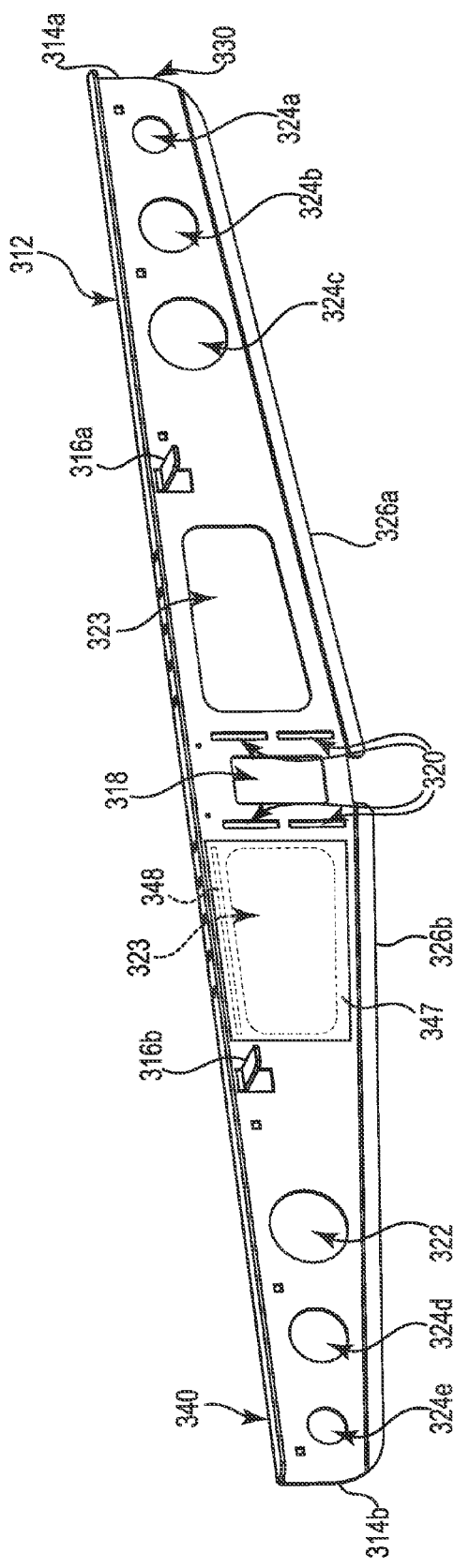
FIG. 14B is a front perspective view of the frame of FIG. 14A, showing the flexible flap 347 that covers one of the front of one of the access openings 323 (shown in phantom) that is covered by the flexible flap 347 that is preferably secured to the front of the frame 312 by a strip of adhesive material 348 that is also shown in phantom.

Preferred mud flap assemblies 10, 110, 210, 410 of the present invention, shown in FIGS. 1-10, 12-13B and 15A-15D each preferably include a pair of stop assemblies 15a, 15b, 115a, 115b, 215a, 215b, 415a, 415b, and each of the frames 312, 612 shown in FIGS. 14A-14B and 17 also include a pair of stop assemblies 315a, 315b, 615a, 615b. Each of the stop assemblies include a stop 16a, 16b, 116a, 116b, 216a, 216b, 316a, 316b, 416a, 416b, 616a, 616b, a bumper cap 17a, 17b, 117a, 117b, 217a, 217b, 317a, 317b, 417a, 417b, 617a, 617b and, in further preferred embodiments, a protective piece 21a, 21b, 121a, 121b, 221a, 221b, 321a, 321b, 421a, 421b, 621a, 621b is also provided that is placed on the vehicle bumper B proximate a place where the owner projects the bumper cap covering the stop will engage the bumper B when the stop and the bumper cap are pressed up against the bumper when the mud flap assembly is secured to the vehicle V in order to protect the bumper from abrasion at the point of contact. The stops 16a, 16b, 116a, 116b, 316a, 316b, 616a, 616b shown in FIGS. 1-10, 14A-14B and 17 are a part of the respective frame 12, 112, 312 and 612, and the stop assemblies 215a, 215b, 415a, 415b shown in FIGS. 12-13B and 15A-15D are attached to the respective frames 212, 412 using connectors of one kind or another. The stop assemblies 215a, 215b shown in FIGS. 12-13B are secured to a universal frame 212 using a bolt 219. The stop assemblies 415a, 415b shown in FIGS. 15A-15D are pivotally attached to a universal frame 412 by bolts 445a that pass through an aperture 441 in the top plate 440 of the frame 412 and an opening 419 in the pivotal stop 416 before a nut 445d is threaded on to the bolt 445a to secure the stop assembly 415a, 415b to the top plate 440 of the frame 412. When the universal frame 412 is secured to the vehicle V and the respective pivotal stop assemblies 415a, 415b are pivotally secured to the frame 412, the pivotal stop assemblies 415a, 415b can be adjusted so as to pivot the stop assembly 415a, 415b with respect to the top plate 440 of the frame 412 to engage the bumper cap 417a, 417b covering the stop 416a, 416b with the bumper B of the vehicle V to further stabilize the mud flap assembly 410 with respect to the bumper B. When the pivotal stop assemblies 415a, 415b is adjusted so as to pivot the stop assembly 415a, 415b toward the bumper B so as to engage the bumper cap 417a, 417b covering the stop 416a, 416b with the bumper B the nut 445d can be tightened against the stop assembly 415a, 415b so as to place a tension on the bumper B between the bumper cap 417a, 417b and the bumper B.

The preferred mud flap assemblies 10, 110, 210, 310, 410, 610 of the present invention shown in FIGS. 1-8, 9-10A, 12-13B and 15A-15E, each include a pair of stop assemblies 15a, 15b, 115a, 115b, 215a, 215b, 315a, 315b, 415a, 415b. When the frames 12, 112, 212, 312, 412, 512 are operatively installed on the vehicle V, the stop assemblies 15a, 15b, 115a, 115b, 215a, 215b, 315a, 315b, 415a, 415b are pressed against a rear surface R of the bumper B to further stabilize the mud flap assembly 10, 110, 210, 410 against the vehicle V. The position of the stop assemblies 415a, 415b, may be adjusted to accommodate many types of vehicles V as will be discussed further below. Although a pair of stop assemblies are preferably provided with each frame, if is contemplated that mud flap assemblies of the present invention may have from zero to three or more stop assemblies located in various different positions with respect to the frame in order to accommodate the various shapes and sizes of the variety of different vehicle bumper types.

FIGS. 1-8 illustrate one preferred mud flap assembly 10. The mud flap assembly 10 preferably includes a frame 12 having first and second ends 14a, 14b that generally span a bumper B of a vehicle V (partially shown) (see, for example, FIG. 3A). The frame 12 is preferably made of extruded aluminum and includes one or more access openings 23a, 23b, 23c, 23d to provide access to hitch wiring, safety chain and hitch receiver (not shown). It will be understood that the access openings 23a, 23b, 23c, 23d can be of many shapes sizes and configurations. The frame 12 preferably includes a rear plate 30 and a top plate 40. Preferably the rear plate 30 and the top plate 40 are generally reside in separate planes that are generally perpendicular to one another that meet at an angle (a) of about 90 degrees. In this embodiment, the top plate 40 includes a support flange 42 that is arranged and configured to sit upon the step S of the bumper B. By having the support flange 42 sit upon the bumper B when operatively installed, at least one contact point is formed between the mud flap assembly 10 and the bumper B, which stabilizes the mud flap assembly 10. The frame 12 preferably further includes at least one stop assembly 15a, 15b extending from the frame 12. Each stop assembly 15a, 15b preferably includes a stop 16a, 16b and a bumper cap 17a, 17b. The stop assemblies provide the respective mud flap assemblies with additional points of contact with the bumper B of the vehicle V to further stabilize the mud flap assemblies with respect to the vehicle V.

At first and second ends 14a, 14b of the frame 12, proximate the tires of the vehicle (not shown); flap panels 50a, 50b are secured to and extend downwardly from the frame 12. The flap panels 50a, 50b generally block dirt, debris or rocks kicked-up by the tires from damaging the apparatus being towed by the vehicle V via the hitch assembly 70. Flap panels 50a, 50b disclosed herein are preferably made of flexible material such as masticated rubber or the like. Preferably, the flap panels 50a, 50b are secured to the frame 12 with nuts 52a, bolts 52b and washers 52c.

To further protect the apparatus being towed (not shown) by the mud flap assembly 10, preferred frames 12 will be configured such that the top plate 40 generally mirrors the curvature of the bumper B to minimize the space between the top plate 40 and the bumper B such that rocks and other debris (not shown) cannot easily escape upwardly from the mud flap assembly 10.

Preferred mud flap assemblies 10 further include at least one stop 16a, 16b proximate each end 14a, 14b of the frame 12. Each stop 16a, 16b is arranged and configured to provide another contact point between the mud flap assembly 10 and the bumper B of the vehicle V. In preferred embodiments, each stop 16a, 16b is arranged and configured such that when the stop 16a, 16b contacts the bumper B and the hitch tongue 72 is inserted within a hitch receiver opening 77 of the hitch receiver 76, hitch tongue 72 apertures 74 and hitch receiver 76 apertures 78 are aligned. It is believed that such a configuration provides faster and easier installation of the mud flap assembly 10. Optionally, the mud flap assembly 10 can also include a protective piece 21a, 21b that can be securable to the bumper B such that each stop 16a, 16b contacts one respective protective piece 21a, 21b and prevents and marring or potential damage to the bumper B due to contact with the respective bumper cap 17a, 17b. The protective piece 21a, 21b can be vinyl static-cling material, an adhesive sticker or the like.

Preferred mud flap assemblies 10 are adjustable so that they can accommodate many types of vehicles and hitch assembly 70 configurations. In preferred embodiments, the frame 12 includes a hitch opening 18 and four slots 20 proximate the hitch opening 18. Referring now also to FIGS. 2C-2F, a securing assembly or securement bracket 84 is preferably used to connect the hitch tongue 72 to the frame 12. Preferred securing assemblies 84 include two clamp halves 86a, 86b interconnected by two long bolts, preferably long carriage bolts 88a, and corresponding nuts 88b and washers 88c used to secure the respective clamp halves 86a, 86b together to form a central clamp opening 90 for receiving the hitch tongue 72. The securing assembly 84 will also include four small bolts 94a; preferably small carriage bolts 94a to secure the respective clamp halves 86a, 86b to the frame 12. The clamp halves 86a, 86b are preferably secured to the frame 12 by inserting the respective small carriage bolts 94a through the respective slots 20 in the frame 12 and through small bolt receiving openings 87 in each of the respective sides of the respective clamp halves 86a, 86b and nuts 94b and washers 94c are preferably used to secure the small bolts 94a to the clamp halves 86a, 86b and the frame 12. The small carriage bolts 94a, 94b have a squared off shank portion (not shown), similar to a squared off shank portion 88a" below the head 88a' of the preferred long carriage bolts 88a, so that the nuts 94b can be easily tightened against the respective clamp half 86a, 86b with a single wrench when the squared off shank portion resides within the respective slot 20.

The two long carriage bolts 88a are used to secure the respective clamp halves 86a, 86b to one another on opposite sides of a hitch tongue 72, when the securing assembly 84 is secured to the hitch tongue 72. The respective clamp halves 86a, 86b are preferably pieces cut from an aluminum extrusion (not shown). The aluminum extrusion is preferably a 20 foot extrusion and the piece are preferably cut from the extrusion with a band saw in widths of from about 1.0 to about 1.5 inches, preferably about 1.25 inches, to create side surfaces 97 above and below three channels 89, 91, 89 in each of the respective clamp halves 86a, 86b. Each clamp half 86a, 86b will preferably have a left side 86a', 86b' and a right side 86a", 86b" that are mirror images of one another and each of the respective sides 86a', 86b', 86a", 86b" will each preferably include an aperture 87 for receiving the short carriage bolts 94a, so that the short carriage bolts 94a can secure the respective clamp halves 86a, 86b to the frame 12. In preferred embodiments the apertures 87 will be machined, stamped or punched, preferably punched into the respective clamp halves 86a, 86b. Each side 86a', 86b', 86a", 86b" will preferably have a long carriage bolt receiving opening 89, preferably a channel 89 that extends from one side surface 97 of the respective clamp half 86a, 86b to another. The long carriage bolt receiving opening channel 89 will preferably have a cross-sectional shape that is generally square so as to receive the shank portion 88a" of the long carriage bolts 88a, so that the nuts 88b can be easily tightened against the respective clamp half 86a, 86b with a single wrench when the squared off shank portion 88a" resides within the respective channel 89. Each of the respective clamp halves 86a, 86b preferably have a central channel 91 at least partial defined by a flange 96a, 96b. The respective flanges 96a, 96b extend upward from the base of each of the respective clamp halves 86a, 86b expanding the area of the respective side surfaces 97, adjacent to the respective long carriage bolt receiving channels 89, against which the heads 88a' of the long carriage bolts 88a and the washers 88c and/or nuts 88b that secure the respective long carriage bolts 88a to the respective clamp halves 86a, 86b, will press when the securing assembly 84 is secured to the hitch tongue 72. This extended surface area is believed to reduce the stress that is placed upon the respective long carriage bolts 88a when the securing assembly 84 is secured to the hitch tongue 72. It will be appreciated that the respective channels 89, 91, 89 allow the die (not shown) used to make the aluminum extrusion (not shown) from which the respective clamp halves 86a, 86b are cut, to be simplified, which greatly reduces to cost of production for the respective clamp halves 86a, 86b. Creating channels as opposed to machining a channel or an aperture from top to bottom in the respective side surfaces 97 of each of the respective clamp halves 86a, 86b is believed to significantly reduce to cost per piece of the respective clamp halves.

The clamp halves 86a, 86b are secured to the frame 12 with short carriage bolts 94a with nuts 94b and washers 94c. The short carriage bolts 94a pass through slots 20 in the frame 12 and apertures 87 in the clamp halves 86a, 86b (see, for example, FIGS. 1, 2A-2D). Preferably, the slots 20 provide for adjustable placement of the short carriage bolts 94a or the like to accommodate various hitch assembly 70 sizes and to permit the securing assembly 84 to be adjustably oriented vertically with respect to the frame and the frame with respect to the bumper B and the vehicle V.

The frame 12 also preferably comprises at least one exhaust opening 22 that is aligned with a corresponding aperture 54a in the respective flap panel 50b. Each flap panel 50a, 50b may include one or more outlines 54b for a user to trace and cut an aperture 54a in the flap panel 50b, if desired. It is noted that there is no outline proximate 54a, because the exhaust aperture 54a has already been cut where the outline would be located. The outline may be formed by a marking, scored edge or the like. The exhaust openings in the frame 12 and exhaust opening 54a respective flap panel 50a, 50b are preferably aligned proximate the vehicle exhaust pipe P so that the mud flap assembly 10 allows for suitable ventilation of hot exhaust away from the vehicle V. Such an exhaust opening 22 is particularly beneficial for models of trucks, such as the Dodge 1500 model truck, which includes an exhaust pipe that would be located close to the flap panel 50b. The frame 12 may also include decorative apertures 24a, 24b, 24c 24d, 24e textures or designs, as desired.

In preferred embodiments, the frame 12 further includes a bent lip 26a, 26b proximate the flap panels 50a, 50b, which allows the respective flap panels 50a, 50b to flex upwardly as the vehicle moves forward and air resistance pushes the bottoms of the respective flap panels away from the vehicle when the mud flap assembly 10 is secured to the vehicle. The bent lips 26a, 26b also provide greater strength to the respective rear plates 30a, 30b to resist horizontal deformation. Corresponding bent lips 126a, 126b, 226a, 226b, 326a, 326b, 426a, 426*b*, 526*a*, 526*b*, 626*a*, 626*b*, 726*a*, 726*b*, 826*a*, 826*b* are also provided in each of the other respective embodiments described below.

Figure 9:
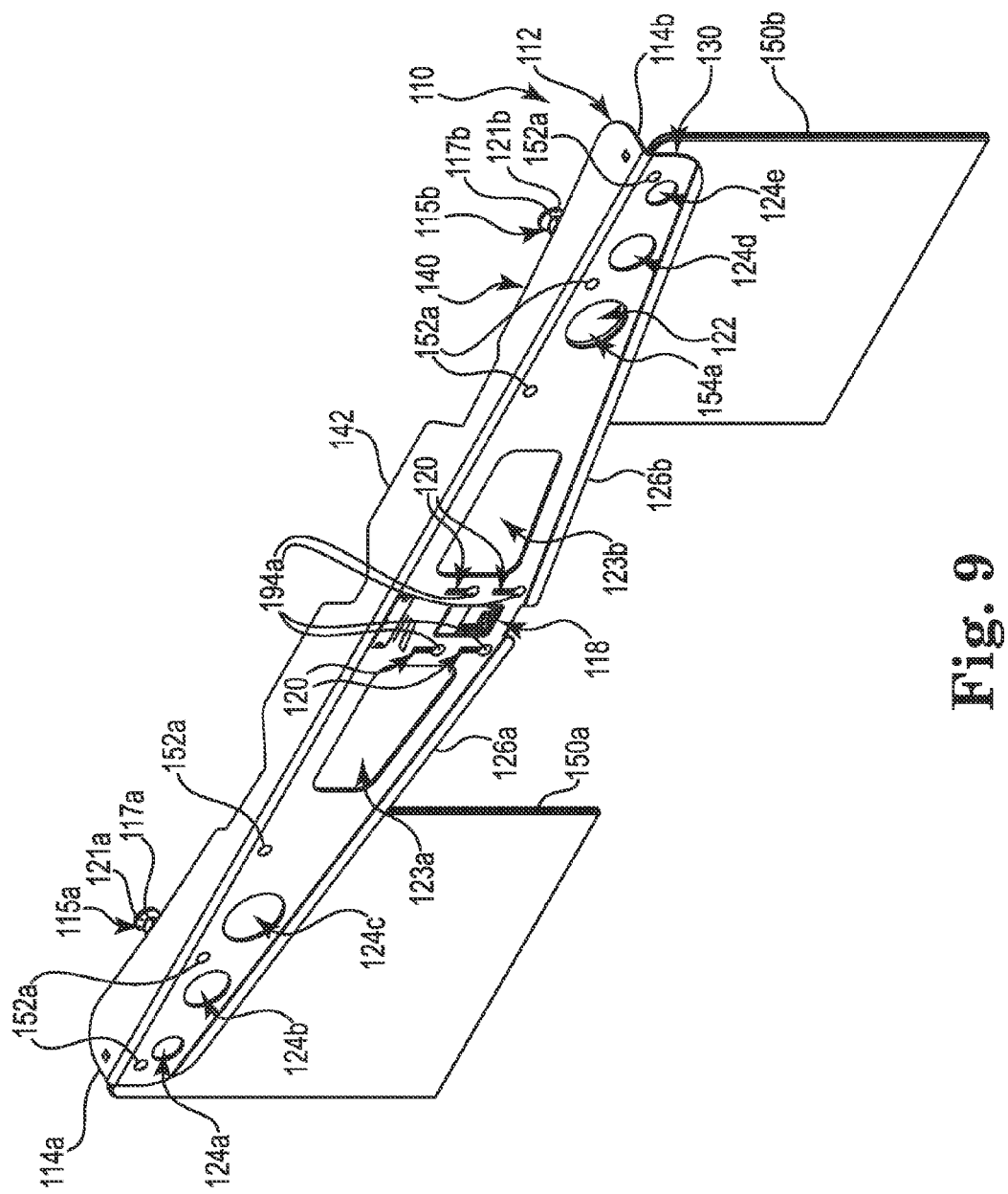
FIG. 9 is a rear perspective view of an alternate mud flap assembly 110, largely similar to the mud flap assembly 10 shown in FIG. 1, but having enlarged access openings 123*a*, 123*b* and showing the respective stop assemblies 115*a*, 115*b* engaged with protective pieces 121*a*, 121*b*, respectively, as they would be if the protective pieces 121*a*, 121*b* were attached to a bumper of a vehicle (not shown), if the alternate mud flap assembly was secured to such a vehicle.

One alternate mud flap assembly 110 is illustrated in FIGS. 9-10A. As can be seen, the mud flap assembly 110 includes most of the same elements of the mud flap assembly 10 of FIGS. 1-8, but has an alternate frame 12 design including two access openings 123*a*, 123*b* on either side of a hitch opening 118. It is noted that the access openings 123*a*, 123*b* can be of many shapes and sizes and that such shapes and sizes. As can be seen, mud flap assembly 110 includes a frame 112 having a first end 114*a*, a second end 114*b*, a rear plate 130 and a top plate 140 having a support flange 142. Extending from the rear plate 130 are preferably at least one stop assembly 115*a*, 115*b* having bumper caps 117*a*, 117*b*. The frame 112 may also include a hitch opening 118, slots 120, decorative apertures 124*a*, 124*b* 124*c* 124*d*, 124*d*, 124*e* and at least one exhaust opening 122. The frame 112 can be secured to flap panels 150*a*, 150*b* with fasteners 152*b* or the like. The mud flap assembly 110 can be secured to a hitch assembly 70 with a securing assembly 84 or the like (see also, for example, FIG. 4 and related disclosure).

Figure 10B:
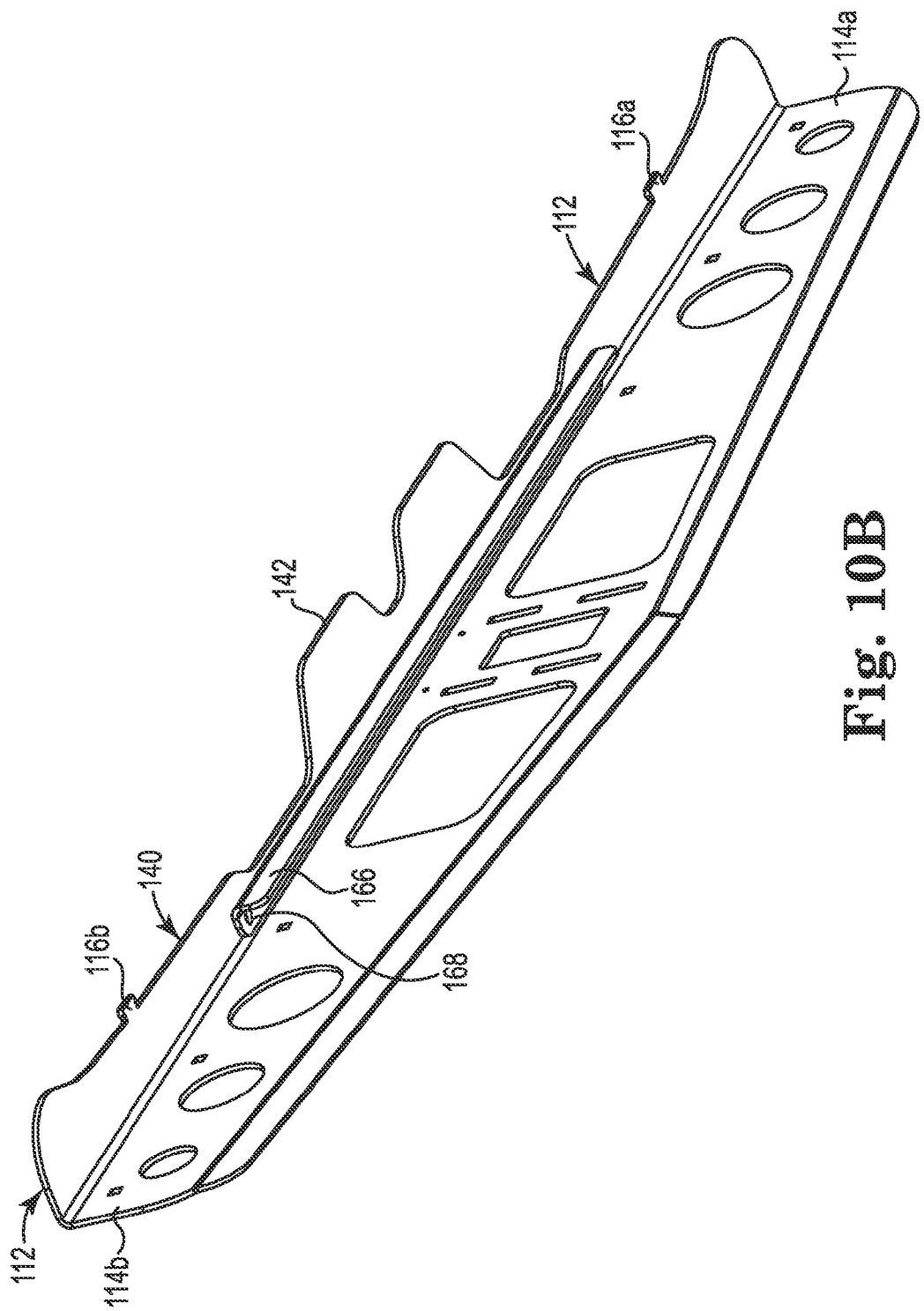
FIG. 10B a perspective view of the frame 112 of the mud flap assembly 110 of FIGS. 9 and 10A, as seen from in front and below the frame 112, showing a gusset member 166 that is plug welded, spot welded or the like to secure the gusset member to the frame 112 below the top plate 140 and proximate the support flanges 142 to strengthen the top plate 140 of the alternate frame 112.

FIGS. 10B and 10C illustrate a preferred gusset member 166 that can be plug welded to the frame 112 below the top plate 140 and proximate the support flanges 142 to strengthen the alternate frame 112. Although the frames of the present invention are preferably made of extruded aluminum, they may be made out of other metal materials and even hard plastics and composite material in alternate embodiments. In preferred embodiments the gusset member 166 will also be made of extruded aluminum and the gusset member is plug welded at a plurality of plug openings 168, spot welded at a plurality of positions or alternately connected with bolts, screws or other fasteners (not shown). The gusset member 166 can be added to the frame 112 to strengthen the frame so that the frame can better resist the forces applied to the extremities of the frame 112 during normal use.

Figure 11:
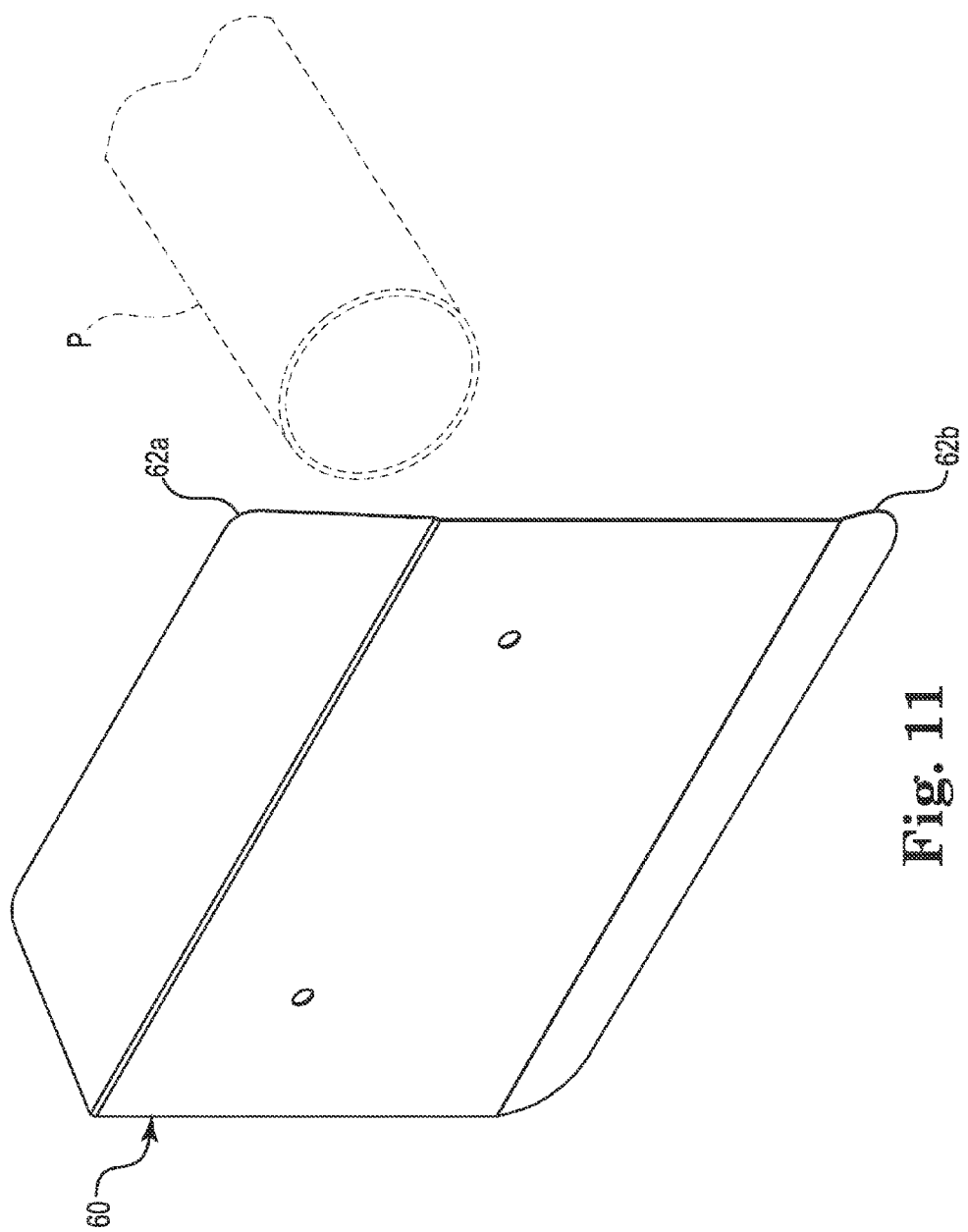
FIG. 11 is a schematic, perspective view to provide a schematic positioning perspective of the front of a heat plate 60, shown in relation to a vehicle exhaust pipe P (shown in phantom); wherein the heat plate can be operatively secured to the front of a flap panel 50*a*, 50*b*, 150*a*, 150*b*, 250*a*, 250*b*, 450*a*, 450*b*, 550*a*, 550*b* of mud flap assemblies 10, 110, 210, 410, 510, as shown in FIG. 13A, to shield the flap panel from hot exhaust coming from the exhaust pipe P.

FIG. 11 illustrates a preferred heat plate 60 that can be secured to one or more of the flap panels 50*a*, 50*b* of the disclosed mud flap assemblies 10, 110, 210, 410, 510. The heat plate 60 is preferably made of extruded aluminum and is positioned proximate an exhaust pipe P such that the heat from the exhaust exiting the exhaust pipe P is dissipated by the plate 60 and the flap panel 50*a*, 50*b* is protected from heat damage (see also, FIG. 15). The heat plate 60 may include upper and lower lips 62*a*, 62*b* that make it easier for the respective flap panel 50*a*, 50*b* to flex. Mud flap assemblies 10, 110, 210, 410 may come with a heat plate 60 for each flap panel 50*a*, 50*b* or just one or no heat plates, as desired. The heat plate will preferably secured to the flap panels with mechanical fasteners such as bolts with washers and nuts (not shown), but other conventional mechanisms from securing the heat plates to the flap panels are also envisioned within the scope of the present invention.

Referring now also to FIGS. 12-13B, which disclose another preferred mud flap assembly 210 that is adjustable to accommodate many different vehicle and bumper types. The preferred mud flap assembly 210 includes a frame 212 that generally spans a bumper B of a vehicle V (see also, for example, FIG. 3A). The frame 212 includes one or more access openings 223*a*, 223*b*, 223*c*, 223*d* to provide access to hitch pins, cotter pins, hitch wiring, safety chains and hitch receivers (not shown). It will be understood that the access openings 223*a*, 223*b*, 223*c*, 223*d* can be of many sizes and shapes. The frame 212 preferably includes a rear plate 230 and a top plate 240. In preferred embodiments the rear plate 230 and the top plate 240 are at an angle (a') of approximately 90 degrees with respect to each other. The top plate 240 includes a plurality of support flange pieces 242*a*, 242*b* that are preferably arranged and configured to sit upon the step S of the bumper B.

In this embodiment, there are four support flanges 242*a*, 242*b* extending from the frame 212. The support flanges 242*a* are adjustable laterally along the length of the frame 212 and can be secured within a plurality of apertures 241 of the frame 212 with a bolt 245*b*, washers 245*c*, lock washers 245*d* and nuts 245*e* or the like. Support flanges 242*b* can alternatively be used and are adjustable in height to accommodate many different vehicles by securing a bolt 245*a* within slots 234 in the frame 212 and a pair of apertures 244*a*, 244*b* the lower portion 242*d* of support flange 242*b* with bolts 245*a*, flat washers 245*c*, lock washers 245*g* and nuts 245*h* or the like.

In this embodiment, the support flanges 242*b* are adjustable in that they include a plurality of adjustment apertures 244*a*, 244*b* that can be aligned with corresponding frame apertures 234 to selectively position the respective support flange 242*b* at a desired height once secured in place with a bolt 245*a*, flat washer 245*c*, lock washer 245*g* and nut 245*h*, for example (see also, for example, FIG. 13A in which support flanges 242*b* are illustrated at different heights with respect to the frame 212). Preferably, the support flanges 242*a*, 242*b* are adjusted such that they will sit upon the step S of the bumper B. As with previously disclosed embodiments, by having at least one support flange 242*a*, 242*b* sit upon the step S of the bumper B when operatively installed, additional contact points are formed between the mud flap assembly 210 and the bumper B of the vehicle V, which stabilizes the mud flap assembly 210. The frame 212 preferably further includes two adjustable stop assemblies 215*a*, 215*b*. Each stop assembly 215*a*, 215*b* including a stop 216*a*, 216*b* and a bumper cap 217*a*, 217*b* that extend from the frame 212 that provide two additional contact points with the vehicle that can stabilize the mud flap assembly 210. These additional points of contact help to further stabilize the respective mud flap assemblies with respect to the vehicle so as to minimize the degree to which the frames of the respective mud flap assemblies vibrate and move independently of the vehicle.

At first and second ends 214*a*, 214*b* of the frame 212, proximate the tires of the vehicle (not shown); flap panels 250*a*, 250*b* are secured to and extend downwardly from the frame 212. The flap panels 250*a*, 250*b* generally block any dirt, debris or rocks kicked-up by the tires from damaging the trailer and apparatus being towed by the vehicle (not shown). The flap panels 250*a*, 250*b* are secured to the frame 212, for example, with nuts 252*a*, bolts 252*b* and washers 252*c*.

As with previously discussed embodiments, the mud flap assembly 210 of FIGS. 12-13B further includes at least one adjustable stop assembly 215*a*, 215*b* proximate each, or at least one end 214*a*, 214*b* of the frame 212. Each stop assembly 215*a*, 215*b* can preferably be adjusted to provide another contact point between the mud flap assembly 210 and the bumper B of the vehicle V. In preferred embodiments, the stop assembly 215*a*, 215*b* is adjustable such that when the respective stop is positioned against the bumper B, the hitch tongue aperture and hitch receiver opening 277 are aligned (as generally seen in FIGS. 3B and 10 illustrating hitch receiver 76 having hitch receiver opening 77, hitch aperture 78 and hitch tongue 72 having aperture 74). Such a configuration provides faster and easier installation of the mud flap assembly 210. One preferred way of making the stop assemblies 215*a*, 215*b* adjustable is to have the caps 217*a*, 217*b* arranged and configured so that they can be twisted like a threaded screw to either extend outwardly or inwardly from the stops 216*a*, 216*b*. It will be understood that there are numerous other ways in which the stop assemblies can be made adjustable to achieve the desired result of creating contact points with the bumper of a vehicle to stabilized the mud flap assembly and provide an alignment aid for the hitch tongue aperture and hitch receiver aperture.

The mud flap assembly 210 is also preferably further adjustable in that the frame 212 includes a hitch opening 218 and four slots 220 proximate the hitch opening 218. As with prior embodiments, a securing assembly or securement bracket 284 is preferably used to secure the shaft or hitch tongue 72 of the hitch assembly 70 to the frame 212 (see also, FIG. 2D illustrating one preferred securing assembly 284 in an exploded view). Preferred securing assemblies 284 include two clamp halves 286a, 286b interconnected with long carriage bolts 288a, nuts 288b and washers 288c to form a central clamp opening 290 for receiving the shaft or hitch tongue (see also, hitch tongue 72). Each clamp half 286a, 286b preferably includes at least one support flange 296a, 296b to contact the shaft or hitch tongue (see also, hitch tongue 72) and also to provide support for the long carriage bolts 288a, as discussed earlier. The clamp halves 286a, 286b are secured to the frame 212 with short carriage bolts 294a located within the frame slots 220 with nuts 294b and washers 294c. The short carriage bolts 294a can be secured within apertures in the clamp halves 286a, 286b (see also, for example, FIG. 2D).

The frame 212 can also include at least one exhaust opening 222 that is aligned with a corresponding aperture 254a in the respective flap panel 250b. Each flap panel 250a, 250b may include one or more outlines 254b for a user to trace and cut exhaust openings in the flap panel, if desired. The exhaust openings 222 in the frame 212 and exhaust opening 254a in the respective flap panel 250b are preferably aligned proximate the vehicle exhaust pipe P (see also, FIG. 3B) so that the mud flap assembly 210 ventilates hot exhaust away from the vehicle V. The outline may be a marking, scored edge or the like. The frame 212 may also include decorative apertures 224a, 224b, 224c, 224d, and 224e as desired. In preferred embodiments, the frame 212 further includes a bent lip 226a, 226b proximate each of the flap panels 250a, 250b such that the flap panels 250a, 250b can flex upwardly.

Now referring also to FIGS. 14A-14B that illustrate another preferred frame 312 that can be used with any of the various parts of disclosed mud flap assemblies 10, 110, 210, 410, 510 or be used as a replacement for frames 12, 112, 212, 412, 512. It will be understood that the frame 312 operates in largely the same manner as other frames disclosed herein and also includes a rear plate 330 and a top plate 340. Frame 312 does differ from those others disclosed in that each stop assembly 315a, 315b is cut from and extends from the rear plate 330 of the frame 312 after mechanical force is used to bend the cut piece so that it ultimate resides in a plane that stands generally at an angle of about 90 degrees with respect to a plane in which the rear plate resides. As with previous embodiments, the frame 312 may include one or more exhaust openings 322 or decorative apertures 324a, 324b, 324c, 324d, 324e, as desired.

This frame 312 is also equipped with a flexible flap 347, which can be used with any of the frames disclosed herein. The flexible flap is designed to cover an access opening 323 which can generally prevent rocks, debris and mud from flying through the access opening when the wheels of the vehicle cause them to fly up from underneath the vehicle and potentially come through any of the access openings 323. It will be appreciated that the access openings 323 can be many shapes and sizes. It will also be appreciated that the flap 347 may be made of any flexible materials available in the marketplace and also, in alternate embodiments, of materials that are not especially flexible, but that can be secured to the front of the frame proximate one access opening 323 by a hinge or a plurality of hinges and then hinged so that it can cover the access opening 323 and yet allow access to a hand H of a user, in a manner that is similar to that shown in FIG. 14A. In preferred embodiments, the flap 347 will be of flexible material and it will be secured to the front of the frame 312 by a strip of adhesive material 348, preferably a strip of double backed industrial grade mounting tape or the like, so that the flap 347 will cover one access opening 323 and generally prevent rocks, debris and mud from flying through the access opening to damage or impact upon the trailer or other apparatus hauled by the vehicle. In alternate embodiment the flexible flap 347 can also be secured to the front of the frame by glue, double backed adhesive tabs, screws, snaps, corresponding components of hook and loop fasteners that have an adhesive backings and the like.

Now also referring to FIGS. 15A-15E, which collectively illustrate yet another preferred mud flap assembly 410. The mud flap assembly 410 includes a frame 412 that generally spans a bumper B of a vehicle V (see also, frame 12 shown in FIG. 3A). The frame 412 includes two access openings 423a, 423b to provide access to hitch wiring, safety chain and hitch receiver (not shown). The frame 412 preferably includes a rear plate 430 and a top plate 440. In preferred embodiments, the rear plate 430 preferably is at an angle (a″) of approximately 90 degrees with respect to the top plate 440. The top plate 440 includes two support flanges 442a, 442b that are secured to apertures 441 the frame 412 with bolts 445a, flat washers 445b, lock washers 445c, and nuts 445d. The support flanges 442a, 442b are preferably arranged and configured to sit upon the step S of the bumper B (see also, FIG. 3A). By having the support flanges 442a, 442b sit upon the bumper when operatively installed, two additional contact points are established between the mud flap assembly 410 and the vehicle, which stabilize the mud flap assembly 410 with respect to the vehicle V when the frame is secured to the vehicle.

As with previous embodiments, at first and second ends 414a, 414b of the frame 412, proximate the tires of the vehicle V (not shown), flap panels 450a, 450b are secured to and extend downwardly from the frame 412. Preferably, the flap panels 450a, 450b are secured to the frame 412 with nuts 452a, bolts 452b and washers 452c or the like.

The mud flap assembly 410 further includes at least one stop assembly 415a, 415b proximate each end 414a, 414b of the frame 412. Each stop assembly 415a, 415b preferably includes a stop 416a, 416b connected to a cap 417a, 417b. Each stop assembly 415a, 415b is arranged and configured to provide another contact point between the mud flap assembly 410 and the bumper B of the vehicle V (see also, FIG. 3A and related disclosure, for example). In preferred embodiments, each stop assembly 415a, 415b is arranged and configured such that when the cap 417a, 417b contacts the bumper B, the hitch tongue apertures and hitch receiver apertures are aligned for insertion of a pin (see also FIGS. 3B and 4 illustrating hitch tongue aperture 74 and hitch receiver aperture 78 and related disclosure). Such a configuration provides faster and easier installation of the mud flap assembly 410.

As with previous embodiments, the mud flap assembly 410 is adjustable such that the mud flap assembly 410 can accommodate many types of vehicles and hitch configurations. The frame 412 includes a generally U-shaped hitch opening 418, and four slots 420 proximate the hitch opening 418. A securing assembly 484 is preferably used to secure the shaft or hitch tongue 72 to the frame 412 (see also, for example, FIGS.

3B and 4 illustrating hitch tongue 72, the securing assembly 84 and related disclosure). The preferred securing assembly 484 includes two clamp halves 486a, 486b interconnected with long carriage bolts 488a, nuts 488b and washers 488c to form a central clamp opening 490 for receiving a hitch tongue. Each clamp half 486a, 486b preferably includes at least one support flange 496a, 496b to contact and support the hitch tongue and provide support for the long carriage bolts 488a (see also, FIG. 2C and related disclosure). The clamp halves 486a, 486b are preferably secured to the frame 412 with short carriage bolts 494a located within the frame slots 420 with nuts 494b, flat washers 494c and lock washers 494d. The short carriage bolts 494a can be secured within apertures in the clamp halves 486a, 486b (see also, apertures 87, FIGS. 1, 2A-2D and related disclosure). It will be appreciated that the securing assemblies 84, 284, 484, 584 may be assembled and secured to the frame of the preferred mud flap assembly on either side, front or back, even thought it is preferred to assemble the respective securing assembly on the front side as shown in the respective drawing figures.

The frame 412 also preferably comprises at least one exhaust opening 422 that is aligned with a corresponding aperture 454a in the respective flap panel 450b. The flap panel 450b proximate the exhaust pipe may include one or more outlines 454b for a user to trace and cut additional exhaust openings in the flap panel 450b, if desired. Each outline 454b may be formed by a marking, scored edge or the like. The one or more exhaust openings 422 in the frame 412 and respective flap panel 450b preferably aligned proximate the vehicle exhaust pipe (see also, FIG. 11) so that the mud flap assembly 410 ventilates hot exhaust away from the vehicle.

In preferred embodiments, the frame 412 further includes a bent lip 426a, 426b at first and second ends 414a, 414b proximate the respective flap panels 450a, 450b such that the flap panels 450a, 450b can flex upwardly. The bent lip 426a, 426b will also help the frames to resist forces that tend to make the frame 412 bend along the frame's length.

Figure 15B:
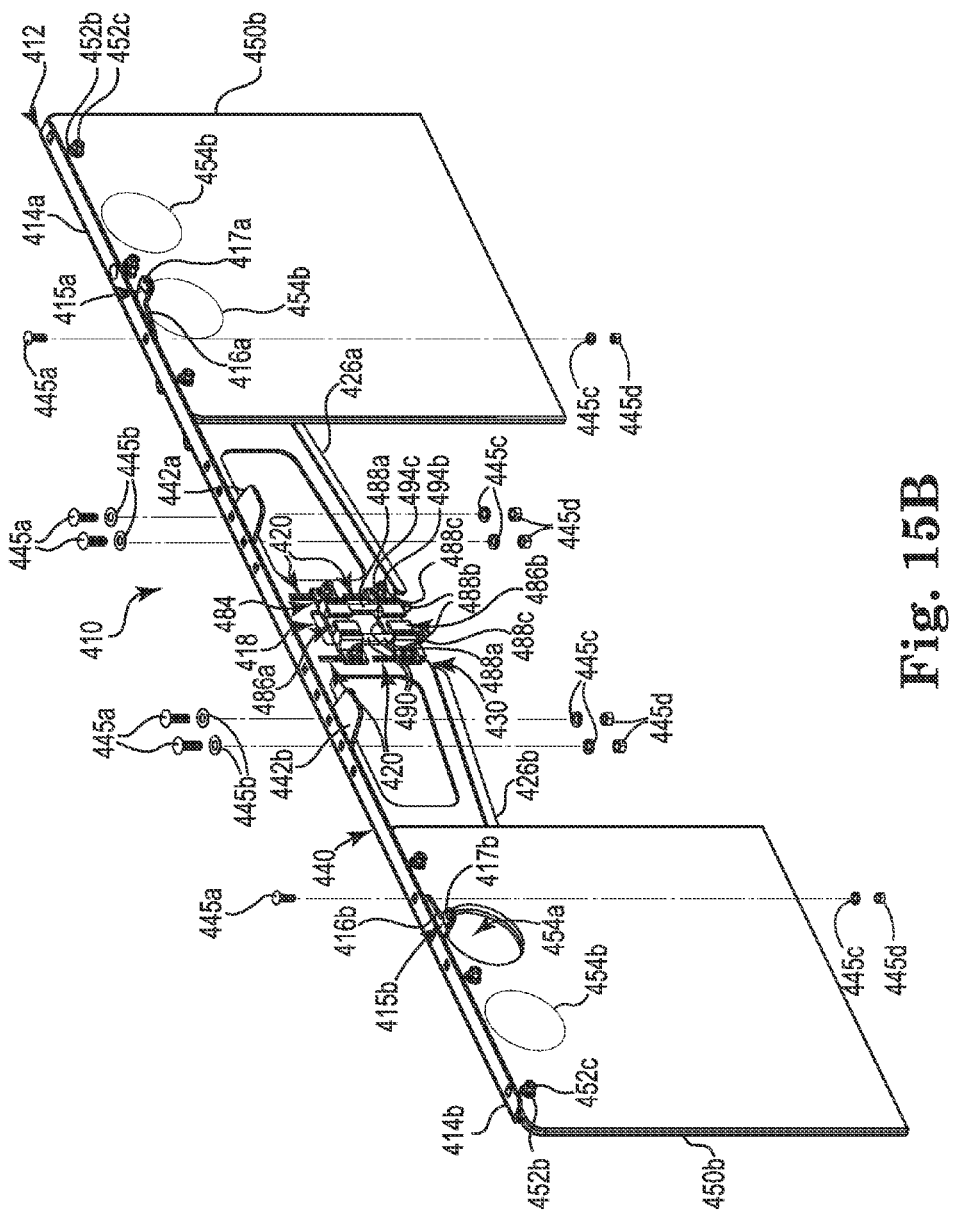
FIG. 15B is a front perspective view of the mud flap assembly 410 of FIG. 15A showing fastener elements 445*a*, 445*b*, 445*c*, 445*d*, for securing support flange elements 442*a*, 442*b* and adjustable stop assemblies 415*a*, 415*b*, in exploded view.
Figure 15D:
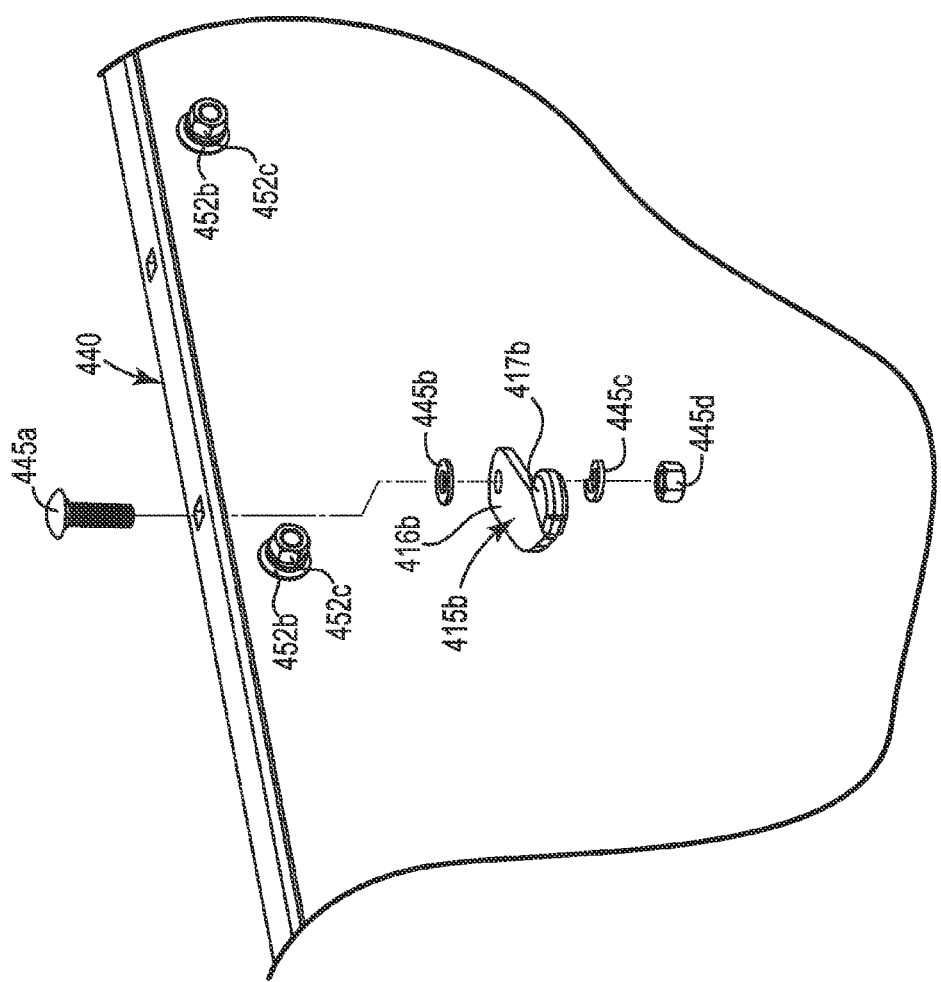
FIG. 15D is an enlarged, partial front perspective view of the mud flap assembly 410 of FIG. 15B, but only showing one of the adjustable stop assemblies 415*b* detached from fastener elements 452*a*, 452*b*, 452*c* and the top plate 440 in an exploded view.

Referring now specifically to FIGS. 15D and 15E, the frame 412 is preferably equipped with a pair of adjustable stop assemblies 415a, 415b that are secured to the frame 412 by fasteners of any kind known in the art, preferably by bolts 445a and nuts 445d that sandwich the frame 412 and a plurality of washers 445b, 445c around the adjustable stop 416a, 416b. When the stop assembly 415a, 415b is secured to the frame 412 by the nut 445d and the bolt 445a, the stop 416a, 416b can pivot to some degree about the bolt 445a. As such, the user can adjust the stop assembly by turning the stop 416a, 416b about the bolt 445a, thereby pressing it against the rear R of the bumper B to create a more forceful engagement of the bumper B by the stop assembly 415a, 415b, thereby increasingly stabilizing the frame against the bumper B. The additional points of contact between the frame and the bumper, provided by the stops or the stop assemblies, help to stabilize the frame of the respective mud flap assemblies with respect to the vehicle so as to minimize the degree to which the frames vibrate and move independently of the vehicle.

In preferred embodiments, when the frame 12, 112, 212, 312, 412, 512, 612, 712, 812 is secured to the vehicle V, the shaft 72 of the hitch assembly 70 can be secured to the hitch receiver 76 when the securing assembly 84, 284, 484, 584 is loosely attached to the frame 12, 112, 212, 312, 412, 512, 612, 712, 812, and the frame 512 via the mounting plate 519 when the mounting plate 519 is attached to the frame 512, as shown in FIGS. 16A-16D, but not tightly secured. As such, the shaft 72 will be threaded through one of the respective hitch openings 18, 118, 218, 318, 418, 518a, 618, 718, 818 and the fully assembled, but loosely secured securing assembly 84, 284, 484, 584. Alternatively, the respective securing assembly 84, 284, 484, 584 can be fully assembled and loosely secured and engaged with the respective frame 12, 112, 212, 312, 412, 612, 712, 812, or the respective frame 512 by attachment to the mounting plate 519, in the embodiment shown in FIGS. 16A-D, where mounting plate 519 is secured to frame 512, so that the nuts 88b, 288, 488b, 588b that are engaged with the long carriage bolts 88a, 288a, 488a, 588a that pass through the respective long carriage bolt receiving channels 89 of the respective clamp halves 86a, 86b, 286a, 286b, 486a, 486b, 586a, 586b will be fully engaged to create a central clamp opening 90, 290, 490, 590, but will not be tightened down, so to speak, and the short carriage bolts 94a, 294a, 494a, 594a will also be loosely engaged with respective washers 94c, 294c, 494c, 594c and nuts 94b, 294b, 494b, 594b so that the shaft 72, which is positioned within the hitch opening 18, 118, 218, 318, 418, 518a, 618, 718, 818 and within the central clamp opening 90, 290, 490, 590 between the respective clamp halves 86a, 86b, 286a, 286b, 486a, 486b, 586a, 586b, will be able to move back and forth within the hitch opening and the central clamp opening between the respective clamp halves. This will allow the frame to be tightly secured against the bumper B, because the frame can be pressed hard against the bumper B, when the shaft 72 is positioned in this way between the respective clamp halves so that the support flange(s) and the stops or stop assemblies are in contact with the bumper and the frame is in tension against the bumper B when the nuts 88b, 288, 488b, 588b are turned in order to tighten them to the long carriage bolts 88a, 288a, 488a, 588a that pass through the respective clamp halves 86a, 86b, 286a, 286b, 486a, 486b, 586a, 586b. When the nuts are turned in this way, the clamp halves will tightened down against the shaft 72, so that the shaft 72 is fully secured to the frame in a position in which the frame is in tension with the bumper B, so much so that the respective frame forces the stops or stop assemblies against the bumper B so that the stops or stop assemblies will be biased against the bumper with a constant force to keep the stops or stop assemblies engaged against the bumper B so as to stabilize the frame at the respective points of contact between the frame and the bumper B, which is believed to minimize the degree to which the respective frame vibrates and moves independently of the vehicle V. Each of the nuts on the long carriage bolts are then torqued to 32 ft.lbs. to even the tightness on associated with each of the long carriage bolt fasteners.

After the nuts 94b, 294b, 494b, 594b are tightened against the lower of the two clamp halves 86b, 286b, 486b, 586b to tightly secure the shaft or hitch tongue 72 within the central clamp halve opening 90, 290, 490, 590, downward force can be placed on respective the respective frame 12, 112, 212, 312, 412, 512, 612, 712, 812 and/or the respective support flanges 42, 142, 242, 342, 442, 542, 642, 742, 842 so that the support flanges are in contact with and engaged with the bumper B, because the nuts 94b, 294b, 494b, 94b on the short carriage bolts 94a, 294a, 494a, 594a are still loosely secured in order to allow the short carriage bolts 94a, 294a, 494a, 594a to slide up and down within the respective slots 20, 120, 220, 320, 420, 520, 620, 720, 820 to enable the securing assembly 84, 284, 484, 584 to adjust its vertical orientation to the respective frame or mounting plate in a position that allows the support flanges 42, 142, 242, 342, 442, 542, 642, 742, 842 to be in contact and engaged with the bumper B. The nuts 94b, 294b, 494b, 594b are then turned around the short carriage bolts 94a, 294a, 494a, 594a to tighten the respective clamp halves 86a, 86b, 286a, 286b, 486a, 486b, 586a, 586b to the respective frame 12, 112, 212, 312, 412, 612, 712, 812, or the respective mounting plate 519 (in the embodiment shown in FIGS. 16A-D, where mounting plate 519 is secured to frame 512). Each of the nuts on the short carriage bolts are then torqued to 32 ft.lbs. to even the tightness associated with each of the short bolt fasteners. The respective mud flap assemblies are then fully secured the vehicle so that the respective mud flap assemblies are in a slight tension both with the rear of the bumper B and with the top of the bumper B to stabilize the respective frame at a plurality of contact points where the respective mud flap assembly is in contact with the vehicle V.

Figure 3A:
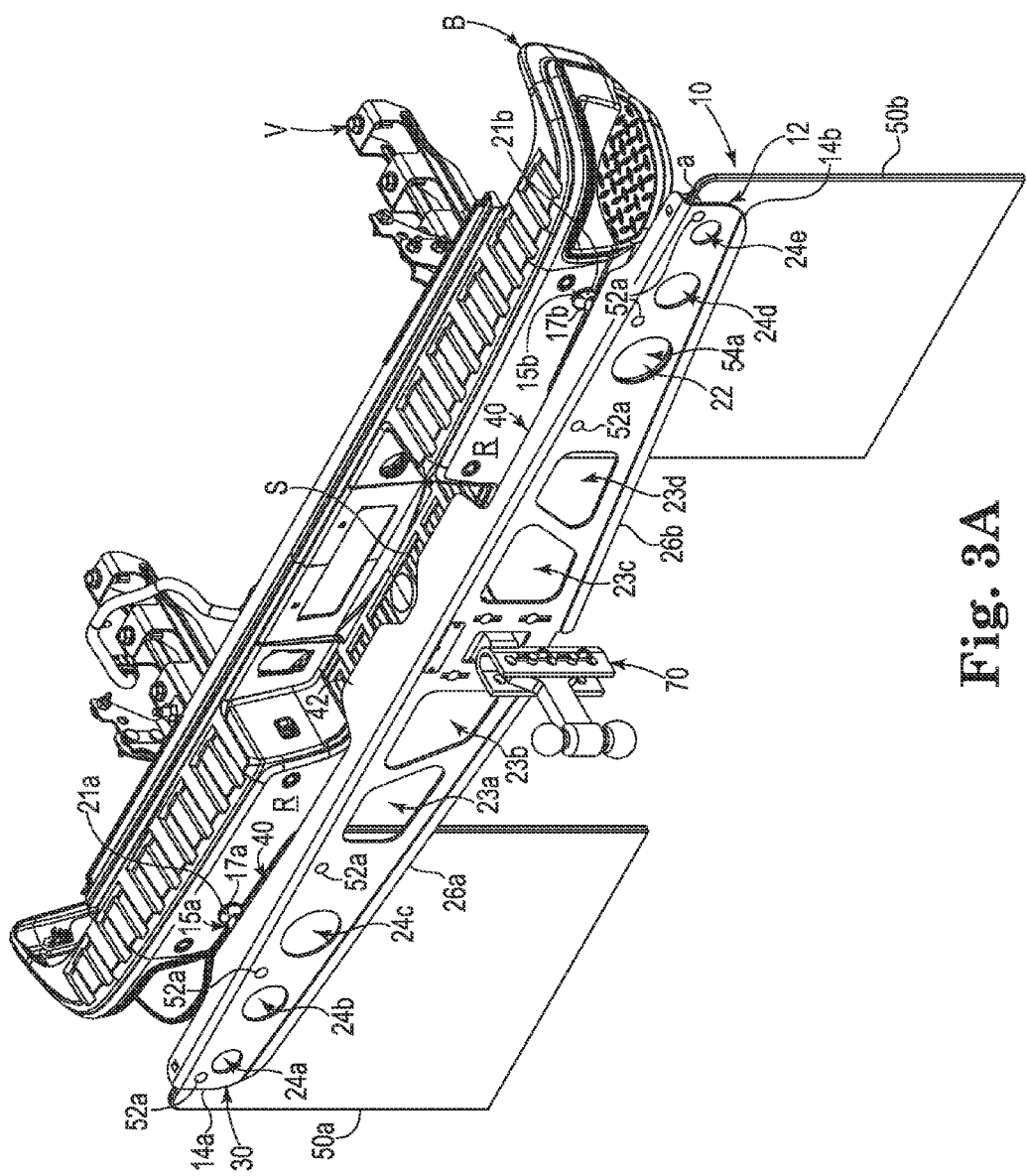
FIG. 3A is a rear perspective view of the mud flap assembly 10 of FIGS. 1-2D when the mud flap assembly 10 is operatively secured to a bumper B of a vehicle V (shown only in part)
Figure 3B:
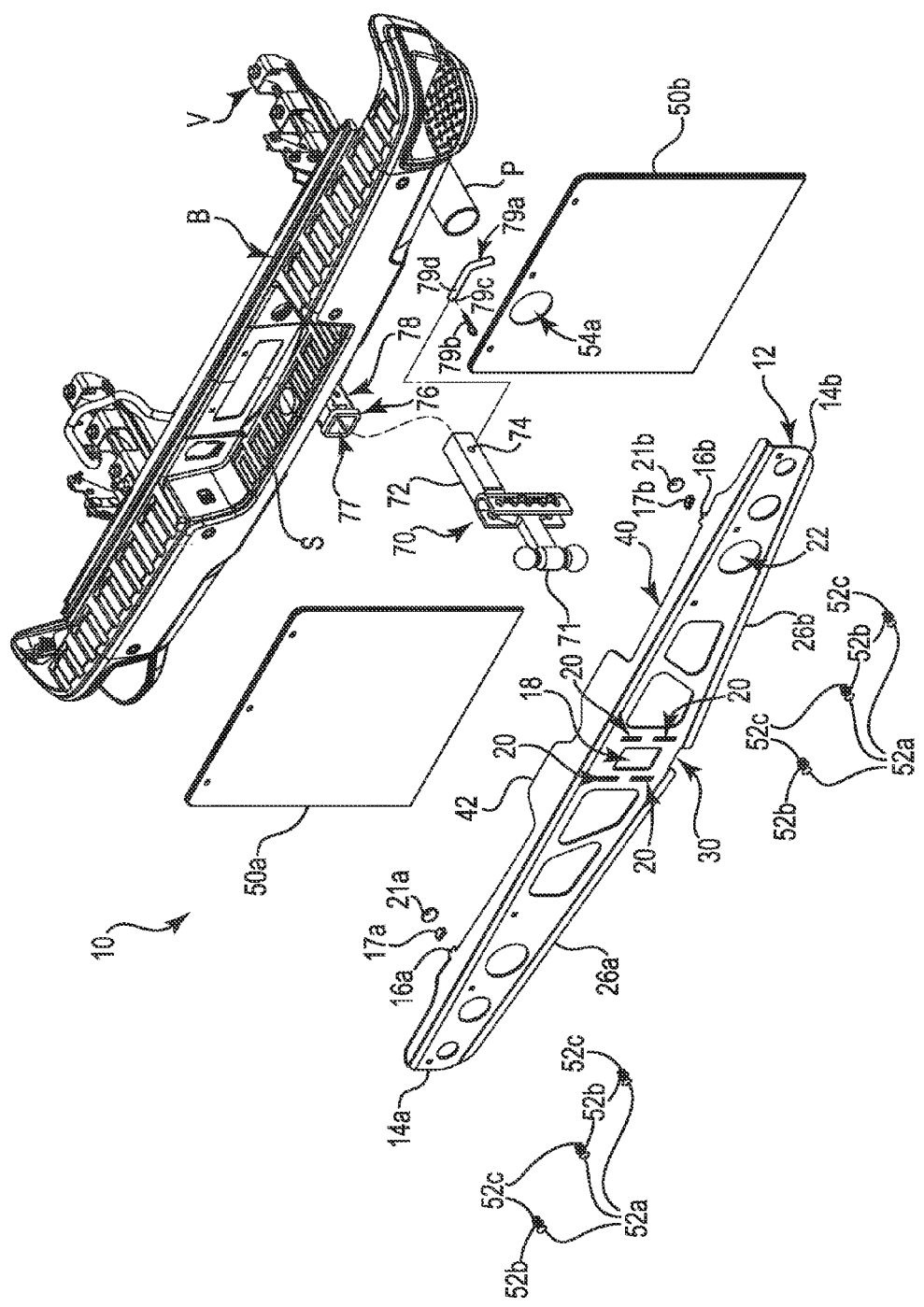
FIG. 3B is an exploded, rear perspective view of the mud flap assembly 10 of FIGS. 1-3A as seen generally from the perspective of FIG. 3A, in which the hitch assembly 70 is shown separately from the frame and the securing assembly 84 is not shown for clarity.
Figure 4:
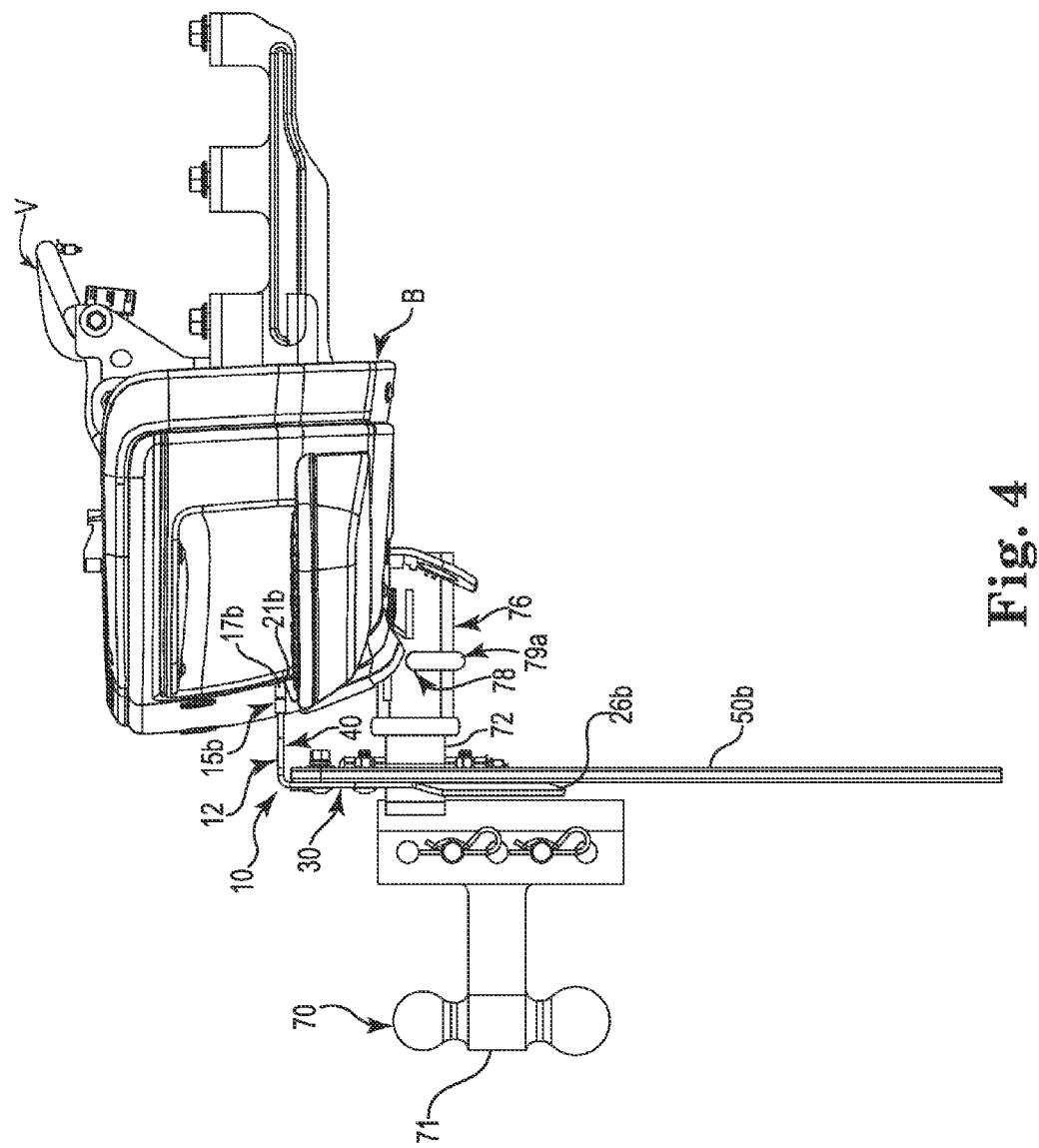
FIG. 4 is a side view of the mud flap assembly 10 of FIGS. 1-3A when the mud flap assembly 10 is operatively secured to a bumper B of a vehicle V (shown only in part)
Figure 5:
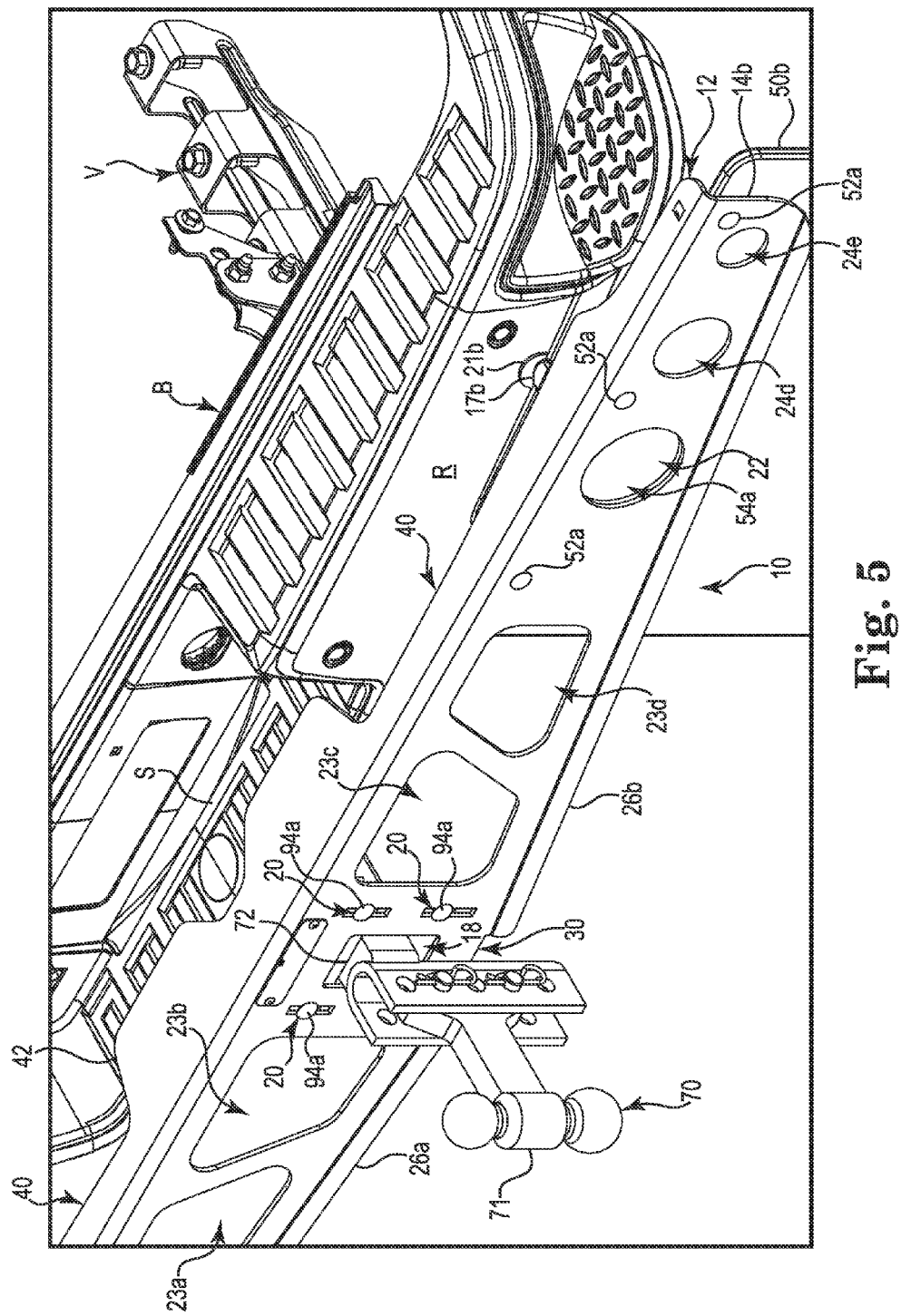
FIG. 5 is an enlarged, partial rear perspective view of a portion of the mud flap assembly 10 shown in FIG. 3A.
Figure 6:
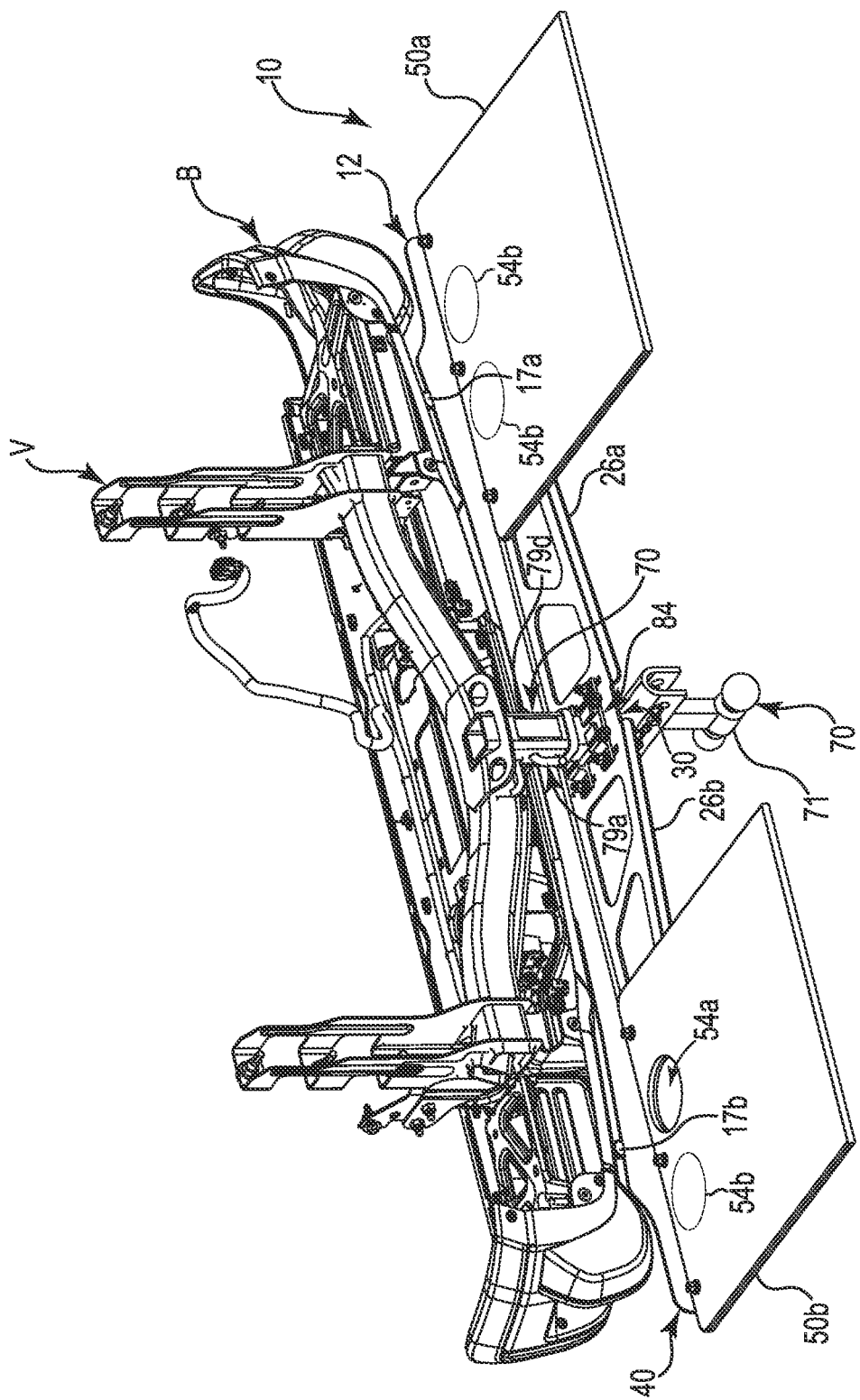
FIG. 6 is a perspective view from in front and below the mud flap assembly 10 shown in FIGS. 3A, 4 and 5, in which the mud flap assembly 10 is secured to the hitch assembly 70, and the hitch assembly 70 is secured to the hitch receiver 76 of the vehicle V, only a part of which is shown.
Figure 7:
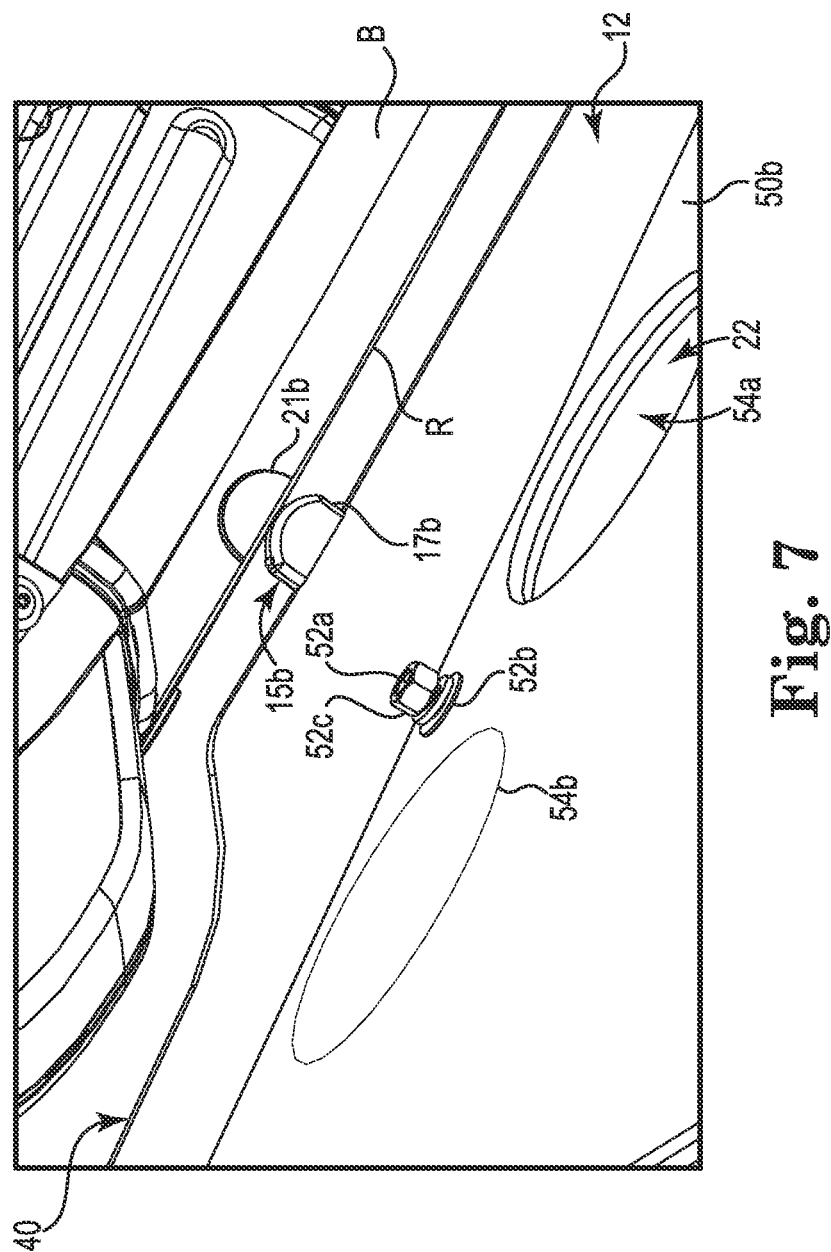
FIG. 7 is an enlarged, partial perspective view of the mud flap assembly 10 of FIG. 6, shown in a manner similar to that shown in FIG. 6, but from a somewhat different perspective, showing the cap 17*b* of one stop assembly 15*b* contacting a protective piece 21*b* secured to the bumper B.
Figure 8:
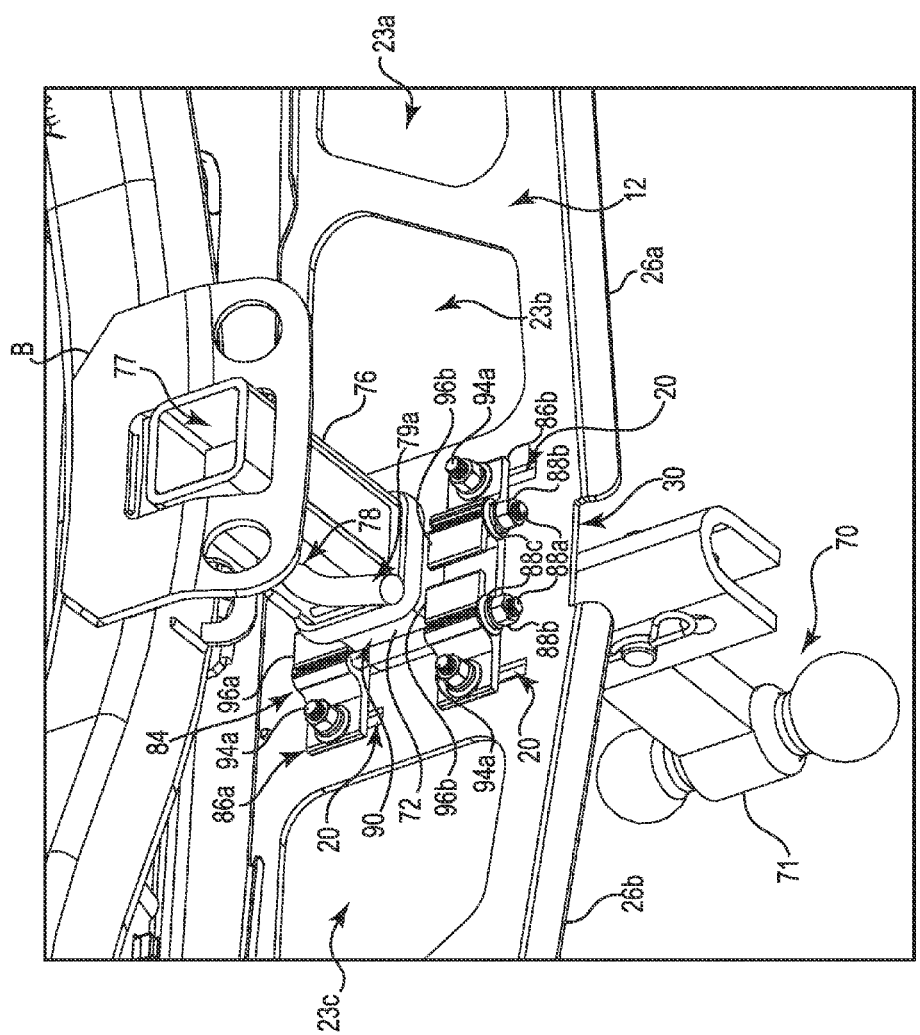
FIG. 8 is an enlarged, partial perspective view from in front and below the mud flap assembly 10 of FIGS. 1-7, shown in a manner similar to that shown in FIG. 6, but from a somewhat different perspective, showing the frame 12 secured to the hitch assembly 70 by the securing assembly 84, and the hitch assembly 70 secured to the hitch receiver 76.

Now also referring to FIGS. 16A-16D, which collectively illustrate a further preferred mud flap assembly 510, which is largely similar to those mud flap assemblies 10, 110, 210, 410 disclosed herein; the mud flap assembly 510 includes a universal frame 512 similar to the universal frame 412 shown in FIGS. 15A-15C, each of which generally span a bumper B of a vehicle V (not shown) in the manner shown in FIGS. 3A-6 (see for example, FIG. 3A). The universal frame 512 preferably includes a rear plate 530 and a top plate 540.

The universal frame 512 preferably includes an enlarged opening 518 and a mounting plate 519 that has four slots 520 for securing the securing assembly 584. The slots 520 are proximate a hitch opening 518a in the mounting plate 519 through which a hitch tongue or a shaft 72 of a hitch assembly 70, similar to that shown in FIG. 1, can be received (see also, FIG. 2D and related disclosure) and secured by the securing assembly 584. The mounting plate 519 can be fastened to the frame 512 with fasteners such as bolts 521a and corresponding nuts 521b and washers 521c inserted through apertures 528 in the mounting plate 519 and apertures 523 in the frame 512. As such, the mounting plate 519 functions as a part of the frame 512, providing the slots 520 adjacent to the hitch opening 518a, where a securing assembly 584 similar to that shown in FIGS. 2C and 2D, can be secured. It will be appreciated that the enlarged opening 518 will give the frame 512 additional versatility to accommodate a variety of different hitch assemblies, by accepting a specialized mounting plate designed to accommodation special aspects of the hitch assembly that may not be compatible with hitch openings in the other frames disclosed herein.

As with prior embodiments, the securing assembly 584 (FIG. 16B, 16D) can be used to secure a hitch tongue assembly (not shown) to the frame 512 in a manner similar to that discussed above and shown in FIGS. 1, 2B-2D. As in the previous disclosed embodiments, the preferred securing assemblies 584 include two clamp halves 586a, 586b interconnected with long carriage bolts 588a, nuts 588b and washers 588c that can be secured to clamp a hitch tongue (not shown) of a hitch assembly (not shown) within the plate opening 590 of the mounting plate 519 to secure the hitch assembly (not shown) to the frame 512 when the mounting plate 519 is secured to the frame 512. Each clamp half 586a, 586b preferably includes at least once support flange 592a, 592b to contact the hitch tongue (not shown). The clamp halves 586a, 586b are secured to the mounting plate 519 with short carriage bolts 594a located within the slots 520. The short carriage bolts 594a can be secured within apertures 587 in the clamp halves 586a, 586b (see also, for example, FIGS. 1, 2A-2D) with nuts 594b, flat washers 594c and lock washers 594d.

The frame 512 can also include at least one exhaust opening 522 that is aligned with a corresponding aperture 554a in the respective flap panel 550b. Each flap panel 550a, 550b may include one or more outlines 554b for a user to trace and cut additional exhaust openings in the flap panels 550a, 550b, if desired. In alternate embodiments, the outlines can be scored, perforated or the like, to make it easier for the user to remove the outlined material to make a suitable aperture to correspond with an exhaust opening 522 in the frame 512. The at least one exhaust opening 522 in the frame 512 and respective flap panel 550b is preferably generally aligned proximate the vehicle exhaust pipe P so that the mud flap assembly 510 ventilates hot exhaust away from the vehicle V. The frame 512 may also include decorative apertures 524a, 524b, 524c, 524d, and 524e as desired that compliment the decorative aspects of the exhaust opening 522. For some vehicle models, a second exhaust opening (not shown) can be preferably provided, preferably opposite the first exhaust opening 522. The exhaust opening can have any shape, but the decorative shape of a circle is preferred in order to provide continuity with the decorative shape of the proximate decorative apertures 524a, 524b, 524c, 524d, and 524e in the frame 512.

At first and second ends 514a, 514b of the frame 512, proximate the tires (not shown) of the vehicle V (not shown); the flap panels 550a, 550b are secured to and extend downwardly from the frame 512. The flap panels 550a, 550b generally block any dirt, debris or rocks kicked-up by the tires from damaging the trailer and apparatus (not shown) being towed by the vehicle via the hitch assembly (see also, hitch assembly 70 and related disclosure). As with previous embodiments, flap panels 550a, 550b are preferably made of flexible material such as masticated rubber or the like. Preferably, the flap panels 550a, 550b are secured to the frame 512 with nuts 552a, bolts 552b and washers 552c.

The frame 512 also includes a top plate 540 including one or more apertures 541 for the optional securing of a support flange piece or pieces (not shown), similar to the support flange piece 242a, 242b shown in FIGS. 12, 13A, 13B, or the support flange pieces 442a, 442b, shown in FIGS. 15A-15C to sit upon a step S of a bumper B of a vehicle (not shown) similar to that shown in FIGS. 3A-6. For example, see apertures 541 in FIG. 16D, as well as corresponding apertures 241 and support flanges 242a, 242b shown in FIG. 13A and the related disclosure. Also note the corresponding disclosure of support flanges 442a, 442b secured to the universal frame 412 by bolts 445a that pass through apertures 441, as shown in FIGS. 15A-15C, and as noted in the related disclosure.

The universal frame 512 can also have stops (not shown) that are provided by stop assemblies (not shown) of the type that can be secured to the top plate 540, through apertures 541 in the manner in which stop assemblies 415a, 415b are secured to the universal frame 412 as shown in FIGS. 15A-15E.

FIG. 17 illustrates an alternative multi-piece frame 612 that can be used to provide a mud flap assembly (not shown) largely similar to the mud flap assemblies 10, 110, 210, 410, 510 disclosed herein by attaching a pair of flap panels (not shown) in a manner corresponding to the manner disclosed above for similar mud flap assemblies. The multi-piece frame 612 allows the manufacturer great flexibility in shipping and auto body repair shops greater repair flexibility when repairing such a multi-piece frame 612 if one of the pieces is damaged and requires repair. Three separate pieces 613a, 613b, 613c are secured together by fasteners of any kind known in the art, preferably by bolts 629.

The frame 612 is preferably sized to generally span the bumper B of a vehicle V (not shown) in a manner similar to that of other embodiments disclosed herein (see for example, FIG. 3). The frame 612 includes a center portion 613a preferably secured to two side portions 613b, 613c with bolts 629 or other fasteners that are well known in the art. As it will be understood, the center portion 613a can be connected to the side portions 613, 613c in many ways including welding, other mechanical fastening and the like. The center portion 613a includes two access openings 623a, 623b to provide access to hitch wiring, safety chain and hitch receiver (not shown). The two side portions 613b, 613c can also include access openings 623c, 623d, which further provide access to hitch wiring, safety chain and hitch receiver (not shown). Each portion further includes a rear plate 630a, 630b, 630c and a top plate 640a, 640b, 640c. The top plate 640a preferably includes a support flange 642 that can sit upon a step S of a bumper B of a vehicle as described and illustrated with previously discussed embodiments. The frame 612 preferably further includes a hitch aperture 618 and a plurality of slots 620 for securing a securing assembly (not shown) to the frame 612, such as the securing assembly 84 disclosed in FIGS. 2C-2D and the related disclosure, for example. Moreover, the frame 612 may include one or more exhaust openings 622 and decorative apertures 624a, 624b, 624c, 624d, 624e similar to previously discussed frame embodiments, each of which provide ornamental elements to the frame 612 and are designed to be circular in shape to provide a consistent ornamental appearance to the rear plates 630b, 630c of the multi-piece frame 612. The multi-piece frame 612 preferably has first and second ends 614a, 614b. In preferred embodiments, the multi-piece frame 612 further includes bent lips 626a, 626b proximate the bottom of the rear plates 630b, 630c of the respective side portions 613b, 613c, such that flap panels secured to the frame can easily flex upwardly during use and also provide greater strength to the respective rear plates 630a, 630b to resist horizontal deformation.

FIGS. 18A-18E illustrate a further alternate multi-piece frame 712 that that is expandable to enable the user to adjust the length of the frame 712, so that the adjustable multi-piece frame 712 can be used to form mud flap assemblies having all of the elements of the universal mud flap assemblies shown in FIGS. 12-16D. It will be appreciated that the multi-piece frame 712 is adjustable so that its length L, from one end 714a of the multi-piece frame to the other end 714b of the multi-piece frame 712, is adjustable so that a further embodiment of the present mud flap assembly that utilizes this multi-piece frame 712 will be adjustable in length so as to accommodate vehicles (not shown) having either a wider than normal body or a narrower than normal body. The multi-piece frame 712 is most similar to the universal frames 212, 412 and 512 disclosed in FIGS. 12-13B, 15E-15E and 16A-16D, respectively. The multi-piece frame 712 can be adjusted to five different lengths (L1, L2, L3, L4 and L5) generally depicted in FIGS. 18A, 18B, 18C, 18d and 18E, respectively. The multi-piece frame 712 has three main parts, a center portion 713a and two side portions 713b, 713c that are secured together in relation to one another in a series of different configurations, as both shown and discussed, by a plurality of fasteners 729a that pass through corresponding apertures (not shown, see FIG. 19) in the respective top plates 740a, 740b and 740c of the respective center and side portions 713a, 713b, 713c, respectively, so that at least one fastener 729a passes through each of two apertures (not shown, see FIG. 19) at opposite ends of the top plate 740a of the center portion 713a and each of the respective top plates 740b, 740c of the respective side portions 713b, 713c, to secure the respective center and side portions 713a, 713b, 713c together in each of the five possible configurations. The center portion 713a and two side portions 713b, 713c of the multi-piece frame 712 are also secured together in relation to one another this series of different configurations, by a plurality of fasteners 729b that pass through corresponding apertures (not shown, see FIG. 19) in the respective rear plates 730a, 730b and 730c of the respective center and side portions 713a, 713b, 713c, respectively, so that at least one fastener 729b passes through an aperture (not shown, see FIG. 19) in the rear plate 730a of the center portion 713a and each of the respective top plates 740b, 740c of the respective side portions 713b, 713c, to secure the respective center and side portions 713a, 713b, 713c together in each of the five possible configurations. It will be appreciated that any number of configurations, yielding alternate multi-piece frames having any number of alternate lengths are possible.

Referring now also to FIGS. 19, 20 and 21; as noted above, the multi-piece frame 712 has three main parts, a center portion 713a and two side portions 713b, 713c that can be secured together in relation to one another in a series of different configurations, as both shown and discussed. Fasteners 729a can pass through corresponding apertures 741a, 741b, 741c in the respective top plates 740a, 740b and 740c of the respective center and side portions 713a, 713b, 713c, respectively, so that each of two different fasteners 729a that secure the top plate 740a of the center portion 713a to each of the top plates 740b, 740c of the respective side portions 713b, 713c, passes through an aperture 741a in the top plate 740a of the center portion 713a and also through one of the apertures 741b, 741c in one of the respective top plates 740b, 740c of the respective side portions 713b, 713c, so that each of two different fasteners 729a secures one of the respective side portions 713b, 713c to the center portion 713a in each of the five possible configurations, each of which has a different length.

The center portion 713a and two side portions 613b, 613c of the multi-piece frame 712 can also be secured together in relation to one another in this series of different configurations, by a plurality of fasteners 729b that pass through corresponding apertures 743a, 743b, 743c in the respective rear plates 730a, 730b and 730c of the respective center and side portions 713a, 713b, 713c so that each of two different fasteners 729b that secure the rear plate 730a of the center portion 713a to each of the rear plates 730b, 730c of the respective side portions 713b, 713c, passes through an aperture 743a in the rear plate 740a of the center portion 713a and also through one of the apertures 743b, 743c in one of the respective rear plates 730b, 730c of the respective side portions 713b, 713c, so that each of two different fasteners 729b secures one of the respective side portions 713b, 713c to the center portion 713a in each of the five possible configurations, each of which has a different length.

Referring now also to FIG. 22, various preferred embodiments can include a frame 812 having somewhat differently configured support flanges 842 and apertures on the top plate 840 that will accommodate the addition of adjustable stop assemblies 416a, 416b, as shown and described in relation to FIGS. 15D, 15E and flap panels 50a, 50b, 150a, 150b, 250a, 250b, 450a, 450b, 550a, 550b as shown in the Figures and described herein with respect to other mud flap assembly embodiments.

One preferred method of installing the mud flap assemblies 10, 210, 410, 510 includes first inserting the long carriage bolts 88a, 288a, 488a, 588a through the openings in respective clamp halves 86a, 86b, 286a, 286b, 486a, 486b, 586a, 586b. The long carriage bolts 88a, 288a, 488a, 588a are preferably secured to the clamp halves 86a, 86b, 286a, 286b, 486a, 486b, 586a, 586b with flat washers 88c, 288c, 488c, 588c, and preferably lock washers 245d in certain embodiments, and nuts 88b, 288b, 488b, 588b. Next, the flat surface formed by the securing assembly 84, 284, 484, 584 is aligned with the frame 12, 212, 412, 512 so the nuts 88b, 288b, 488b, 588b on the long carriage bolts 88a, 288a, 488a, 588a are facing the ground. The clamp halves 86a, 86b, 286a, 286b, 486a, 486b, 586a, 586b are then loosely attached to the frame 12, 212, 412, 512, preferably with short carriage bolts 94a, 294a, 494a, 594a, flat washers 94c, 294c, 494c, 594c, lock washers 494d, 594d and nuts 94b, 294b, 494b, 594b so that the nuts are facing the front of the frame 12, 212, 412, 512 and the vehicle V. The short carriage bolts 94a, 294a, 494a, 594a are preferably left somewhat loose at this stage of installation. Then, the hitch tongue 72 of the hitch assembly 70 is threaded through the hitch opening 18, 118, 218, 318, 418, 518a, 618, 718, 818 in the respective frame 12, 112, 212, 312, 412, 612, 712, 812 or mounting plate 519 and the clamp opening 90, 290, 490, 590 between the two clamp halves 86a, 86b, 286a, 286b, 486a, 486b, 586a, 586b. The combination mud flap assembly 10, 210, 410, 510 and hitch assembly 70 is then lifted up so as to enable the hitch tongue 72 to be inserted into the hitch receiver opening 77. At this stage, all of the nuts are engaged with the respective carriage bolts, but they are only finger tightened so that the shaft 72 is moveable or repositionable with respect to the securing assembly and the securing assembly is moveable or repositionable with respect to the respective frame. The shaft or hitch tongue 72 is then inserted into and secured within the hitch receiver opening 77 of the hitch receiver 76 that is attached to the vehicle V. The hitch tongue 72 is secured within the hitch receiver 76 with a hitch pin 79a that is inserted into a hitch receiver aperture 78 in the hitch receiver 76 when the aperture 78 is aligned with a hitch tongue aperture 74 in the hitch tongue 72 and the hitch pin 79a is then secured within the hitch tongue aperture 74 by a cotter pin 79b that is inserted into a cotter pin aperture 79c at the distal end 79d of the hitch pin 79a when the hitch pin 79a has passed through the hitch receiver aperture 78 on the near side of hitch receiver 76, the hitch tongue aperture 74 and through a second hitch receiver aperture (not shown) on the opposite side of the hitch receiver 76. When the hitch pin 79a secures the hitch tongue 72 within the hitch receiver 76, the cotter pin aperture 79c will reside outside of the receiver opening 77 so as to be accessible for the insertion of the cotter pin 79b.

In preferred embodiments, the support flange(s) 42, 142, 242a, 242b, 442a, 442b are positioned on the bumper step or shelf portion S of the bumper B and the frame 12, 112, 212, 412 is pushed tightly against the rear surface of the bumper B until both of the stops 16a, 16b or bumper caps 17a, 17b, 217a, 217b, 417a, 417b, 617a, 617b, 717a, 717b are against the rear surface R of the bumper B. The securing assembly 84, 284, 484, 584 is then tightened around the hitch tongue 72, by tightening the nuts 88b, 288b, 488b, 588b to the long carriage bolts 88a, 288a, 488a, 588a. Downward pressure is then placed upon the top plate 40, 140, 240, 340, 440, 540, 640a, 740a, 840 proximate the support flanges 42, 142, 242a, 242b, 442a, 442b, 640a, 640b, so that the short carriage bolts can move downward within the respective slots, so that the securing assembly, which is secured to the hitch tongue 72, can also adjust downward with respect to the respective frame and thereby allowing the respective support flanges 42, 142, 242a, 242b, 442a, 442b, 640a, 640b to engage with the top of the bumper B. The next step is to tighten the nuts 94b, 294b, 494b, 594b to the respective short carriage bolts 94a, 294a, 494a, 594a of the securing assembly 84. Then, the nuts on all four short carriage bolts 94a, 294a, 494a, 594a are torqued to about 32 ft. lbs.

Figure 2A:
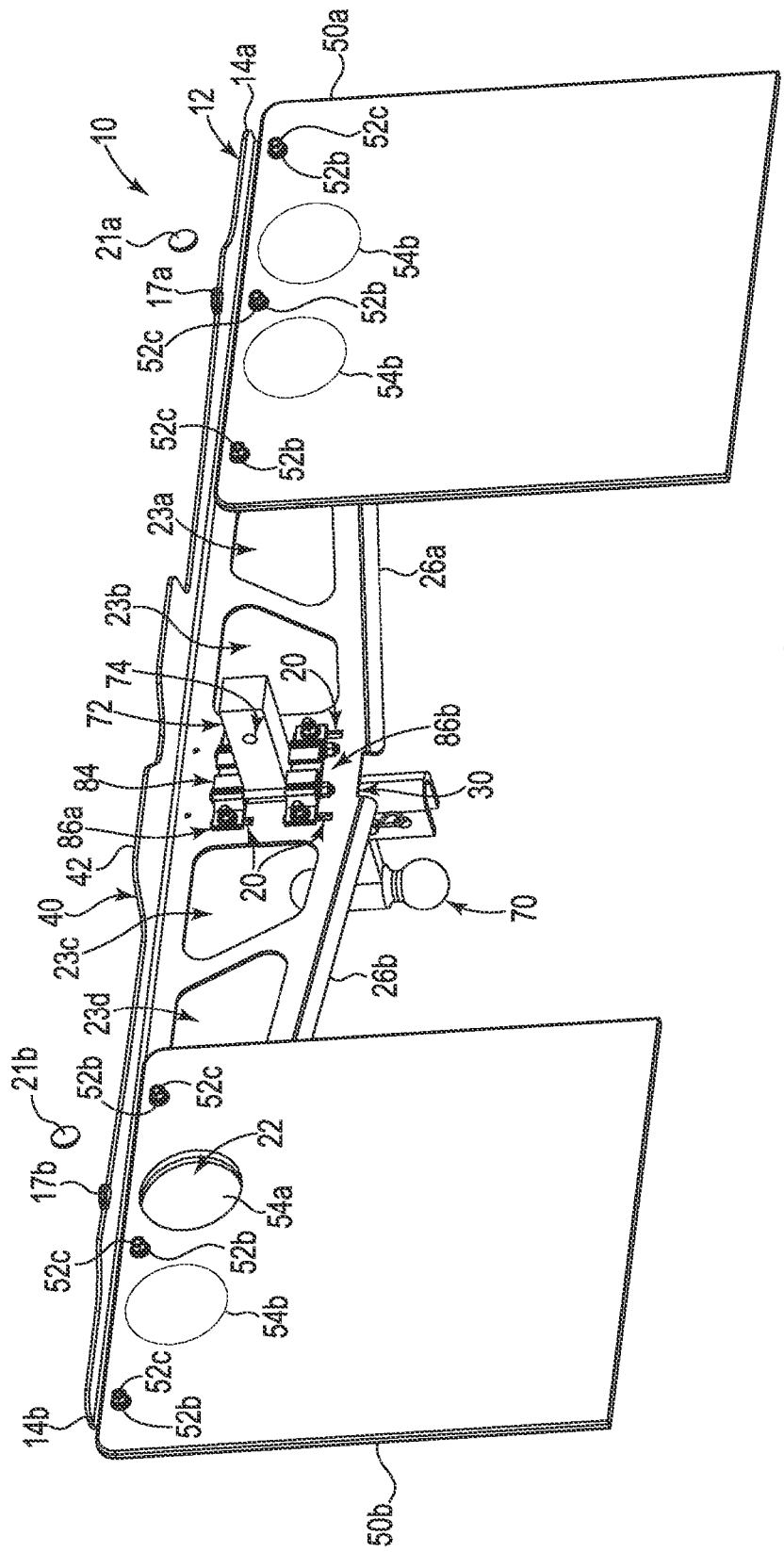
FIG. 2A is a front perspective view of the mud flap assembly 10 of FIG. 1 showing the securing assembly 84 that secures the frame 12 to the hitch assembly 70 and the protective pieces 21a, 21b shown in FIG. 1.
Figure 2B:
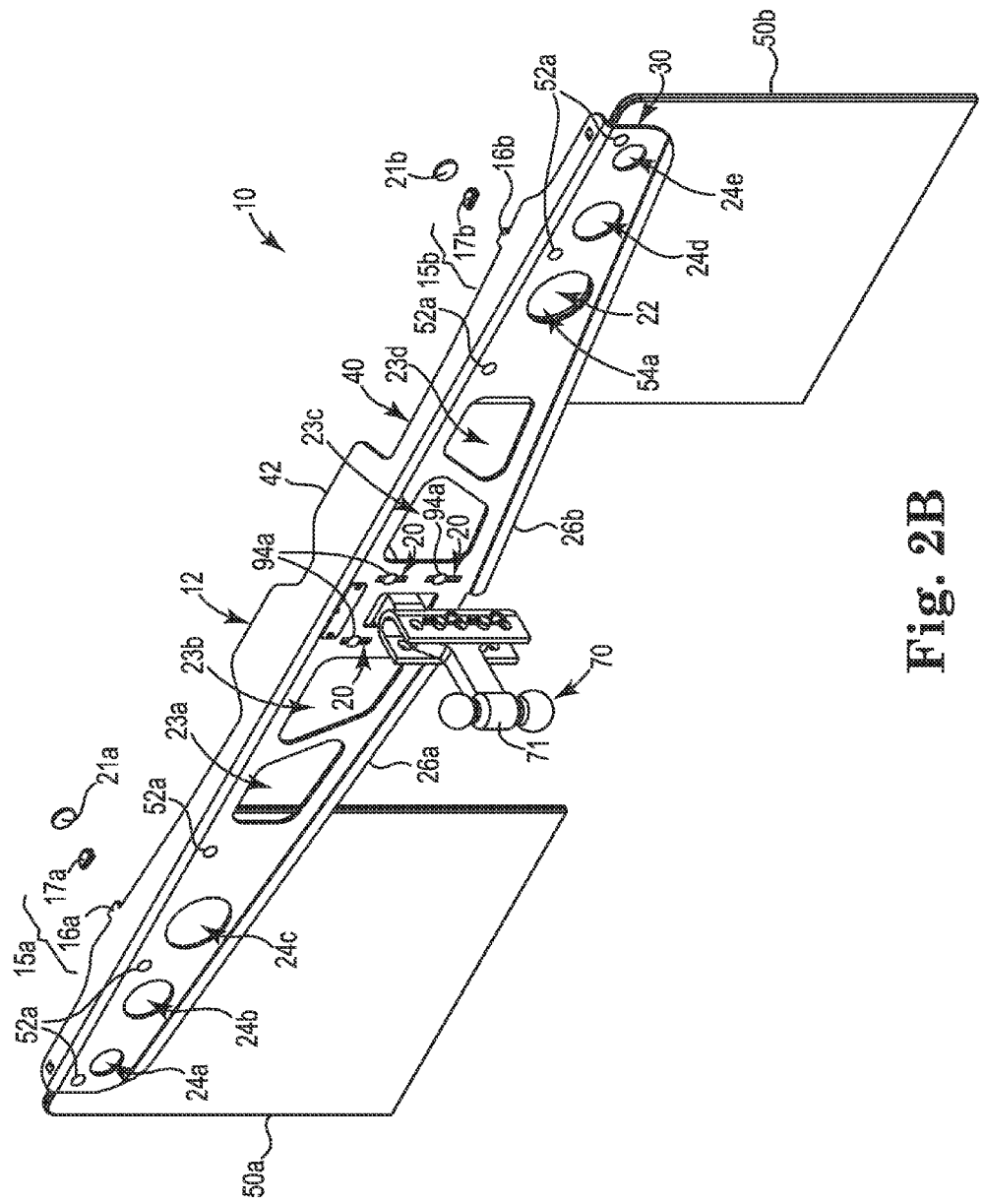
FIG. 2B is rear perspective view similar to FIG. 1, but showing a partially, exploded perspective view of the mud flap assembly 10 of FIGS. 1-2A in which the respective bumper caps 17a, 17b of the respective stop assemblies 15a, 15b are exploded away from the respective stops 16a, 16b.
Figure 2C:
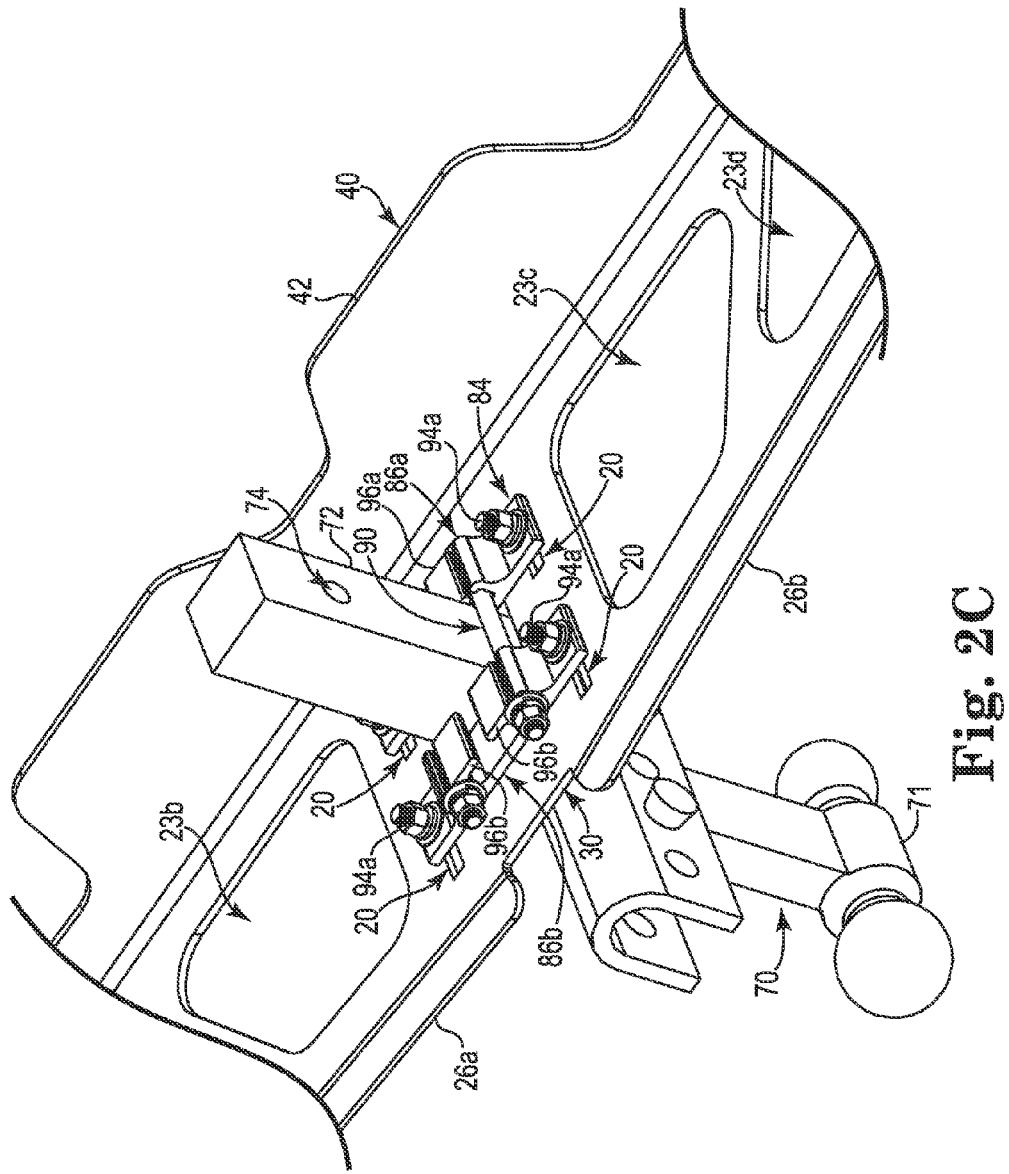
FIG. 2C is an enlarged, partial perspective view of the mud flap assembly 10 of FIGS. 1-2B as shown from in front and below the mud flap assembly 10, showing a portion of the securing assembly 84 securing the hitch assembly 70 to the frame 12.
Figure 2E:
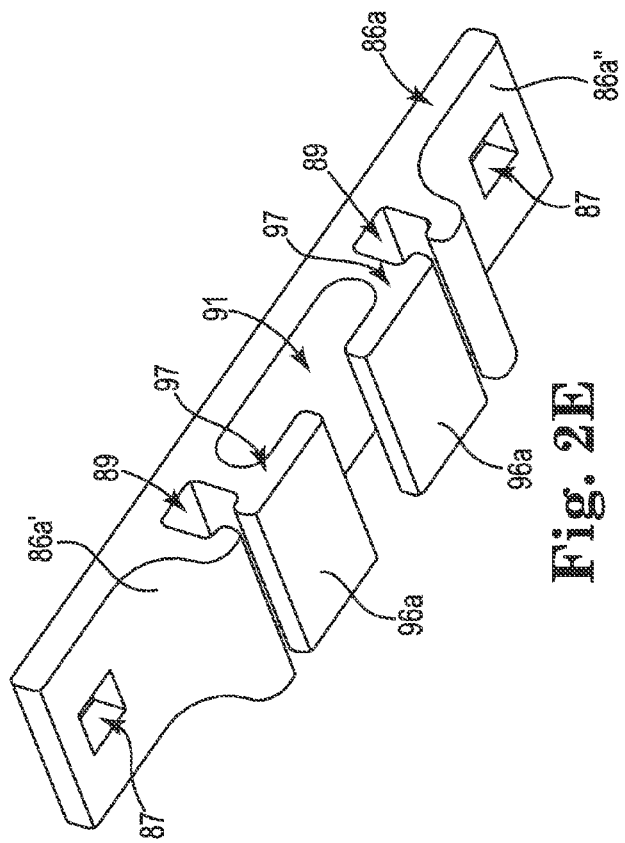
FIG. 2E is an enlarged perspective view of a clamp half 86a of the securing assembly 84 shown in FIGS. 2A-2D.
Figure 2F:
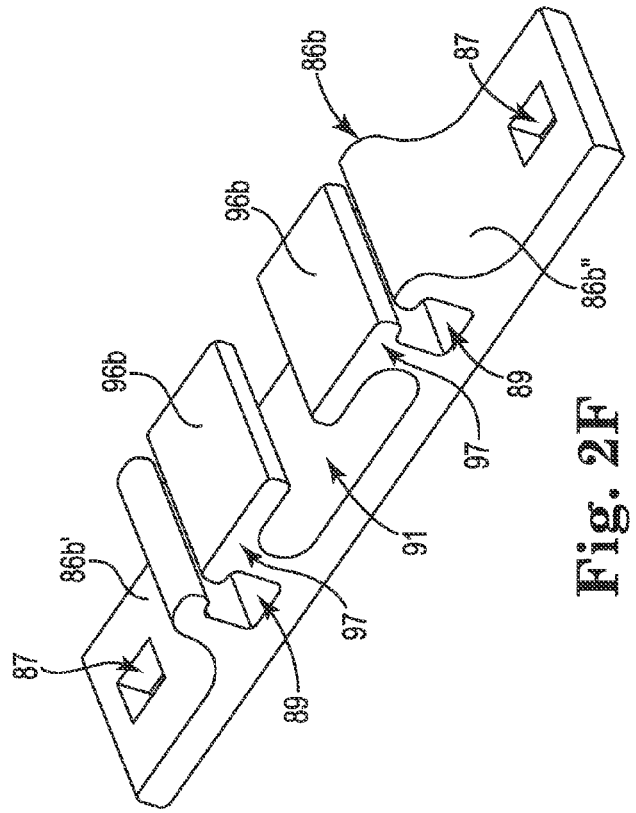
FIG. 2F is an enlarged perspective view of a clamp half 86b of the securing assembly 84 shown in FIGS. 2A-2D.

The flap panels 50a, 50b, 150a, 150b, 250a, 250b, 450a, 450b, 550a, 550b can be secured to the respective frame 12, 112, 212, 412. 512 by bolting the flap panels to the respective frame 12, 112, 212, 412, 512 with bolts 52a, 152a, 252a, 452a, 552a, flat washers 52b, 252b, 452b, 552b, optionally lock washers, and nuts 52c, 252c, 452c, 552c (see also, for example, FIGS. 2C-2D and related disclosure). Preferably, the nuts 52c, 252c, 452c, 552c are tightened until the flat washers 52b, 252b, 452b, 552b and/or lock washers start to compress into the composite material of the respective flap panel 50a, 50b, 150a, 150b, 250a, 250b, 450a, 450b, 550a, 550b.

It will be understood that alternate embodiments of the present mud flap assemblies and variants thereof, for example, those utilizing frames 312, 612, 712, 812, as discussed and illustrated herein, can be installed in a similar manner.

Installation of embodiments that are more adjustable, or customizable, as shown in FIGS. 12-16D, for example, generally include the following steps. Please also see FIGS. 1-2D for illustrations of the hitch assembly 70. First, the securing assembly 284 can be assembled by securing the long carriage bolts 288a to the camp halves 286a, 286b with respective flat washers 288c and/or lock washers and nuts 288b. Then the flat surfaces of each clamp half 286a, 286b is oriented against the backside of frame 212 so the nuts 288b on the long carriage bolts 288a face down toward the ground. The securing assembly 284 can be loosely attached to frame 212 with the short carriage bolts 294a, flat washers 294c and/or lock washers so that the nuts 294b are closest to the front of the frame 212 and the vehicle V. As will be appreciated, it is preferred to leave all bolts 288a, 294a somewhat loose at this stage. Next, slide the ball mount and the shaft 72 of the hitch assembly 70 through frame 212 and hitch opening 218 of the frame 212 and the open space between the respective clamp halves of the securing assembly. Then the frame 212, with the hitch assembly 70 loosely engaged within the hitch opening 218 and the space between the clamp halves 286a, 286b can be lifted to enable the shaft or hitch tongue 72 of the hitch assembly 70 to be inserted into the hitch receiver opening 77. Then, the hitch assembly 70 is secured within the hitch receiver 76 with a hitch pin 79a that is inserted into both the hitch receiver aperture 78 and the hitch tongue aperture 74 when they are aligned and clip or a cotter pin 79b or the like is then inserted into a hitch pin aperture 79c at the distal end 79d or the hitch pin 79a to secure a hitch pin 79a in this position. If the receiver aperture 78 and the hitch tongue aperture 74 do not align to allow the hitch pin 79a to be inserted or if frame 212 cannot be positioned to hang straight and plumb, a hitch assembly with a longer hitch tongue may be needed before proceeding. Next, secure the support flanges 242a, 242b to the top plate 240 of the frame 212 such that they will extend over and rest upon the step S of the bumper B of the vehicle V (see also, FIG. 3A). It is preferred that the support flanges 242a, 242b are installed symmetrically with respect to the frame 212 and that they are positioned as close to the ends 214a, 214b of the frame 212 as possible. Next ensure the frame 212 is approximately level with bumper B and push down on the top plate 240 or the support flange(s) 242a, 242b in order to press them against the top surface S of the bumper B. The rear plate 230 of the frame 212 will preferably be plumb and the stop assemblies 216a, 216b will preferably be resting against the rear surface R, so that the short carriage bolts 294a can then be tightened in their respective top slots 220, but only in the top slots 220 and equally on both sides. This will leave the lower clamp half 286b loose, while the upper clamp half 286a will preferably be tightly secured. Next tighten both long carriage bolts 288 to secure the lower clamp half 286b against the ball mount 71 and the hitch tongue 72 and the frame 212 to hitch assembly 70. Finally, tighten the remaining short carriage bolts 294a to further secure the lower clamp half 286b to the frame 112. It is preferred that all of the long carriage bolts 288*a* and the short carriage bolts 286*b* are tightened and/or torqued to about 32 ft. lbs.

In preferred embodiments, the stops 16*b*, 316*a*, 316*b* or the bumper caps 17*b*,117*a*,117*b*, 217*a*, 217*b*, 417*a*, 417*b* are tensioned against the rear surface R of the bumper B by placing force against the rear plate 30, 130, 230, 330, 430 of the frame 12, 112, 212, 312, 412 on both sides of the hitch assembly opening 18, 118, 218, 318, 418 when the hitch tongue 72 is secured to the hitch receiver 76 by the hitch pin 79*a*, but before the securing assembly 84, 184, 284, 384, 484 is tightened around the hitch assembly 70, in order to press the frame 12, 112, 212, 312, 412 and the stops 16*b*, 316*a*, 316*b* or bumper caps 17*b*,117*a*, 117*b*, 217*a*, 217*b*, 417*a*, 417*b* against the rear surface R of the bumper B and bend the frame 12, 112, 212, 312, 412 slightly and to create this tension. The support flange(s) 42, 142, 242*a*, 242*b*, 442*a*, 442*b* are also preferably tensioned against the top surface S of the bumper B by placing downward force upon the top surface S of the bumper B when the shaft 72 is secured to the hitch receiver 76 by the hitch pin 79*a*, but before the securing assembly 84, 184, 284, 384, 484 is tightened around the hitch assembly 70, in order to press the top plate 40, 140, 240, 340, 440 and the support flange(s) 42, 142, 242*a*, 242*b*, 442*a*, 442*b* against the top surface S of the bumper B and bend the frame 12, 112, 212, 312, 412 slightly and to create this tension.

The flap panels 50*a*, 50*b*, 150*a*, 150*b*, 250*a*, 250*b*, 450*a*, 450*b*, 550*a*, 550*b* are then positioned as generally illustrated indicated in FIGS. 16A-16B, for example, and secured to the frame 12, 112, 212, 312, 412, 512, 612, 712, 812 with bolts, flat washers, lock washers and nuts. It is preferred to tighten the nuts until the lock washers are fully compressed.

In various embodiments, for example those mud flap assemblies specifically designed for dual exhaust vehicles, preferred methods will further include cutting out a hole or exhaust aperture 54*a*, 154*a*, 254*a*, 454*a*, 554*a* in at least one flap panel 50*a*, 50*b*, 150*a*, 150*b*, 250*a*, 250*b*, 450*a*, 450*b*, 550*a*, 550*b* proximate the vehicle's V exhaust pipe P. Preferably, the flap panels 50*a*, 50*b*, 150*a*, 150*b*, 250*a*, 250*b*, 450*a*, 450*b*, 550*a*, 550*b* include one or more outlines 54*b*, 154*b*, 254*b*, 454*b*, 554*b*, as discussed above, for proper alignment of potential exhaust aperture(s) to the corresponding frame apertures 22, 122, 222, 322, 422, 522, 622, 722, 822.

Installation for embodiments including a frame 712 that is adjustable in length as illustrated in FIGS. 17-21 generally include the same steps as indicated above with the addition of first selecting the desired length L1-L5 of the frame 712 and then also securing bolts 729*b* within apertures 743*a*, 743*b*, 743*c* to secure side portions 713*b* and 713*c* to the center portion 713*a*.

In preferred embodiments, the ground clearance for the flap panels 50*a*, 50*b* is about 4 to about 7 inches above the ground. The flap panels 50*a*, 50*b* may be trimmed after installation to achieve this preferred ground clearance, if necessary.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A mud flap assembly for attachment to a hitch assembly, the hitch assembly being attachable to a hitch receiver attached to a vehicle proximate a bumper of the vehicle; the bumper having a rear surface and the hitch assembly having a shaft for engagement with the hitch receiver; the mud flap assembly comprising:

a frame, a securing assembly and two mud flap panels; the frame having two longitudinal ends and a rear plate; wherein the rear plate includes a hitch opening spaced between the respective longitudinal ends for receiving the shaft of the hitch assembly; the securing assembly including two elongated members that can be secured to the frame with adjustable fasteners and secured to one another with adjustable fasteners to engage the shaft and thereby secure the hitch assembly to the frame.

2. The mud flap assembly of claim 1, the frame including a pair of stops, one of which is located proximate each of the respective longitudinal ends of the frame; wherein the respective stops extend away from the frame, toward the bumper, such that the respective stops can engage the rear surface of the bumper when the mud flap assembly is operatively secured to the vehicle.

3. The mud flap assembly of claim 2, wherein the frame includes a pair of stop assemblies and each of the respective stops are a part of one of the respective stop assemblies; each of the stop assemblies further including a protective cap that is engageable with the respective stop such that the respective protective cap will come into contact with the bumper when the mud flap assembly is operatively secured to the vehicle.

4. The mud flap assembly of claim 3, further comprising a protective piece secured to the bumper; wherein the protective piece can be positioned on the bumper such that one of the respective stop assemblies will contact the protective piece when the mud flap assembly is operatively secured to the vehicle such that the protective piece can minimize abrasions to the bumper caused by the respective sto assembly.

5. The mud flap assembly of claim 2, wherein the stops are adjustable stop assemblies; each of the respective stop assemblies including a stop that extends away from adjacent parts of the frame toward the bumper, such that the respective stops can engage the rear surface of the bumper when the mud fla assembly is operatively secured to the vehicle.

6. The mud flap assembly of claim 1, wherein each of the respective mud flap panels can be separately secured to the frame proximate one of the respective longitudinal ends.

7. The mud flap assembly of claim 1, wherein the bumper has a to surface and the frame includes a top plate having a support flange; wherein the to plate is generally perpendicular to the rear plate and the top plate includes a support flange; wherein the securing assembly allows the hitch assembly to be adjustably secured to the frame so that when the hitch assembly is secured to the frame and to the vehicle to provide a first point of contact between the mud flap assembly and the vehicle, the support flange can be engaged with the top surface of the bumper to provide a second point of contact between the mud flap assembly and the vehicle.

8. The mud flap assembly of claim 1, wherein the hitch opening has a configuration selected from the group consisting of: a generally U-shaped opening partially surrounded by adjacent elements of the frame; and a fully surrounded opening completely surrounded by adjacent elements of the frame; wherein the frame further includes a plurality of frame attachment openings proximate the hitch opening; wherein connectors can adjustably connect the pair of elongated members of the securing assembly to the frame and to one another to secure the shaft of the hitch assembly to the frame.

9. The mud flap assembly of claim 8, wherein the hitch opening is the primary hitch opening and the mud flap assembly further includes a removable adjustment plate defining a secondary hitch opening for attachment to the frame proximate the primary hitch opening; wherein the adjustment plate includes a plurality of plate openings to enhance the adjustment capabilities of the securing assembly.

10. The mud flap assembly of claim 1, wherein the securing assembly includes a first plurality of nuts and bolts that can secure the respective elongated members to the frame and a second plurality of nuts and bolts that can secure the respective elongated members to one another so as to secure the shaft of the hitch assembly to the frame.

11. The mud flap assembly of claim 8, wherein the plurality of frame attachment openings include a plurality of slots located proximate the hitch opening and the securing assembly includes a first plurality of nuts and bolts that can secure the respective elongated members to the frame proximate the hitch opening and a second plurality of nuts and bolts that can secure the respective elongated members to one another so as to secure the shaft of the hitch assembly to the frame.

12. The mud flap assembly of claim 1, wherein the frame has a structure that is selected from the group consisting of: a unitary structure; and a multi-part structure in which a plurality of parts are interconnected to form a frame assembly.

13. The mud flap assembly of claim 1, wherein the two elongated members that can be separately, adjustably secured to the frame and separately, adjustably secured to one another to engage the shaft and thereby secure the hitch assembly to the frame.

14. A mud flap assembly for attachment to a hitch assembly, the hitch assembly being attachable to a hitch receiver attached to a vehicle proximate a bumper of the vehicle; the bumper having a top surface and a rear surface and the hitch assembly having a shaft for engagement with the hitch receiver; the mud flap assembly comprising:

a frame, a securing assembly and two mud flap panels; the frame having two longitudinal ends, a rear plate and a top plate, wherein the top plate is generally perpendicular to the rear plate and the top plate includes a support flange; and wherein each of the respective mud flap panels can be separately secured to the frame proximate one of the respective longitudinal ends; and wherein the hitch assembly can be adjustably secured to the frame by the securing assembly such that when the shaft of the hitch assembly is engaged with the hitch receiver so as to provide a first point of contact between the mud flap assembly and the vehicle, the support flange of the top plate can be engaged with the top surface of the bumper to give the mud flap assembly a second point of contact with the vehicle.

15. The mud flap assembly of claim 14, the frame including a pair of stops, one of which is located proximate each of the respective longitudinal ends of the frame; wherein the respective stops extend away from adjacent parts of the frame toward the bumper, such that the respective stops will engage with the rear surface of the bumper when the mud flap assembly is operatively secured to the vehicle.

16. The mud flap assembly of claim 15, wherein the frame includes a pair of stop assemblies and each of the respective stops are a part of one of the respective stop assemblies; each of the stop assemblies further including a protective cap engaged with the respective stop such that the respective protective cap will come into contact with the bumper when the mud flap assembly is operatively secured to the vehicle.

17. The mud flap assembly of claim 16, further comprising a protective piece secured to the bumper; wherein the protective piece can be positioned on the bumper such that one of the respective stop assemblies will contact the protective piece when the mud flap assembly is operatively secured to the vehicle such that the protective piece minimizes abrasions to the bumper caused by the respective sto assembly.

18. The mud flap assembly of claim 14, wherein the securing assembly includes a pair of elongated members that can be secured to the frame and secured to one another to secure the hitch assembly to the frame.

19. The mud flap assembly of claim 14, wherein the securing assembly allows the hitch assembly to be adjustably secured to the frame so that when the hitch assembly is secured to the frame and to the vehicle, the support flange can be engaged with the top surface of the bumper.

20. The mud flap assembly of claim 18, wherein the frame further includes a plurality of openings including a primary hitch opening having a configuration selected from the group consisting of: a generally U-shaped opening partially surrounded by adjacent elements of the frame; and an opening completely surrounded by adjacent elements of the frame; the plurality of openings further including a plurality of frame attachment openings proximate the primary hitch opening; wherein connectors can adjustably connect the pair of elongated members of the securing assembly to the frame and to one another to secure the shaft of the hitch assembly to the frame.

21. The mud flap assembly of claim 20, wherein the mud flap assembly further includes a removable adjustment plate defining a secondary hitch opening for attachment to the frame proximate the primary hitch opening; wherein the adjustment plate includes a plurality of plate openings to enhance the adjustment capabilities of the securing assembly.

22. The mud flap assembly of claim 18, wherein the securing assembly includes a first plurality of nuts and bolts that can secure the respective elongated members to the frame and a second plurality of nuts and bolts that can secure the respective elongated members to one another so as to secure the shaft of the hitch assembly to the frame.

23. The mud flap assembly of claim 20, wherein the frame attachment openings are slots located proximate the primary hitch opening, such bolts can be used to adjustably secure the respective elongated members to the frame proximate the primary hitch opening.

24. The mud flap assembly of claim 14, wherein the frame has a structure that is selected from the group consisting of: a unitary structure; and a multi-part structure in which a plurality of parts are interconnected to form a frame assembly.

25. A mud flap assembly for attachment to a hitch assembly having a ball mount and a vehicle having a rear bumper and a hitch receiver proximate the rear bumper; the rear bumper having a top surface and a rear surface and the hitch assembly having a shaft interconnected to the ball mount for engagement with the receiver; the mud flap assembly comprising:

a frame, a securing assembly and a pair of mud flap panels; the frame having two longitudinal ends, a rear plate and a top plate, the top plate having an upper surface that is generally perpendicular to a rear surface on the rear plate; the top plate further including a support flange; the rear plate further including a hitch opening; wherein the securing assembly can be adjustably secured to the frame proximate the hitch opening such that the hitch assembly can be adjustably secured to the frame; wherein the shaft can be positioned at least partially within the hitch opening such that the support flange can be engaged with the top surface of the bumper when the shaft is secured to the frame and engaged within the hitch receiver to provide a first point of contact between the mud flap assembly and the vehicle; wherein the flap panels can be separately secured to the frame proximate each of the respective longitudinal ends of the frame;

and wherein, when the mud flap assembly is operatively secured to the vehicle, the support flange can be engaged with the top surface of the bumper to provide a second point of contact between the mud flap assembly and the vehicle when the mud flap assembly is operatively engaged with the vehicle.

26. The mud flap assembly of claim 25, the frame including a pair of stop assemblies, one of which is located proximate each of the respective longitudinal ends of the frame; wherein, when the mud flap assembly is operatively secured to the vehicle, the respective stop assemblies can be engaged with the rear surface of the bumper to provide third and fourth points of contact with the vehicle and stabilized the connection between the mud flap assembly and the vehicle.

27. The mud flap assembly of claim 26, further comprising a protective piece secured to the bumper; wherein the protective piece can be positioned such that one of the respective stop assemblies will contact the protective piece when the mud flap assembly is operatively secured to the vehicle such that the protective piece minimizes abrasions to the bumper caused by the respective stop assembly.

28. The mud flap assembly of claim 25, further comprising a metal heat shield connected to at least one of the mud flap panels.

29. The mud flap assembly of claim 25, wherein at least one mud flap panel includes a section that can be cut out of the mud flap panel.

30. A mud flap assembly for attachment to a hitch assembly; the hitch assembly being attachable to a hitch receiver attached to a vehicle proximate a rear bumper of the vehicle; the rear bumper having a top surface and a rear surface and the hitch assembly having a shaft for engagement of the hitch assembly with the receiver; the mud flap assembly comprising:
a frame, a securing assembly, and two flap panels; the frame having a rear plate and two longitudinal ends; the rear plate having a hitch opening, wherein the shaft of the hitch assembly can be positioned within the hitch opening, engaged with the frame by the securing assembly and secured to the hitch receiver; wherein each of the respective flap panels can be separately secured to the frame proximate one of the respective longitudinal ends of the frame; the frame further including a pair of stops, each of which is located proximate one of the respective longitudinal ends of the frame; wherein the respective stops extend away from adjacent parts of the frame toward the bumper, such that the respective stops will engage the rear surface of the bumper, when the mud fla assembly is operatively secured to the vehicle.

31. The mud flap assembly of claim 30, further comprising a protective piece secured to the bumper; wherein the protective piece can be positioned such that one of the respective stops will contact the protective piece when the mud fla assembly is operatively secured to the vehicle, such that the protective piece minimizes abrasions to the bumper caused by the respective stop when the mud flap assembly is operatively secured to the vehicle.

32. The mud flap assembly of claim 30, wherein the frame includes a pair of stop assemblies and each of the respective stops are a part of one of the respective stop assemblies; each of the stop assemblies further including a protective cap engaged with the respective stop such that the respective protective cap will come into contact with the bumper when the mud flap assembly is operatively secured to the vehicle.

33. The mud flap assembly of claim 30, wherein the frame further includes a top plate; wherein the top plate is generally perpendicular to the rear plate and the top plate includes a support flange; and wherein the hitch assembly can be adjustably secured to the frame by the securing assembly such that when the shaft of the hitch assembly is engaged with the hitch receiver so as to provide a first point of contact between the mud flap assembly and the vehicle, the support flange of the to plate can be engaged with the top surface of the bumper to give the mud flap assembly a second point of contact with the vehicle.

34. The mud flap assembly of claim 33, wherein the securing assembly allows the hitch assembly to be adjustably secured to the frame so that when the hitch assembly is secured to the frame and to the vehicle, the support flange can be engaged with the top surface of the bumper.

35. The mud flap assembly of claim 34, wherein the frame further includes at least one pair of slots proximate the hitch opening; wherein bolts can be inserted within the respective slots to adjustably connect the securing assembly to the frame.

36. The mud flap assembly of claim 35, wherein the frame includes a removable adjustment plate defining the hitch opening; wherein the adjustment plate includes the pair of slots; and wherein the plate can be positioned in more than one orientation to enhance the adjustment capabilities of the securing assembly.

37. The mud flap assembly of claim 36, wherein the respective bolts can be positioned at multiple locations within the slots.

38. The mud flap assembly of claim 36, wherein the frame includes four slots proximate the hitch opening, such that four bolts can be used to adjustably secure the securing assembly to the frame proximate the hitch opening.

39. The mud flap assembly of claim 30, wherein the securing assembly includes two clamp halves that are interconnected by bolts.

40. The mud flap assembly of claim 30, further comprising a metal heat shield connected to at least one of the flap panels.

41. The mud flap assembly of claim 30, wherein at least one flap panel includes a section that can be cut out of the flap panel.

42. The mud flap assembly of claim 30, wherein the hitch opening is generally U-shaped.

43. The mud flap assembly of claim 30, wherein the frame is a unitary structure.

44. The mud flap assembly of claim 30, wherein the position of each of the respective stop assemblies is adjustable.

45. A method of adjustably securing a mud flap assembly to a hitch assembly to form a combination mud flap assembly and hitch assembly for subsequent engagement of the combination mud flap assembly and hitch assembly to a vehicle having a hitch receiver attached to the vehicle proximate a bumper of the vehicle; the hitch assembly having a shaft for engagement with the hitch receiver; the bumper having a rear surface and a top surface; the method comprising the steps of:
providing an adjustable mud flap assembly for attachment to the hitch assembly, the hitch assembly being attachable to the hitch receiver of the vehicle and the mud flap assembly comprising a frame, a securing assembly and two mud flap panels; the frame having two longitudinal ends, a hitch receiving opening positioned between the respective longitudinal ends, a rear plate and a top plate; wherein the top plate is generally perpendicular to the rear plate and the top plate includes a support flange; and wherein each of the respective mud flap panels can be separately secured to the frame proximate the respective longitudinal ends; and wherein the hitch assembly can be adjustably secured to the frame by the securing assembly such that when the shaft is engaged with the hitch receiver so as to provide a first point of contact between the mud flap assembly and the vehicle, the support flange of the top plate will be engaged with the top surface of the bumper to give the mud flap assembly a second point of contact with the vehicle; and securing the hitch assembly to the frame.

46. The method of adjustably securing a mud flap assembly to a hitch assembly of claim 45, wherein the step of securing the hitch assembly to the frame includes threading the shaft through the hitch receiving opening and adjustably securing the shaft to the frame with the securing assembly.

47. A method of adjustably securing a mud flap assembly to a hitch assembly to form a combination mud flap assembly and hitch assembly for subsequent engagement of the combination mud flap assembly and hitch assembly to a vehicle having a hitch receiver attached to the vehicle proximate a bumper of the vehicle; the hitch assembly having a shaft for engagement with the hitch receiver; the bumper having a rear surface and a top surface; the method comprising the steps of:

providing an adjustable mud flap assembly for attachment to the hitch assembly, the hitch assembly being attachable to the hitch receiver of the vehicle and the mud flap assembly comprising a frame, a securing assembly and two mud flap panels; the frame having two longitudinal ends, a hitch receiving opening positioned between the respective longitudinal ends, a rear plate and a top plate; wherein the top plate is generally perpendicular to the rear plate and the top plate includes a support flange; and wherein each of the respective mud flap panels can be separately secured to the frame proximate the respective longitudinal ends; and wherein the hitch assembly can be adjustably secured to the frame by the securing assembly such that when the shaft of the hitch assembly is engaged with the hitch receiver so as to provide a first point of contact between the mud flap assembly and the vehicle, the support flange of the to plate will be engaged with the top surface of the bumper to give the mud flap assembly a second point of contact with the vehicle;

securing the hitch assembly to the frame to form a combination mud flap assembly and hitch assembly; and securing the combination mud flap assembly and hitch assembly to the vehicle such that the support flange of the top plate will be engaged with the top surface of the bumper by securing the shaft to the hitch receiver.

48. The method of adjustably securing a mud flap assembly to a hitch assembly of claim 47, wherein the step of securing the hitch assembly to the frame includes the steps of threading the shaft through the hitch receiving opening and adjustably securing the shaft to the frame with the securing assembly.

49. The method of adjustably securing a mud flap assembly to a hitch assembly of claim 47, wherein the step of securing the combination mud flap assembly and hitch assembly to the vehicle includes the steps of inserting the shaft into the receiver, securing the shaft into the receiver and tightening the securing assembly about the shaft to hold the shaft in a secured position with respect to the frame.

50. The method of adjustably securing a mud flap assembly to a hitch assembly, of claim 47, wherein the frame includes a pair of stop assemblies, one of which is located proximate each of the respective longitudinal ends of the frame; and wherein the step of tightening the securing assembly about the shaft includes the steps of preliminarily placing downward pressure on the top plate and inward pressure on the rear plate to engage the respective stop assemblies with the rear surface of the bumper prior to and in concert with the step of tightening so the mud flap assembly is operatively secured to the vehicle, the respective stop assemblies are engaged with the rear surface of the bumper and the support flange is engaged with the top surface.

51. The method of adjustably securing a mud flap assembly to a hitch assembly, of claim 50, wherein the mud flap assembly further includes a protective piece; wherein the step of step of tightening the securing assembly about the shaft includes the steps of preliminarily securing the protective piece to the rear surface of the bumper such that one of the respective stop assemblies will contact the protective piece when the mud flap assembly is operatively secured to the vehicle.

52. A mud flap assembly for attachment to a hitch assembly; the hitch assembly being attachable to a hitch receiver attached to a vehicle proximate a rear bumper of the vehicle; the rear bumper having a top surface and a rear surface and the hitch assembly having a shaft for engagement of the hitch assembly with the receiver; the mud flap assembly comprising:

a frame, a securing assembly, and two flap panels; the frame having a rear plate, a top plate and two longitudinal ends; the top plate being generally perpendicular to the rear plate; the rear plate having a hitch opening, wherein the shaft of the hitch assembly can be threaded through the hitch opening, secured to the frame with the securing assembly and engaged with the hitch receiver; wherein each of the respective fla panels can be separately secured to the frame proximate one of the respective longitudinal ends of the frame; the frame further including at least one adjustable support flange; wherein the securing assembly allows the hitch assembly to be adjustably secured to the frame so that when the hitch assembly is secured to the frame and to the vehicle, the support flange can be engaged with the top surface of the bumper.

53. The mud flap assembly of claim 52, wherein the frame further includes a pair of adjustable stop assemblies each of which is located proximate one of the respective longitudinal ends of the frame; wherein, when the mud flap assembly is operatively secured to the vehicle, the respective adjustable stop assemblies can be engaged with the rear surface of the bumper.

54. The mud flap assembly of claim 53, further comprising a protective piece secured to the bumper; wherein the protective piece can be positioned such that one of the respective adjustable stop assemblies will contact the protective piece when the mud flap assembly is operatively secured to the vehicle such that the protective piece minimizes abrasions to the bumper caused by the respective adjustable stop assembly.

55. The mud flap assembly of claim 52, wherein the securing assembly includes two elongated members that are interconnected by bolts.

56. The mud flap assembly of claim 52, wherein the frame includes four slots proximate the hitch opening, such that four bolts can be used to adjustably secure the securing assembly to the frame proximate the hitch opening.

57. The mud flap assembly of claim 52, wherein the hitch opening is generally U-shaped.

58. A method of adjustably engaging a mud flap assembly with a hitch assembly to form a combination mud flap assembly and hitch assembly for subsequent engagement of the combination mud flap assembly and hitch assembly to a vehicle having a hitch receiver attached to the vehicle proximate a bumper of the vehicle; the hitch assembly having a shaft for engagement with the hitch receiver; the bumper having a rear surface and a top surface; the method comprising the steps of:

provide an adjustable mud flap assembly for engagement with the hitch assembly, the hitch assembly being securable to the hitch receiver of the vehicle and the mud flap assembly; the mud flap assembly including a frame, a securing assembly and two flap panels; the frame having two longitudinal ends, a rear plate and a top plate, and a hitch opening positioned between the two longitudinal ends; wherein the top plate is generally perpendicular to the rear plate and the top plate includes a support flange; and wherein the shaft of the hitch assembly can be positioned within the hitch opening, adjustably engaged with the frame by the securing assembly to form the combination mud flap assembly and hitch assembly and then engaged with the hitch receiver to secure the combination mud fla assembly and hitch assembly to the vehicle; and wherein the securing assembly allows the hitch assembly to be adjustably secured to the frame so that when the hitch assembly is engaged with the frame and secured to the vehicle, the support flange can be engaged with the top surface of the bumper;

adjustably engaging the hitch assembly with the frame so that the shaft of the hitch assembly is positioned within the hitch opening;

inserting the shaft of the hitch assembly into the receiver; and securing the hitch assembly to the receiver.

59. The method of claim 58, wherein the hitch assembly includes a hitch pin assembly and the shaft of the hitch pin assembly includes a hitch tongue aperture; and wherein the hitch receiver has a receiver opening and a hitch pin opening; and wherein the step of providing an adjustable mud flap assembly includes providing a securing assembly including two clamp halves that are adjustably interconnected by a plurality of nuts and bolts; wherein the step of adjustably engaging the hitch assembly with the frame includes loosely interconnecting the plurality of nuts and bolts with the respective clamp halves such that the securing assembly is loosely engaged around the shaft of the hitch assembly so that the position of the hitch opening of the frame with respect to the shaft can be adjusted; and wherein the step of securing the hitch assembly to the receiver includes inserting the shaft into the receiver, aligning the hitch pin opening in the receiver with the hitch tongue aperture in the shaft and inserting the hitch pin through the hitch pin opening and into the hitch tongue aperture.

60. The method of claim 59, wherein the mud flap assembly includes at least one adjustable support flange; wherein the step of securing is followed by a step of adjusting the engagement of the frame with the hitch assembly to stabilize the engagement of the mud flap assembly with the vehicle, wherein force is applied to the frame to adjust the position of the frame with respect to the shaft so as to place a tension on the frame so that the support flange is in contact with the bumper.

61. The method of claim 59, wherein the step of securing the hitch assembly to the frame includes positioning the shaft within the hitch opening and adjustably securing the shaft to the frame with the securing assembly.

62. A method of adjustably securing a mud flap assembly to a hitch assembly to form a combination mud flap assembly and hitch assembly for subsequent engagement of the combination mud flap assembly and hitch assembly to a vehicle having a hitch receiver attached to the vehicle proximate a bumper of the vehicle; the hitch assembly having a shaft for engagement with the hitch receiver; the bumper having a rear surface and a top surface; the method comprising the steps of:

providing an adjustable mud flap assembly for attachment to the hitch assembly, the hitch assembly being attachable to the hitch receiver of the vehicle and the mud flap assembly comprising a frame, a securing assembly and two mud flap panels; the frame having two longitudinal ends, a hitch receiving opening positioned between the respective longitudinal ends, a rear plate and a top plate; wherein the top plate is generally perpendicular to the rear plate and the top plate includes a support flange; and wherein each of the respective mud flap panels can be separately secured to the frame proximate the respective longitudinal ends; and wherein the hitch assembly can be adjustably secured to the frame by the securing assembly such that when the shaft of the hitch assembly is engaged with the hitch receiver so as to provide a first point of contact between the mud flap assembly and the vehicle, the support flange of the to plate will be engaged with the top surface of the bumper to give the mud flap assembly a second point of contact with the vehicle;

securing the hitch assembly to the frame to form a combination mud fla assembly and hitch assembly; and securing the combination mud flap assembly and hitch assembly to the vehicle such that the support flange of the top plate will be engaged with the top surface of the bumper by securing the shaft to the hitch receiver.

63. The method of claim 62, wherein the step of securing the hitch assembly to the frame includes positioning the shaft within the hitch opening and adjustably securing the shaft to the frame with the securing assembly.

64. The method of claim 63, wherein the step of securing the combination mud flap assembly and hitch assembly to the vehicle includes the steps of inserting the shaft into the receiver, securing the shaft into the receiver and tightening the securing assembly about the shaft to hold the shaft in a secured position with respect to the frame.

65. The method of claim 64, wherein the frame includes a pair of sto assemblies, one of which is located proximate each of the respective longitudinal ends of the frame; and wherein the step of tightening the securing assembly about the shaft includes the steps of preliminarily placing downward pressure on the top plate and inward pressure on the rear plate to engage the respective stop assemblies with the rear surface of the bumper prior to and in concert with the step of tightening so the mud flap assembly is operatively secured to the vehicle, the respective stop assemblies are engaged with the rear surface of the bumper and the support flange is engaged with the top surface.

66. The method of adjustably securing a mud flap assembly to a hitch assembly, of claim 65, wherein the mud flap assembly further includes a protective piece; wherein the step of step of tightening the securing assembly about the shaft includes the steps of preliminarily securing the protective piece to the rear surface of the bumper such that one of the respective stop assemblies will contact the protective piece when the mud flap assembly is operatively secured to the vehicle.

* * * * *